US006914599B1

(12) United States Patent
Rowe et al.

(10) Patent No.: US 6,914,599 B1
(45) Date of Patent: Jul. 5, 2005

(54) IMAGE PROCESSING APPARATUS

(75) Inventors: Simon Michael Rowe, Guildford (GB); Allan Joseph Davison, Guildford (GB)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/229,898

(22) Filed: Jan. 14, 1999

(30) Foreign Application Priority Data

| Jan. 14, 1998 | (GB) | 9800761 |
|---|---|---|
| Jan. 14, 1998 | (GB) | 9800762 |
| Jan. 14, 1998 | (GB) | 9800764 |
| Jan. 14, 1998 | (GB) | 9800765 |
| Jan. 14, 1998 | (GB) | 9800767 |
| Jan. 14, 1998 | (GB) | 9800777 |
| Jan. 14, 1998 | (GB) | 9800778 |
| Jan. 14, 1998 | (GB) | 9800779 |

(51) Int. Cl.[7] .......................................... G06T 17/00
(52) U.S. Cl. .................................. 345/420; 382/154
(58) Field of Search ................................ 382/106, 107, 382/110, 141, 154, 156, 158, 170, 199, 203; 348/49, 86, 89, 113, 139, 159, 705, 47, 48; 345/419, 420, 501, 531, 538, 541, 552, 585, 503, 506, 521, 582, 427; 706/16, 22, 26; 396/315, 332; 355/40, 41; 250/558; 356/12, 611, 613, 638; 702/158

(56) References Cited

U.S. PATENT DOCUMENTS

| 4,601,053 A | * | 7/1986 | Grumet | 382/106 |
|---|---|---|---|---|
| 5,182,641 A | * | 1/1993 | Diner et al. | 358/103 |

(Continued)

FOREIGN PATENT DOCUMENTS

| EP | A0431861 | 6/1991 |
|---|---|---|
| EP | 0 431 862 | 6/1991 |
| EP | A-0562814 | 9/1993 |
| EP | A-0626655 | 11/1994 |
| EP | A-0669758 | 8/1995 |
| EP | A-0773515 | 5/1997 |
| EP | A-0773516 | 5/1997 |
| EP | A-0794516 | 9/1997 |
| WO | WO 89/01850 | 3/1989 |
| WO | WO 95/08816 | 3/1995 |
| WO | WO 95/19093 | 7/1995 |
| WO | WO 96/21321 | 7/1996 |
| WO | WO 96/31047 | 10/1996 |
| WO | WO 99/65223 | 12/1999 |

OTHER PUBLICATIONS

Sharp Model VC–5W20E Double Video Cassette Recorder Owner's Manual, 1988.*

(Continued)

*Primary Examiner*—Mark Zimmerman
*Assistant Examiner*—Lance W. Sealey
(74) *Attorney, Agent, or Firm*—Fitzpatrick, Cella, Harper & Scinto

(57) ABSTRACT

In a processing system, video images of moving objects are processed to model the objects in a 3D computer model. Video from multiple cameras is processed to separate objects from their shadows, and to test whether an object is made up of separate objects, which are then modelled separately. Each object is modelled using vertical planes whose bases approximate the object's ground footprint, using planes based on object surface planes identified in the image data, or using a single vertical plane. Pixel data from the video images is rendered onto the planes in the models. The video for rendering is selected based on the viewer's viewing direction, the camera viewing directions, and quality characteristics of the cameras and image data. If the viewer's viewing direction is close to vertical or a plane of an object, a schematic of the objects' positions is displayed. To account for image data from different cameras being used, successive images are tested for visual discontinuous, and are modified if necessary. Information indicating the accuracy/reliability of the rendered image is displayed.

236 Claims, 16 Drawing Sheets

U.S. PATENT DOCUMENTS

| | | | |
|---|---|---|---|
| 5,341,467 A | | 8/1994 | Klassen ................... 395/142 |
| 5,363,297 A | | 11/1994 | Larson et al. ............. 364/410 |
| 5,432,712 A | | 7/1995 | Chan ..................... 364/514 R |
| 5,511,153 A | | 4/1996 | Azarbayejani et al. ...... 395/119 |
| 5,563,988 A | | 10/1996 | Maes et al. ................ 395/121 |
| 5,587,752 A | * | 12/1996 | Petruchik ................. 396/315 |
| 5,671,086 A | | 9/1997 | Parvin et al. .............. 359/391 |
| 5,714,997 A | | 2/1998 | Anderson .................. 348/39 |
| 5,748,198 A | | 5/1998 | Takeda et al. .............. 345/441 |
| 5,809,161 A | | 9/1998 | Auty et al. ................ 382/104 |
| 5,877,779 A | * | 3/1999 | Goldberg et al. ........... 345/511 |
| 5,911,035 A | * | 6/1999 | Tsao ...................... 395/21 |
| 6,025,847 A | * | 2/2000 | Marks ..................... 345/419 |
| 6,434,257 B1 | * | 8/2002 | Mohan et al. .............. 382/110 |

OTHER PUBLICATIONS

Haralick et al., "Computer and Robot Vision Volume 2", 1993.*

Wolberg, "Digital Image Warping", IEEE Computer Society Press.*

"Adaptive Least Squares Correlation: A Powerful Image Matching Technique" A.W. Gruen, Photogrammetry Remote Sensing and Cartography, 1985, pp. 175–187.

"Computer and Robot Vision Volume 1" R.M. Haralick et al., Addison–Wesley Publishing Company, 1992, ISBN 0–201–10877–1 (v. 1), Section 11.4 & Section 8.

"Digital Image Warping", George Wolberg, IEEE Computer Society Press, ISBN 0–8186–8944–7, pp. 222–240.

"Statistical Background Modelling for Tracking with a Camera", Rowe, British Machine Vision Conference 1995.

"Tracking Non–Rigid Objects in Complex Scenes", Huttenlocher et al., Proc. 4th International Conference on Computer Vision, 1993, Berlin, IEEE Computer Society Press ISBN 0–8186–3870–2.

"Look Who's Talking, the GAZE Groupware System", Vertegaal et al., Summary of ACM CHI '98 Conference on Human Factors in Computing Systems, Apr., 1998 Los Angeles, pp. 293–294.

"A Virtual Studio for Live Broadcasting: The Mona Lisa Project", Blonde et al., IEEE Multimedia, vol. 3, No. 2, Jun. 1, 1996, pp. 18–28, XP000594152.

"Image Synthesis Based on Estimation of Camera Parameters from Image Sequence", Park et al., IEICE Transactions on Information and Systems, vol. E77–D, No. 9, Sep. 1, 1994, pp. 973–986, XP000477273.

"Computer and Robot Vision Volume 2", Haralick et al., Addison–Wesley Publishing Company, 1993, ISBN 0–201–56943–4 (vol. 2), pp. 293–378, p. 583 & Chapter 16.

"Virtual Bellows: Constructing High Quality Stills from Video", Mann et al, MIT Media Laboratory Perceptual Computing Section Technical Report No. 259, appears, Proc. First IEEE Int. Conf. on Image Proc., Austin, Texas, Nov. 1994.

Pages printed from website of Visual Computing Laboratory, 9500 Gilman Drive, La Jolla, CA (May 1995): "Immersive Video", Moezzi et al.

* cited by examiner

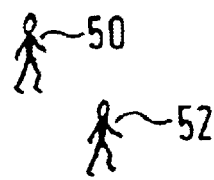
FIG. 9a
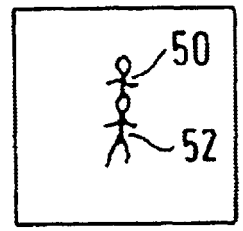
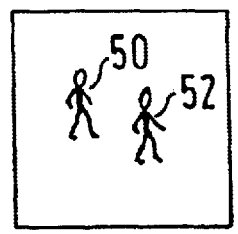
FIG. 9b          FIG. 9c
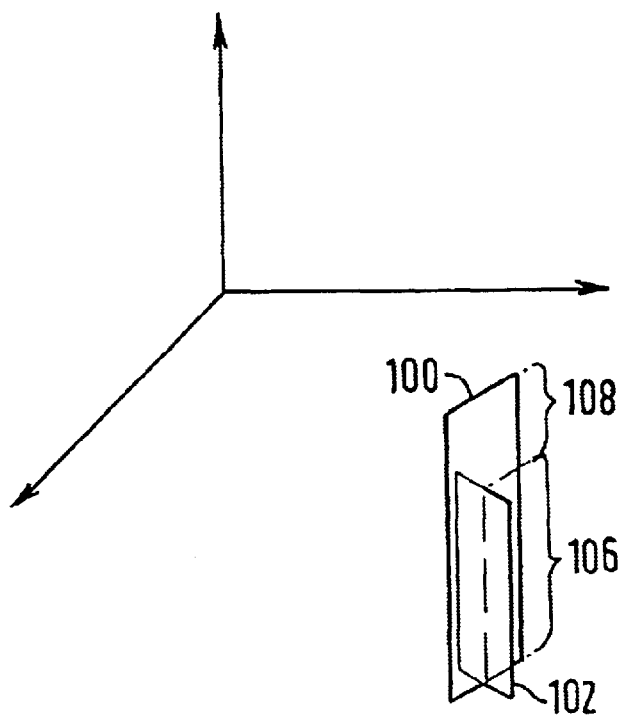
FIG. 11

IMAGE PROCESSING APPARATUS

The present invention relates to a processing apparatus and method for use with a three-dimensional computer modelling system in which representations of objects are generated in the three-dimensional computer model using moving pictures such as video images.

At present, the content of images produced from video, or other moving picture, data depends on the viewing characteristics of the camera which captured the data. More particularly, the position from which objects are seen by a viewer is determined by the viewing position and viewing direction of the camera with respect to the scene.

As a solution to this constraint, interactive systems have been suggested in which video data is used to create a dynamic three-dimensional computer model of a scene, from which simulated views from any desired viewing direction can be created and displayed to a user. The present invention aims to provide an apparatus or method for use in such an interactive system.

According to the present invention, there is provided an image processing apparatus or method in which image data from cameras having different views of the objects in a scene is processed to determine whether image data identified for an object is actually associated with more than one object.

The present invention also provides an image processing apparatus or method in which image data is processed to identify image data relating to objects, and identified data is processed using image data from a different camera to split the identified image data for use in representing a plurality of objects.

According to the present invention there is provided an image processing apparatus or method in which image data relating to an object in a scene and image data relating to the shadow of the object is identified using image data from at least two cameras which have different views of the object.

The invention also provides an image processing apparatus or method in which image data of an object and its shadow from a first camera and image data of the object and its shadow from a second camera is transformed to a common modelling space, and a part of the image data relating to the object and a part of the image data relating to the shadow are identified on the basis of the transformed data.

According to the present invention, there is provided an image processing apparatus or method in which image data for an object in a scene is processed to define a model of the object on the basis of the footprint of the object on the ground.

The invention also provides an image processing apparatus or method in which image data from cameras having different views of an object in a scene is processed to determine a ground profile of the object, and the object is represented in a three-dimensional model in dependence upon the ground profile.

According to the present invention, there is provided an image processing apparatus or method in which first and second rendering techniques are performed: in the first technique, a three-dimensional computer model is rendered to generate data defining an image showing the model from a given viewing direction, and in the second technique, data is generated for a schematic image of the positions of the objects in the model.

The present invention also provides an image processing apparatus or method in which a three-dimensional computer model is rendered for a chosen viewing direction, except when the chosen direction is within a predetermined set of angles, in which case, data schematically representing the positions of the objects in the model is generated for output to the user.

These features are useful when objects are modelled without tops, for example using one or more vertical planes in the computer model, since, in this case, a realistic image of the objects cannot be obtained when looking down on them. The features are also useful when an object is modelled with one or more vertical planes whether or not a top is provided since realistic images of the object may not be obtained when looking at a plane edge-on.

According to the present invention there is provided an image processing apparatus or method in which image data for an object in a scene is processed to produce a three-dimensional model of the object in dependence upon surface planes of the object identified from the image data.

The invention also provides an image processing apparatus or method in which image data from at least two cameras having different views of an object is processed to identify planar surfaces of the object on which feature points lie, and to represent the object in a three-dimensional manner in dependence upon the identified planes.

According to the present invention there is provided an image processing apparatus or method in which a three-dimensional computer model is rendered for a chosen viewing direction, and information indicating the accuracy of the model for the chosen viewing direction is also generated.

According to the present invention, there is provided an image processing apparatus or method in which image data from at least two cameras having different views of an object is received, the object is modelled in a three-dimensional computer model, and the model is rendered in accordance with a chosen viewing direction. A selection is made between the image data from the different cameras to determine which image data to use for processing using the chosen viewing direction, a viewing parameter of each camera, and a parameter which affects image data quality.

According to the present invention, there is provided an image processing apparatus or method in which, when rendering a three-dimensional computer model for a sequence of images using image data available from more than one camera, tests are performed when the viewing direction changes to determine whether the images will appear discontinuous to a viewer, and image data is generated to address determined discontinuities.

Embodiments of the invention will now be described, by way of example only, with reference to the accompanying drawings, in which:

FIG. 1 schematically shows the components of an embodiment;

FIG. 2 schematically illustrates the collection of video data from a dynamic environment in an embodiment;

FIG. 3 which consists of FIGS. 3a and 3b, shows, at a top level, the processing operations performed in a embodiment to process signals defining moving pictures, to create a three-dimensional computer model and to display images to a user from a desired viewing direction;

Figure 3:
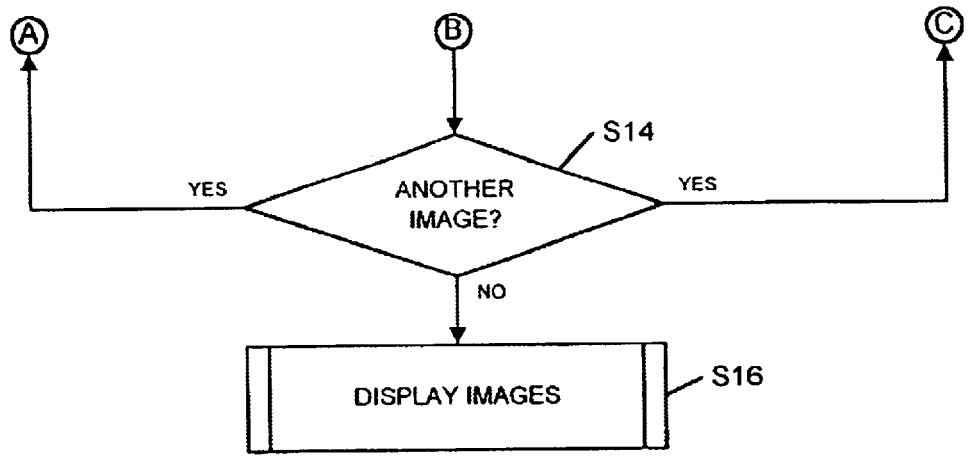
Figure 10:
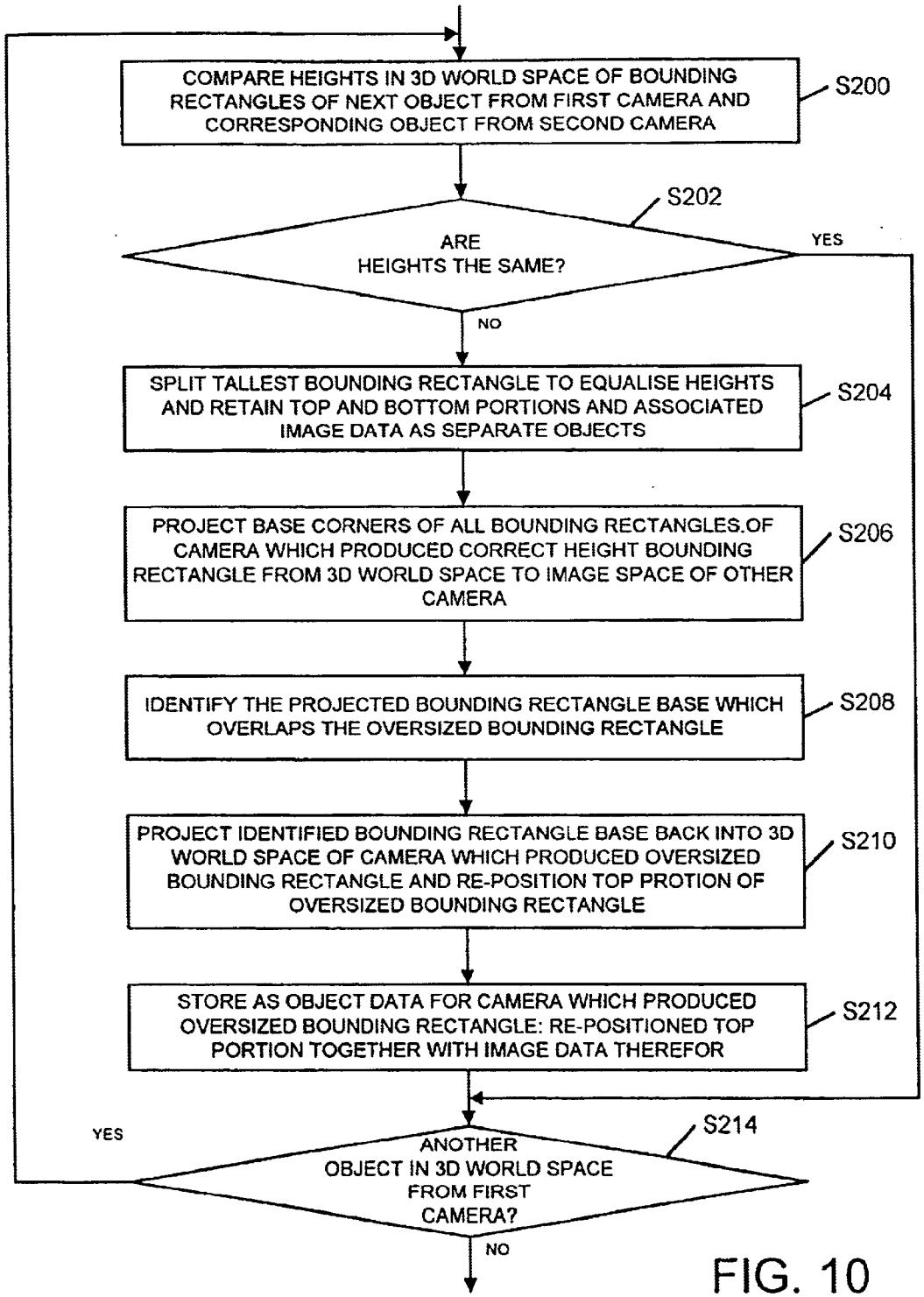
Figure 12:
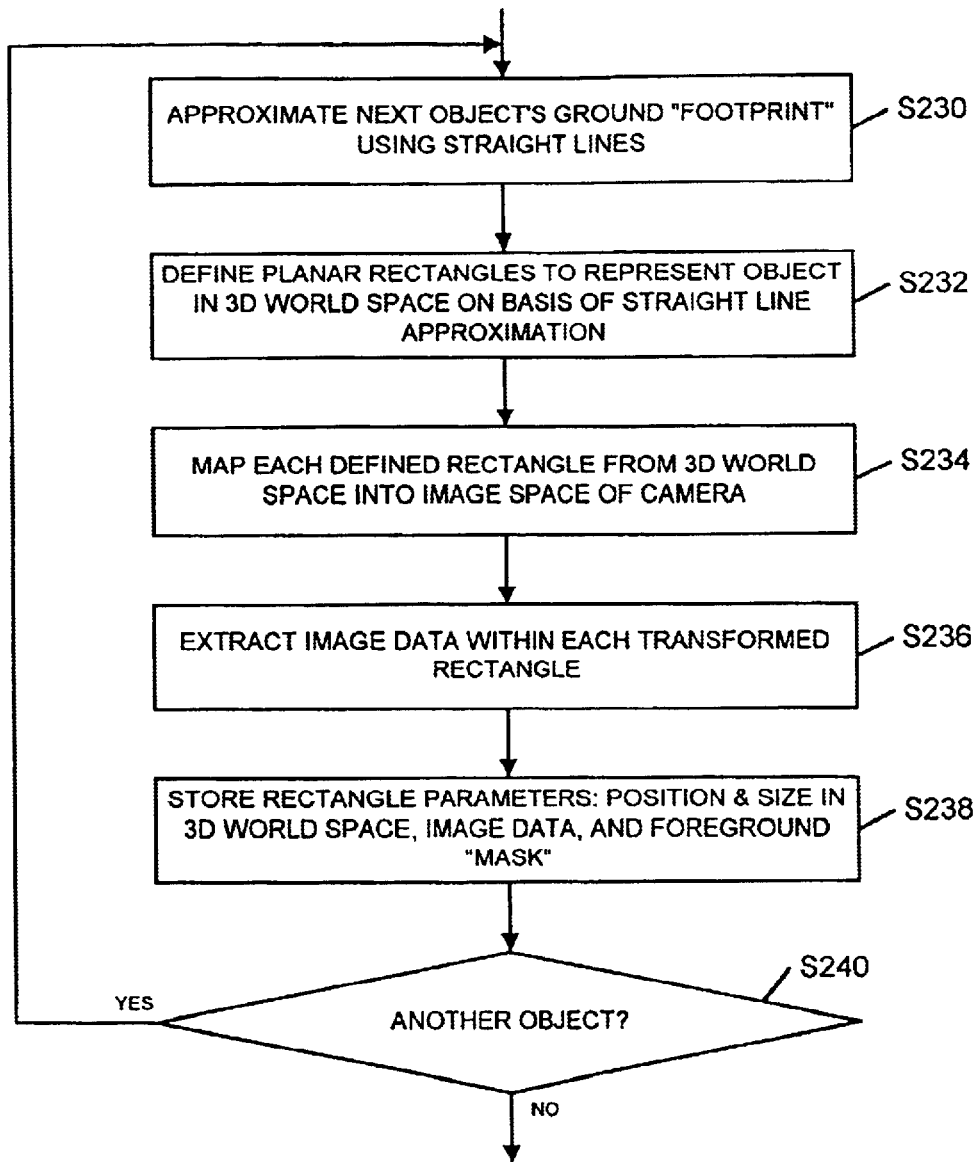

FIGS. 9a, 9b and 9c schematically illustrate an example configuration of objects and cameras, and the images recorded by each camera for the illustrated configuration;

FIG. 10 shows the processing operations performed at step S10 in FIG. 3;

FIG. 11 schematically illustrates bounding rectangles in 3D world space produced for the configuration of objects and cameras shown in FIG. 9;

FIG. 12 shows the processing operations performed in a first embodiment at step S11a or step S11b in FIG. 3.

Figure 13A:
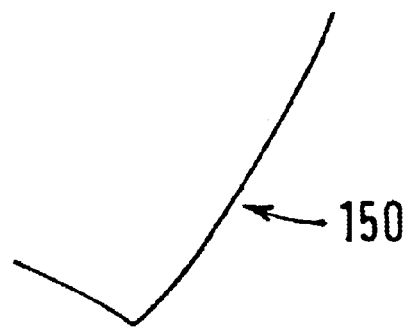
Figure 13B:
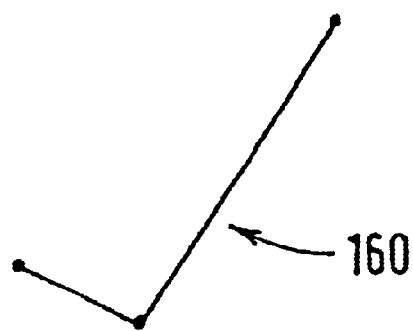
Figure 13C:
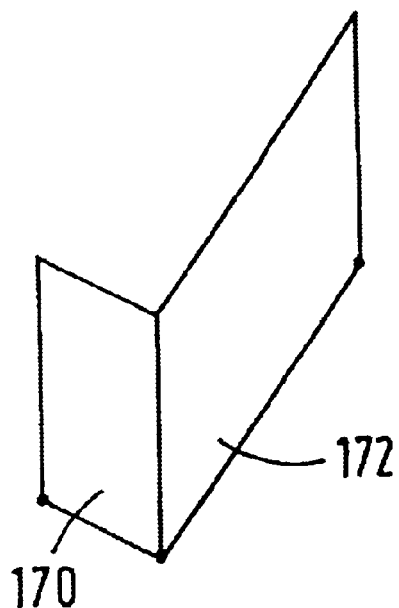
Figure 14:
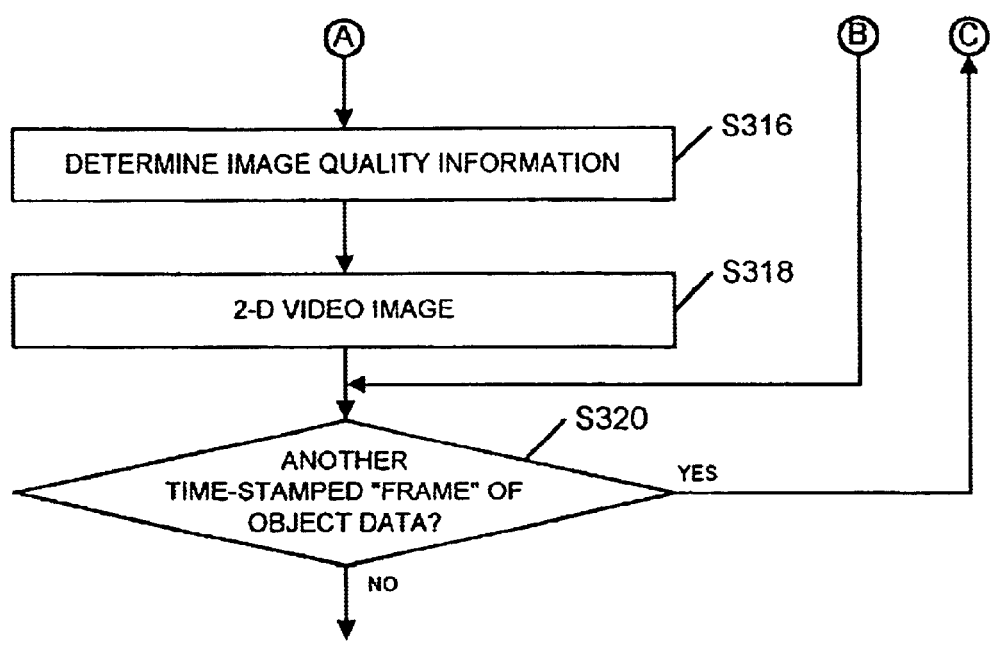
Figure 15:
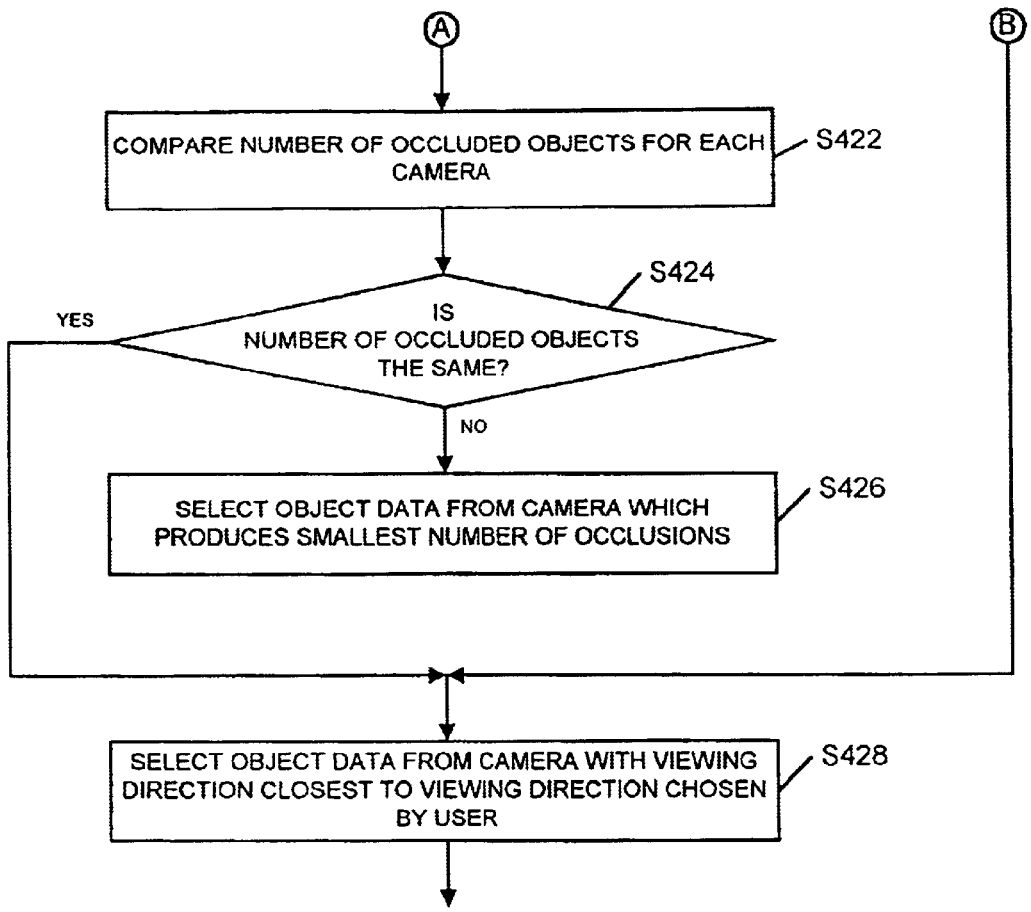
Figure 16:
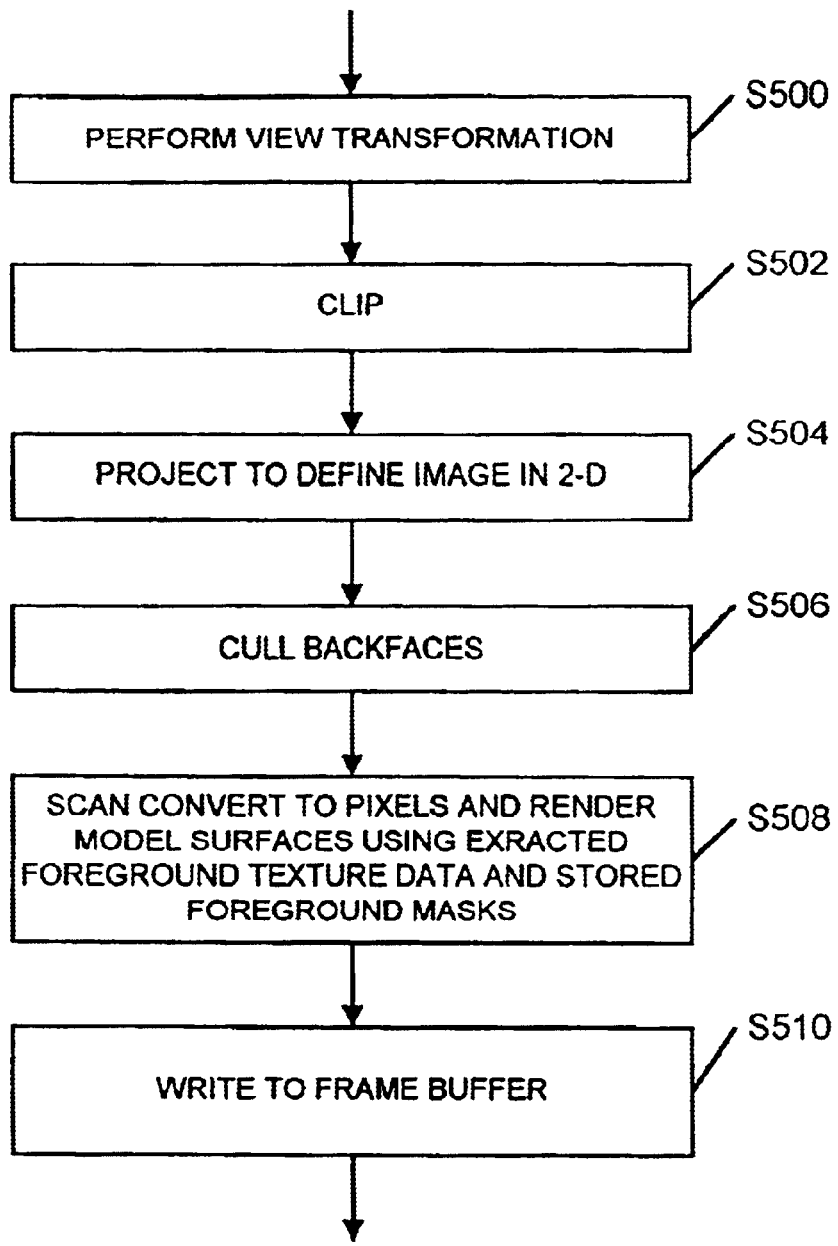
Figure 17:
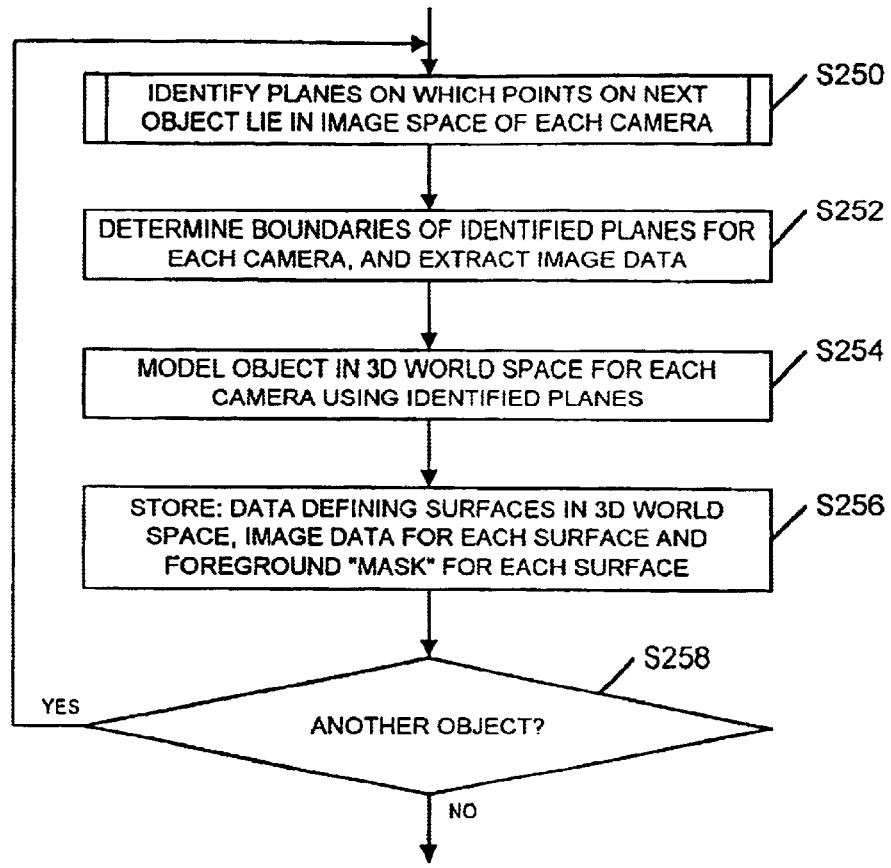
Figure 18:
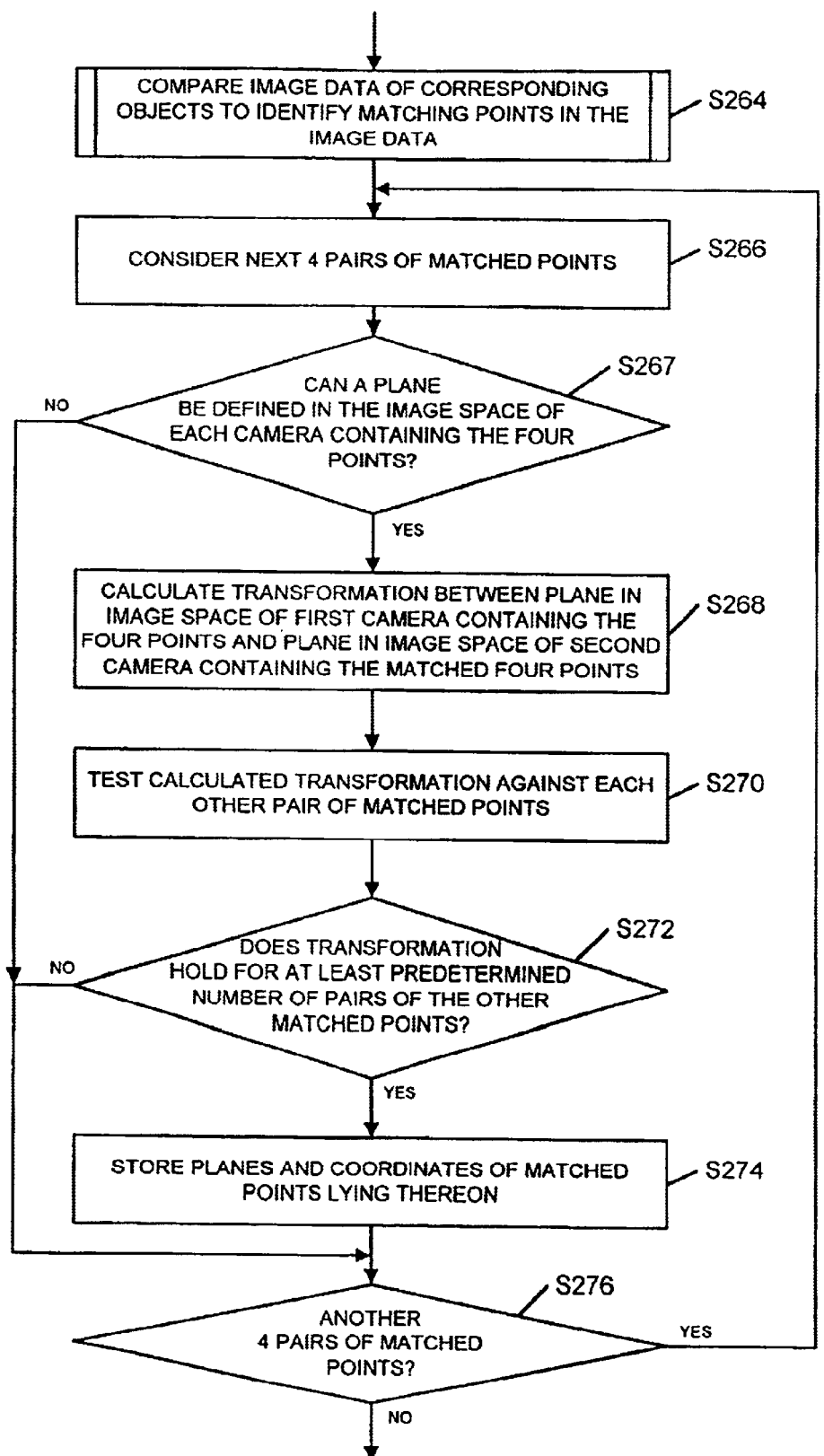
Figure 19:
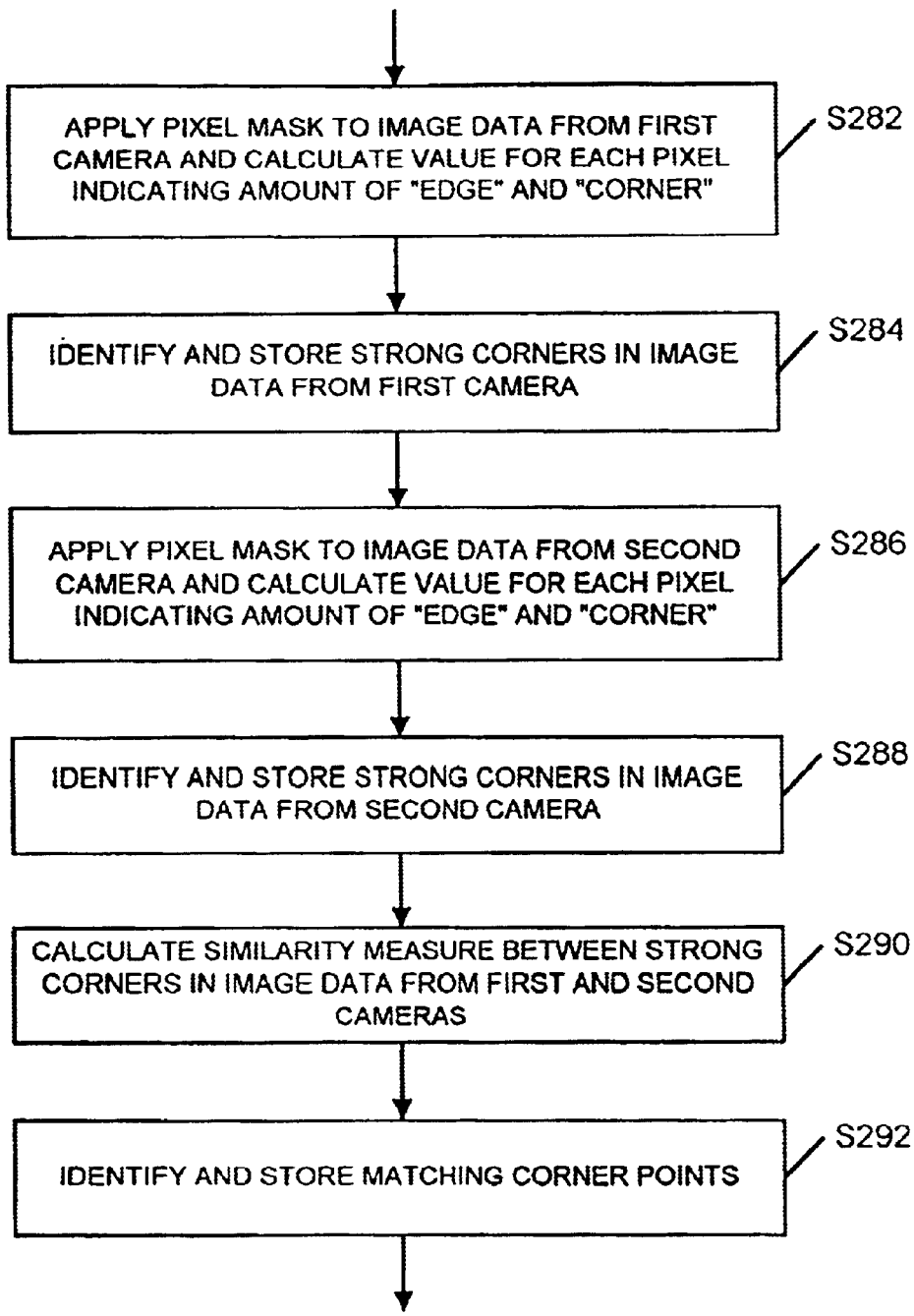
Figure 3A:
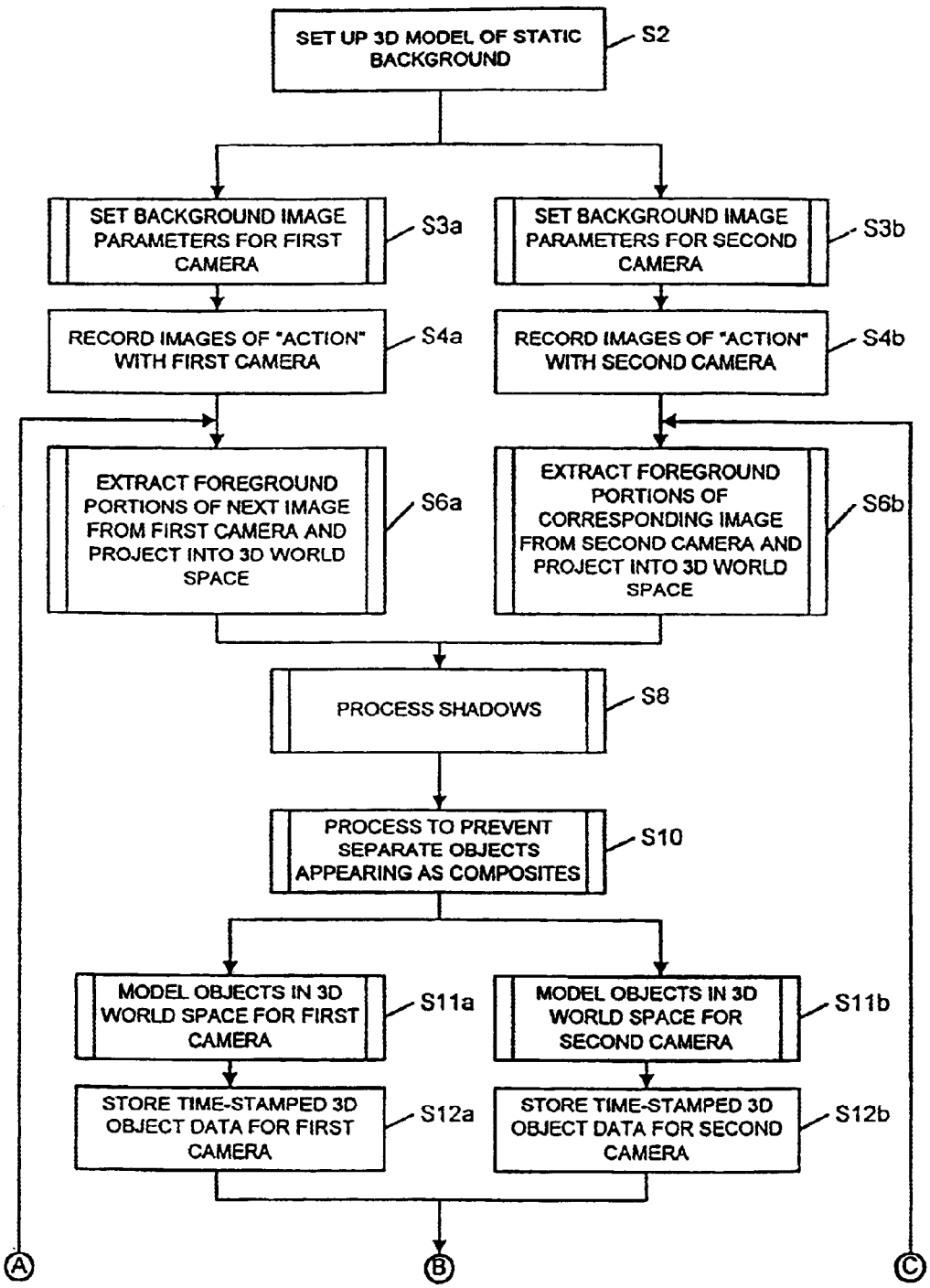
Figure 3B:
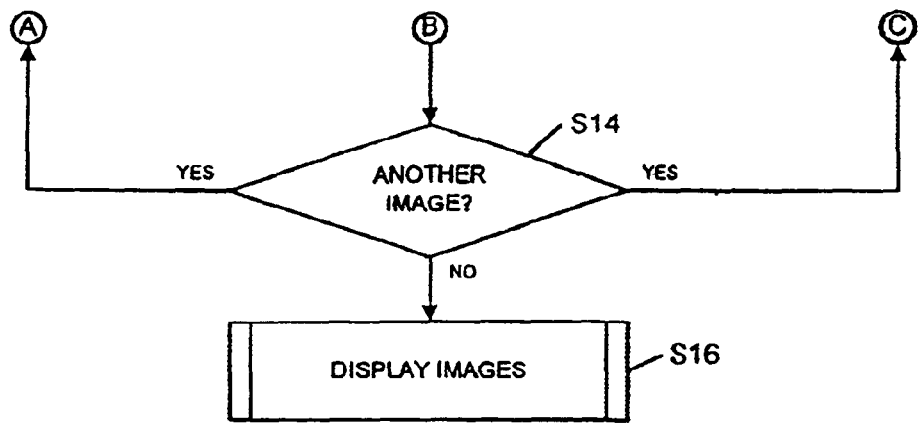
Figure 4:
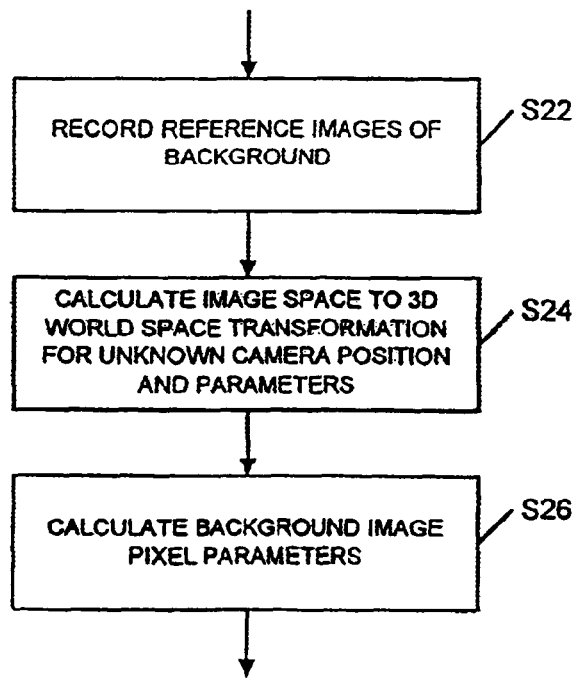
Figure 14A:
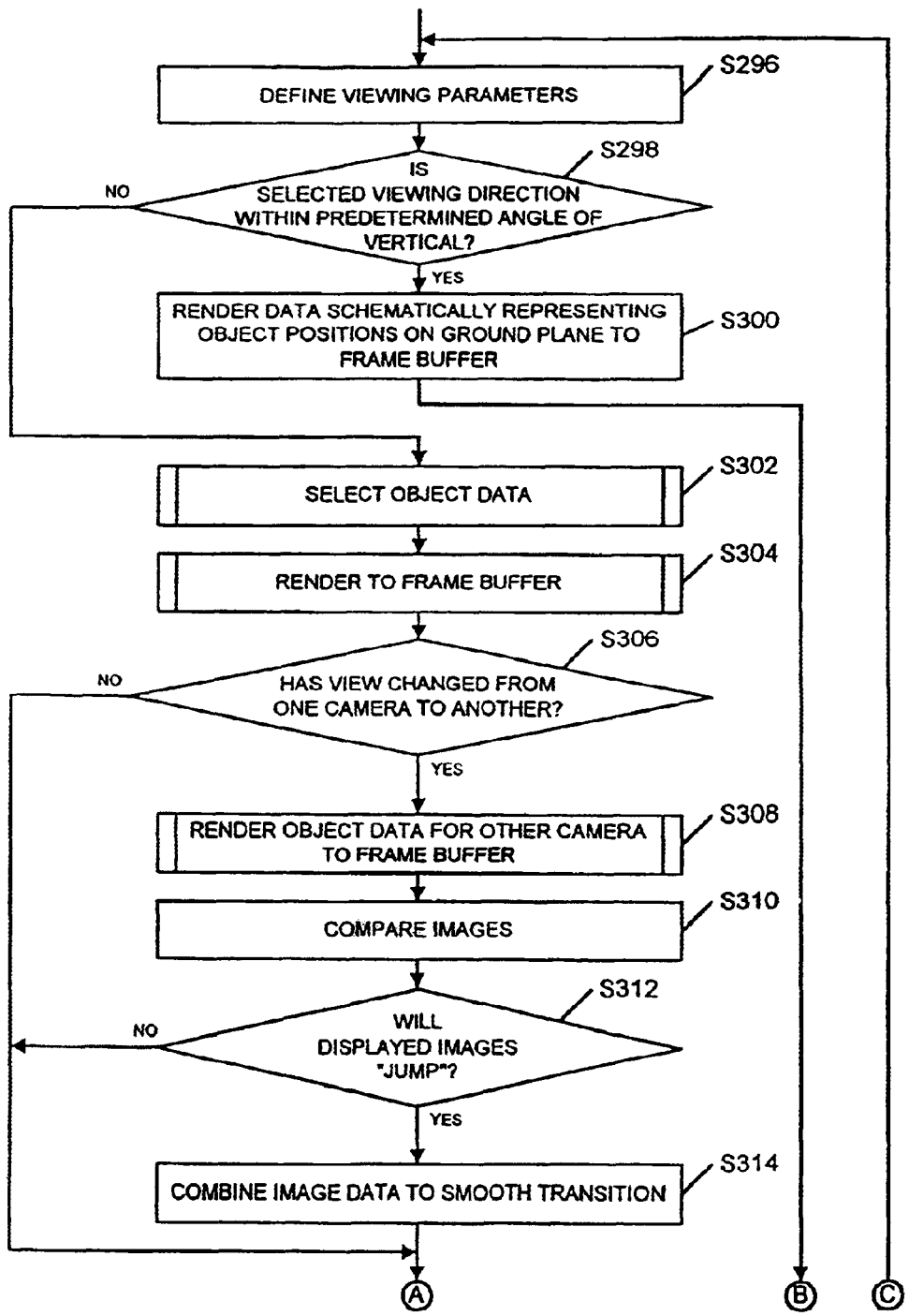
Figure 14B:
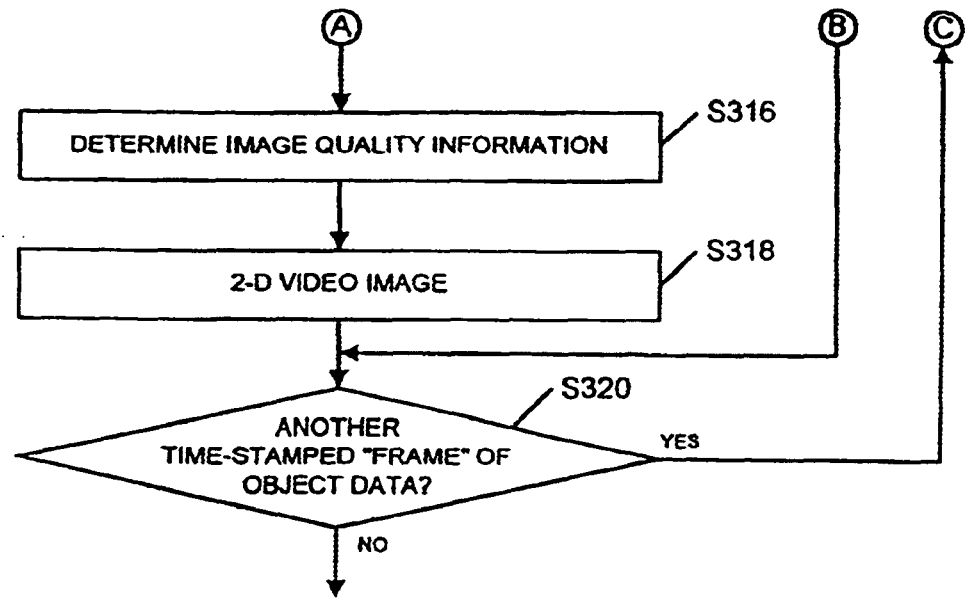
Figure 15A:
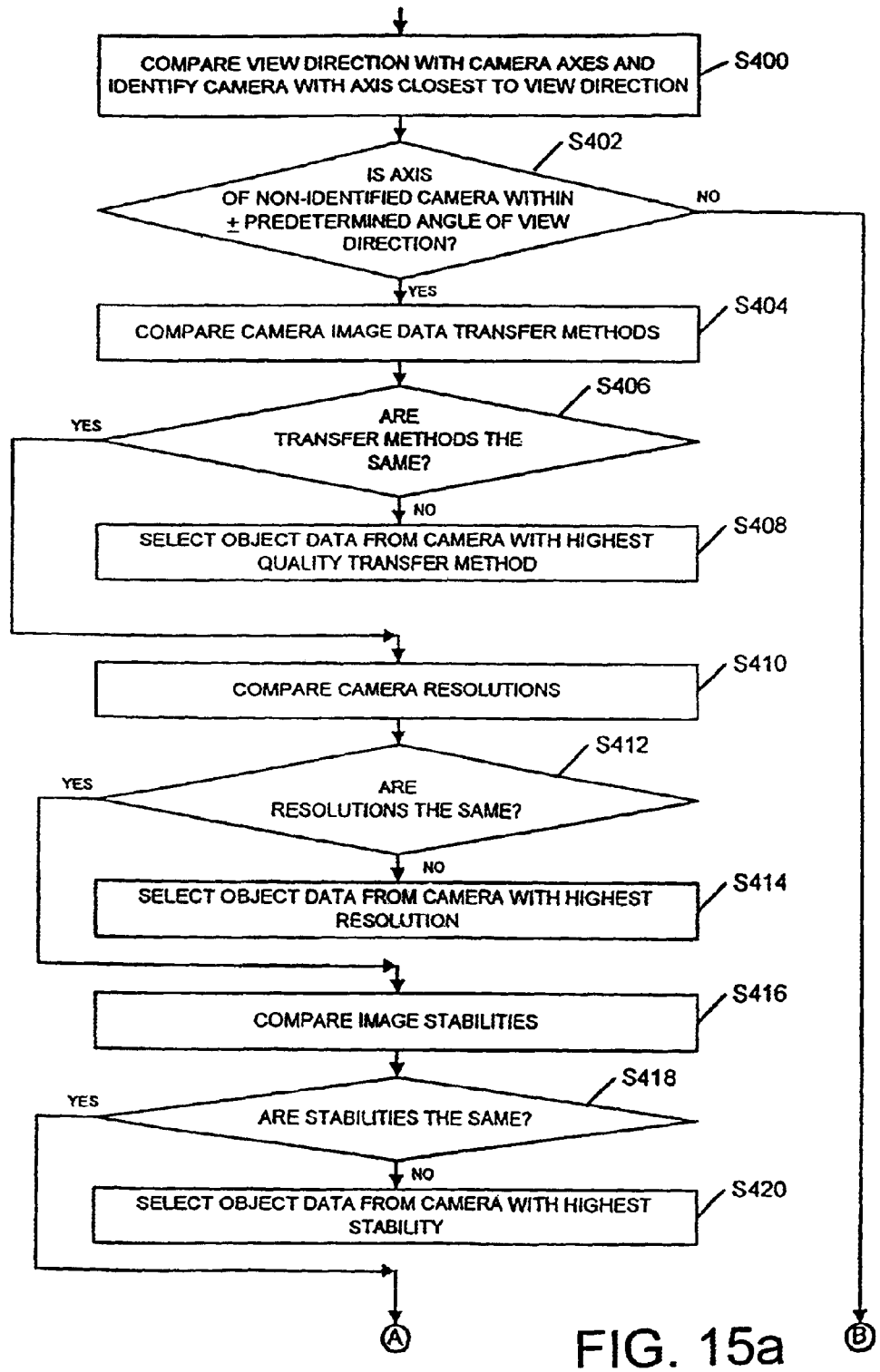
Figure 15B:
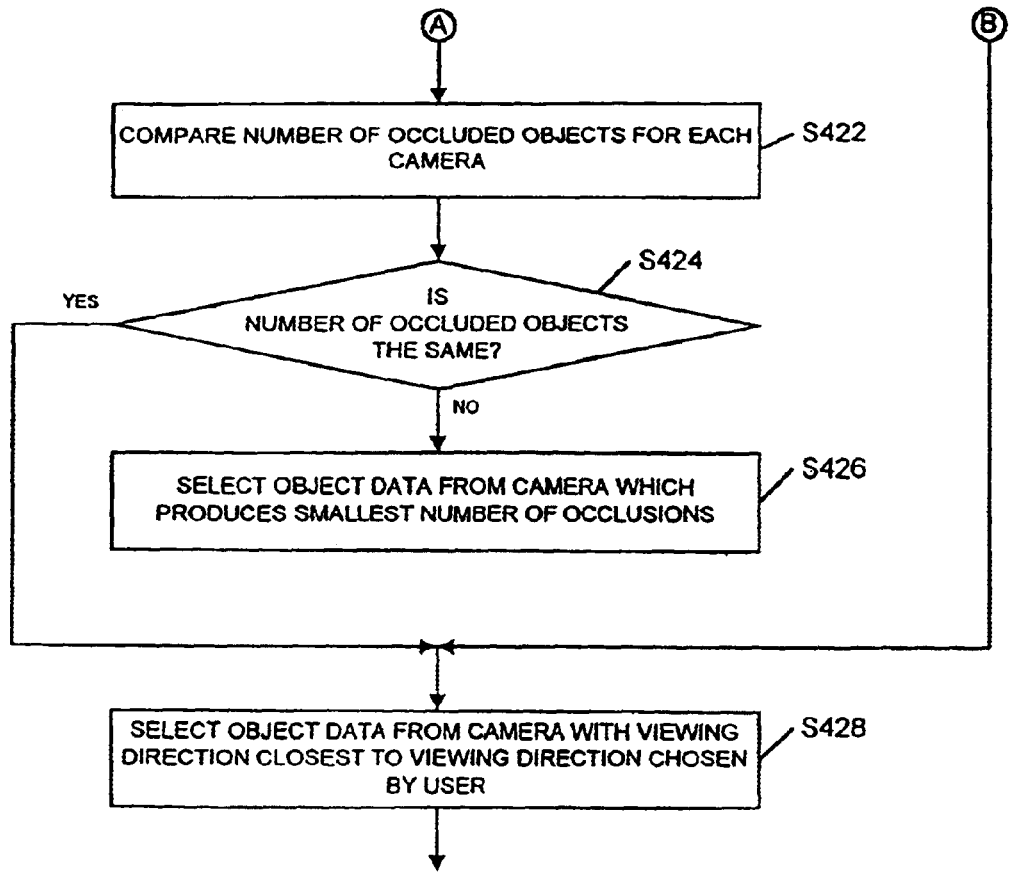

FIGS. 13a, 13b and 13c schematically illustrate the formation of a model of an object in accordance with steps S230 and S232 in FIG. 12;

FIG 14, which consists of FIGS. 14a and 14b, shows the processing operations performed at step S16 in FIG. 3;

FIG 15, which consists of FIGS. 15a and 15b, shows the processing operations performed at step S302 in FIG. 14;

FIG. 16 shows the processing operations performed at step S304 or step S308 in FIG. 14;

FIG. 17 shows the processing operations performed in a second embodiment at step S11a or step S11b in FIG. 3;

FIG. 18 shows the processing operations performed in the second embodiment at step S250 in FIG. 17; and FIG. 19 shows the processing operations performed in the second embodiment at step S264 in FIG. 18.

FIRST EMBODIMENT

Figure 1:
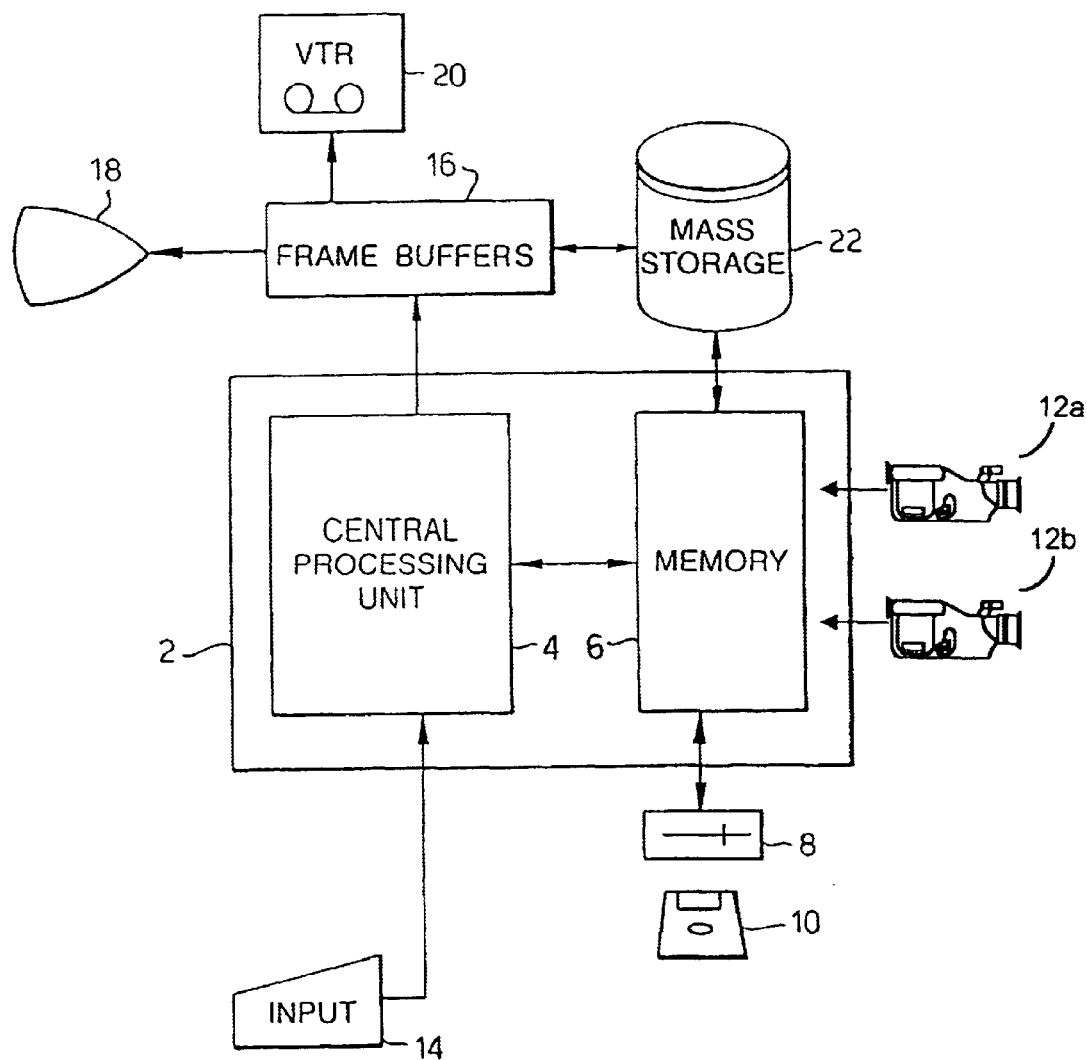

FIG. 1 is a block diagram showing the general arrangement of an image processing apparatus in a first embodiment. In the apparatus, there is provided a computer 2, which comprises a central processing unit (CPU) 4 connected to a memory 6 operable to store a program defining the operations to be performed by the CPU 4, and to store object and image data processed by CPU 4.

Coupled to the memory 6 is a disk drive 8 which is operable to accept removable data storage media, such as a floppy disk 10, and to transfer data stored thereon to the memory 6. Operating instructions for the central processing unit 4 may be input to the memory 6 from a removable data storage medium using the disk drive 8.

Image data to be processed by the CPU 4 may also be input to the computer 2 from a removable data storage medium using the disk drive 8. Alternatively, or in addition, image data to be processed may be input to memory 6 directly from a plurality of cameras (schematically illustrated as video cameras 12a and 12b in FIG. 1) which, in this embodiment, have digital image data outputs. The image data may be stored in cameras 12a and 12b prior to input to memory 6, or may be transferred to memory 6 in real time as the data is gathered by the cameras. Image data may also be input from non-digital video cameras instead of digital cameras 12a and 12b. In this case, a digitiser (not shown) is used to digitise images taken by the camera and to produce digital image data therefrom for input to memory 6. Image data may also be downloaded into memory 6 via a connection (not shown) from a local or remote database which stores the image data.

Coupled to an input port of CPU 4, there is a user-instruction input device 14, which may comprise, for example, a keyboard and/or a position-sensitive input device such as a mouse, a trackerball, etc.

Also coupled to the CPU 4 is a memory buffer 16, which, in this embodiment, comprises three frame buffers each arranged to store image data relating to an image generated by the central processing unit 4, for example by providing one (or several) memory location(s) for a pixel of an image. The value stored in the frame buffer for each pixel defines the colour or intensity of that pixel in the image.

Coupled to the frame buffers 16 is a display unit 18 for displaying image data stored in a frame buffer 16 in a conventional manner. Also coupled to the frame buffers 16 is a video tape recorder (VTR) 20 or other image recording device, such as a paper printer or 35 mm film recorder.

A mass storage device 22, such as a hard disk drive, having a high data storage capacity, is coupled to the memory 6 (typically via the CPU 4), and also to the frame buffers 16. The mass storage device 22 can receive data processed by the central processing unit 4 from the memory 6 or data from the frame buffers 16 which is to be displayed on display unit 18. Data processed by CPU 4 may also be exported from computer 2 by storing the data via disk drive 8 onto a removable storage device, or by transmitting the data as a signal, for example over a communication link such as the Internet, to a receiving apparatus.

The CPU 4, memory 6, frame buffer 16, display unit 18 and the mass storage device 22 may form part of a commercially available complete system, such as a personal computer (PC).

Operating instructions for causing the computer 2 to perform as an embodiment of the invention can be supplied commercially in the form of programs stored on floppy disk 10 or another data storage medium, or can be transmitted as a signal to computer 2, for example over a datalink (not shown), so that the receiving computer 2 becomes reconfigured into an apparatus embodying the invention. The operating instructions may also be input via user-input device 14.

Figure 2:
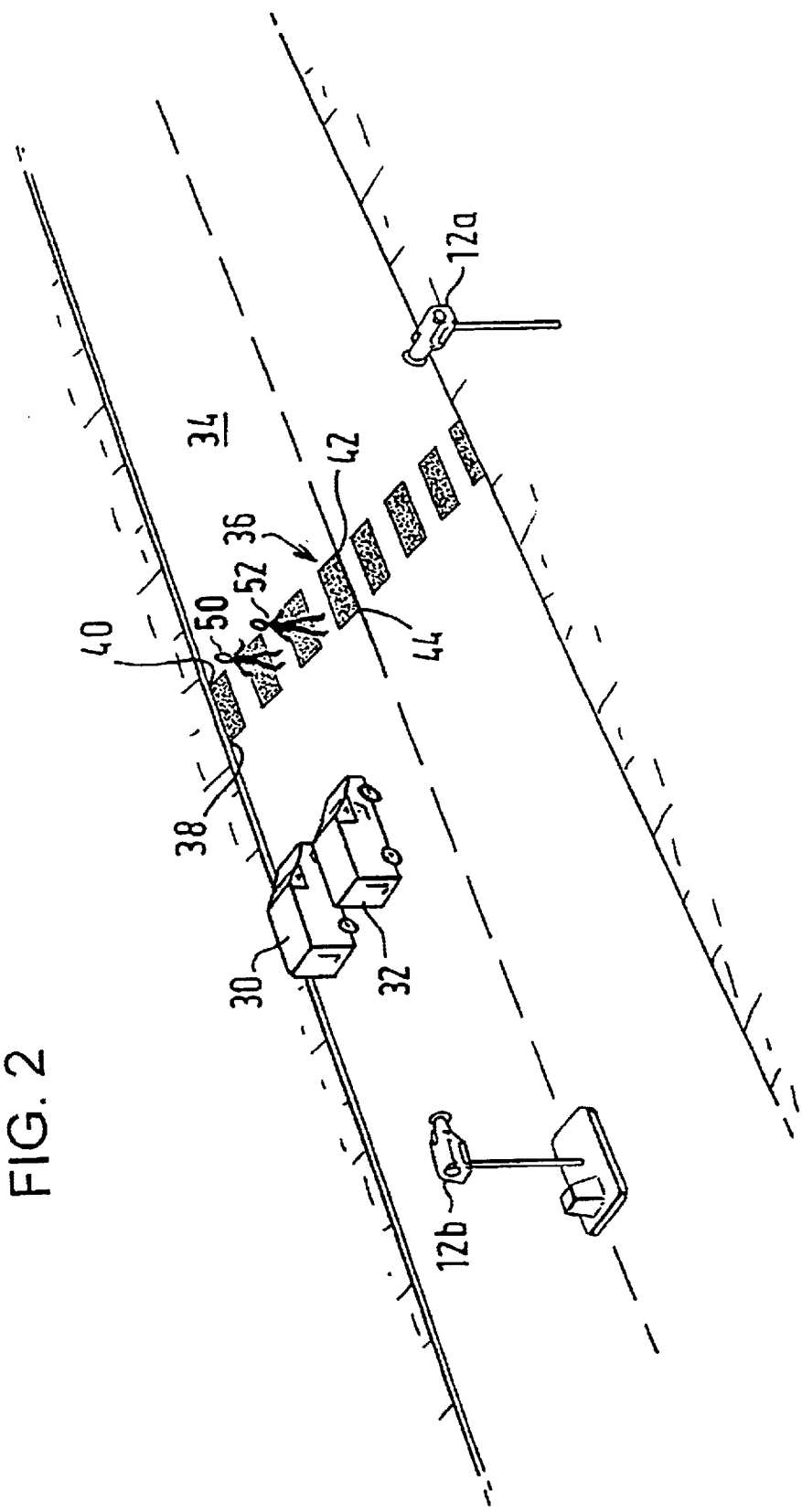

FIG. 2 schematically illustrates the collection of image data for processing by the CPU 4 in an embodiment.

By way of example, FIG. 2 shows two vehicles, 30, 32 travelling along a road 34 towards a pedestrian crossing 36 at which two people 50, 52 are crossing. The road 34, crossing 36, and the movements of the vehicles, 30, 32 and people 50, 52 thereon are recorded by two video cameras 12a and 12b which, in this embodiment, are mounted at fixed viewing positions, have fixed viewing directions and have fixed zoom (magnification) settings. Cameras 12a and 12b are arranged so that their fields of view overlap for at least the portion of the road 34 and crossing 36 on which the vehicles 30, 32 and people 50, 52 may move.

FIG. 3 shows the image processing operations performed in this embodiment. In FIG. 3, processing steps which are the same but which are performed separately on the data from video camera 12a and the data from video camera 12b are identified with the same reference number together with the letter "a" or "b" (referring to the camera 12a or the camera 12b respectively) depending upon the video data processed.

Referring to FIG. 3, at step S2, a three-dimensional computer model of the static background (that is, non-moving parts) against which objects will move is created by a user. Thus, with reference to the example shown in FIG. 2, the road 34, crossing 36 and their surroundings are modelled. This is carried out in a conventional way, for example using a commercially available modelling package to model the background as separate objects, or using a modelling package such as Photomodeller by EOS Systems Inc. to facilitate the modelling of the background from images.

At steps S3a and S3b, image parameters for the background scene of each camera are set.

Figure 4:
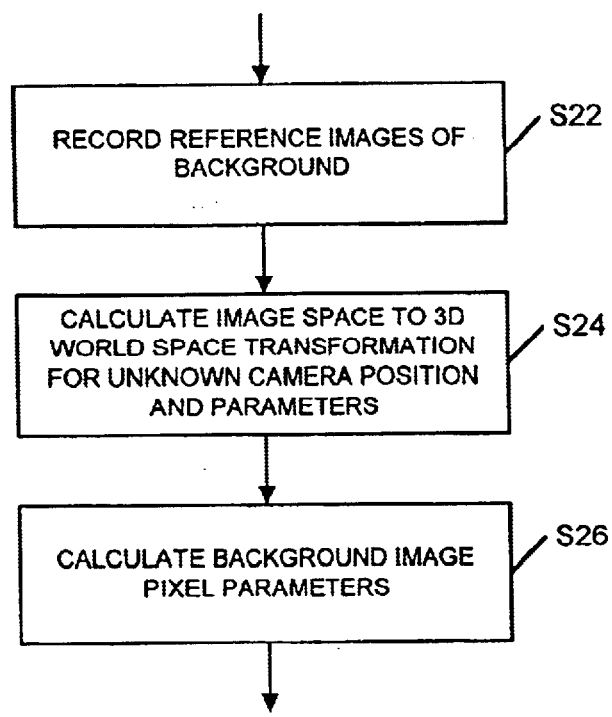
FIG. 4 shows the processing operations performed at step S3a or step S3b in FIG. 3.

FIG. 4 shows the processing steps performed at step S3a and step S3b in FIG. 3. The processing is the same for each camera, and accordingly the processing for only camera 12a will be described.

Referring to FIG. 4, at step S22, a plurality of reference images of the static background are recorded using camera 12a. In this embodiment, ten frames of video are recorded. A plurality of reference images are recorded to take account of temporal changes in the lighting conditions of the background, noise, and unwanted movements within the "static" background (which could be caused by moving branches and leaves on trees etc, for example), as will be explained further below.

At step S24, the transformation between image space (that is, an image recorded by camera 12a) and three-dimensional (3D) world space (that is, the space in which the three-dimensional computer model was created at step S2) is calculated.

The transformation defines a mapping between the ground plane (the plane upon which the objects move) in image space and the ground plane in the 3D world space (3D computer model). This transformation is calculated because, in this embodiment, the absolute position of the camera, or the position of the camera relative to the scene being viewed, is not previously determined, and similarly the camera imaging parameters (focal length, size of the charge coupled device, zoom setting, etc) are not previously determined. The transformation enables a representation of an object to be created in the 3D computer model in a reliable and efficient way on the basis of the position and extents of the object in image space, as will be described later.

To calculate the transformation at step S24, one of the images of the background recorded at step S22 is displayed to a user on display device 18, and the user designates, upon prompting by CPU 4, a plurality of points (in this embodiment, four points) in the image which lie on a plane on which objects in the scene will move and which also lie within the field of view of both camera 12a and camera 12b. Thus, referring to the example shown in FIG. 2, corner points 38, 40, 42 and 44 defined by the pedestrian crossing markings may be designated (these lying on the road surface 34 on which the vehicles 30, 32 and people 50, 52 will move). The points in the three-dimensional computer model created at step S2 corresponding to the points identified in the video image are also defined by the user. For example, a view of the three-dimensional computer model for a predetermined viewing direction may be displayed to the user on display device 18 and the corresponding points designated using the input means 14.

Using the positions of the points designated in the video FIG. 10 image and the positions of the corresponding points designated in the three-dimensional computer model, CPU 4 then calculates the transformation between image space and 3D world space in a conventional manner, for example using the equation:

$$\begin{pmatrix} X_n \\ Y_n \\ 1 \end{pmatrix} = \begin{pmatrix} A & B & C \\ D & E & F \\ G & H & 1 \end{pmatrix} \begin{pmatrix} x_n \\ y_n \\ 1 \end{pmatrix} \quad (1)$$

where: n=1 . . . 4; $X_n, Y_n$ are points in world space; $x_n, y_n$ are points in image space; and A–H are obtained by:

$$\begin{pmatrix} A \\ B \\ C \\ D \\ E \\ F \\ G \\ H \end{pmatrix} = \begin{pmatrix} x_1 & y_1 & 1 & 0 & 0 & 0 & -x_1X_1 & -y_1X_1 \\ 0 & 0 & 0 & x_1 & y_1 & 1 & -x_1Y_1 & -y_1Y_1 \\ x_2 & y_2 & 1 & 0 & 0 & 0 & -x_2X_2 & -y_2X_2 \\ 0 & 0 & 0 & x_2 & y_2 & 1 & -x_2Y_2 & -y_2Y_2 \\ x_3 & y_3 & 1 & 0 & 0 & 0 & -x_3X_3 & -y_3X_3 \\ 0 & 0 & 0 & x_3 & y_3 & 1 & -x_3Y_3 & -y_3Y_3 \\ x_4 & y_4 & 1 & 0 & 0 & 0 & -x_4X_4 & -y_4X_4 \\ 0 & 0 & 0 & x_4 & y_4 & 1 & -x_4Y_4 & -y_4Y_4 \end{pmatrix}^{-1} \begin{pmatrix} X_1 \\ Y_1 \\ X_2 \\ Y_2 \\ X_3 \\ Y_3 \\ X_4 \\ Y_4 \end{pmatrix} \quad (2)$$

This defines a transformation between the ground plane in image space and the ground plane in the 3D computer model (3D world space).

When step S24 is performed for camera 12b in step S3b, the four reference points selected from the image recorded by camera 12b and the four reference points in the three-dimensional computer model are chosen to be the same as the reference points selected at step S24 for camera 12a. In this way, the scale of the 3D world space for cameras 12a and 12b is made the same.

At step S26, CPU 4 calculates reference image pixel parameters for the static background. This is performed by calculating the mean grey level, $\mu$, for each pixel from the plurality of images recorded at step S22. That is, the grey level for corresponding pixels in each ten frames is considered and the average taken. The variance, $\sigma$, of the determined mean is also calculated. A "window" for the grey level of each pixel is then set as $\mu \pm (2\sigma + F)$ where F is an error factor set to take account of variables such as the gain of video camera 12a, and noise etc. In this embodiment, the total number of grey scale levels is 256, and the error factor F is set to 5 grey scale levels.

The "window" set at step S26 for each pixel represents the spread of grey scale values which the pixel should take if it forms part of an image of the static background (the viewing position and direction of video camera 12a being constant so that the grey scale value of a pixel forming part of the background should only change in dependence upon lighting changes and errors due to noise). As will be described below, these "windows" are used to identify objects which are not part of the background (and hence cause the pixel values recorded by camera 12a to move outside the defined windows).

Referring again to FIG. 3, at steps S4a and S4b, images of "action", that is images in which there is movement of an object over the background (for example movement of vehicles 30, 32 on the road surface 34 and people 50, 52 on the pedestrian crossing 36), are recorded by video camera 12a and video camera 12b. The video frames recorded by cameras 12a and 12b are time-stamped to enable temporally corresponding frames to be used in subsequent processing.

At steps S6a and S6b, CPU 4 processes time-synchronised images, that is, image data for an image recorded by camera 12a at step S4a and an image recorded at the same time by camera 12b at step S4b, to identify objects in the images which are not part of the "static background", that is, objects which are moving over the background or are stationary against the background. CPU 4 then projects these objects into the common world space (three-dimensional computer model) defined at step S2.

Figure 5:
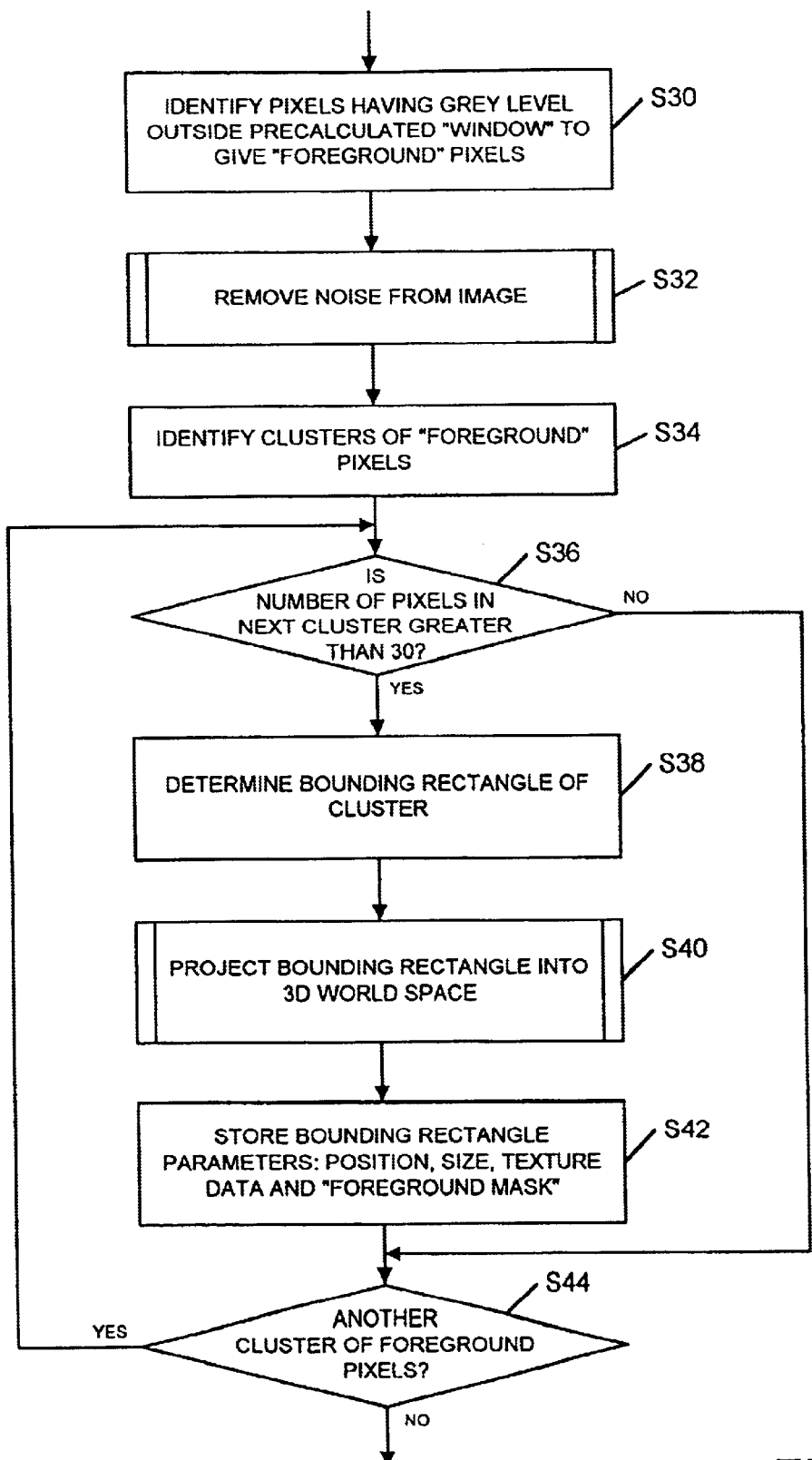
FIG. 5 shows the processing operations performed at step S6a or step S6b in FIG. 3.

FIG. 5 shows the processing operations performed by CPU 4 at step S6a and step S6b. The processing is the same for each camera, and accordingly the processing for only camera 12a will be described.

Referring to FIG. 5, at step S30, CPU 4 compares the grey level of each pixel in the image data being processed with the grey scale "window" previously set at step S26 for the corresponding pixel in the image. Any pixel which has a grey level outside the predefined window for that pixel is considered potentially to be a "foreground" pixel, that is, a pixel which forms part of an object moving or stationary on the background. At step S30, CPU 4 therefore keeps a record of which pixels have grey scale levels outside the corresponding precalculated window.

At step S32, CPU 4 processes the image data to remove noise. Such noise may have been introduced into the image data in a number of ways; for example by quantum effects if video camera 12a is a charged coupled device (CCD) camera, by data compression techniques used to compress the data from camera 12a, by a frame grabber used to capture frames of the video data for processing by CPU 4 etc, or may be noise which often occurs in image data near the boundaries of moving objects.

Figure 6:
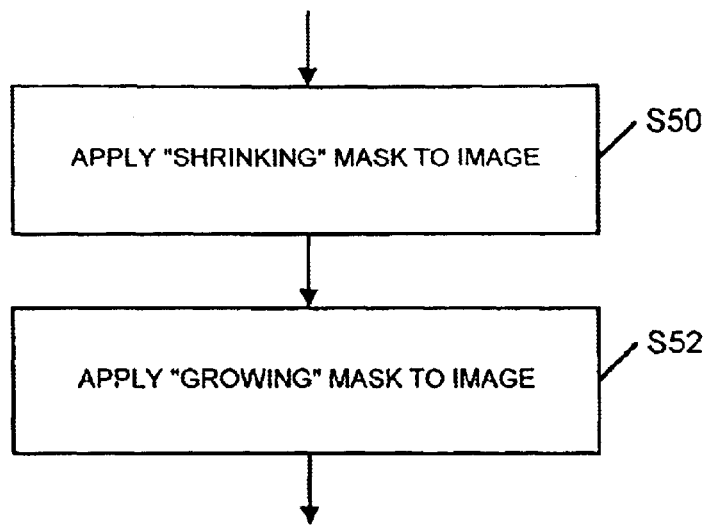
FIG. 6 shows the processing operations performed at step S32 in FIG. 5.

FIG. 6 shows the operations performed by CPU 4 in processing the image data to remove noise at step S32 in FIG. 5.

Referring to FIG. 6, at step S50, CPU 4 applies a "shrinking" mask to the image data in a conventional manner, for example as described in "Computer and Robot Vision Volume 2" by R. M. Haralick and L. G. Shapiro, Addison-Wesley Publishing Company, 1993 ISBN 0-201-56943-4 (v.2), page 583. This operation involves applying a 3×3 pixel mask to the image data and counting the number of "foreground" pixels (identified at step S30) and the number of "background" pixels within each set of nine pixels defined by the mask. If the majority of pixels within the mask are background pixels, then the centre pixel is defined to be a background pixel (even if it was previously identified as a foreground pixel). No change is made if the majority of pixels within the mask are foreground pixels. This operation is repeated until the shrinking mask has been applied over the whole image data.

At step S52, CPU 4 applies a "growing mask" to the image in a conventional manner, for example as described in "Computer and Robot Vision Volume 2" by R. M. Haralick and L. G. Shapiro, Addison-Wesley Publishing Company, 1993 ISBN 0-201-56943-4 (v.2), page 583. This operation is performed in the same way as step S50, with the exception that, if the majority of pixels within the mask are foreground pixels, then the centre pixel is defined to be a foreground pixel (even if it was previously identified as a background pixel) and no change is made if the majority of pixels within the mask are background pixels. The effect of step S52 is to return pixels which were erroneously set as background pixels by the shrinking mask operation in step S50 to foreground pixels.

Referring again to FIG. 5, at step S34, CPU 4 processes the data to identify clusters of foreground pixels. This is performed in a conventional manner for identifying clusters of pixels with the same characteristics by scanning the image data to identify a foreground pixel and then considering neighbouring pixels in an iterative manner to identify all connected foreground pixels.

At step S36, CPU 4 considers the next cluster of foreground pixels identified at step S34 (this being the first cluster the first time step S36 is performed) and determines whether the number of pixels in the cluster is greater than 30.

If the number of pixels is less than or equal to 30, the cluster is considered to represent noise since it forms a relatively small part of the overall image (768 pixels by 512 pixels in this embodiment). In this case, the cluster is not processed further. On the other hand, if the number of pixels in the cluster is greater than 30, then the cluster is considered to represent a foreground object and further processing is performed.

At step S38, CPU 4 determines the extents of the cluster of pixels. In this embodiment, CPU 4 performs this operation by determining the bounding rectangle of the cluster within the two-dimensional image having sides parallel to the sides of the image.

At step S40, CPU 4 projects the bounding rectangle determined at step S38 into the three-dimensional world space in which the computer model was formed at step S2 using the transformation calculated at step S24. This produces a single plane in the three-dimensional computer model at a position determined by the position of the object in the video image. In this embodiment, the plane in the three-dimensional computer model is defined to be vertical, and has its base on the surface within the 3D model defined by the points selected by the user at step S24 (since it is assumed that objects within the scene being viewed move on the corresponding real-world surface—the road surface 34 in the example of FIG. 2).

Figure 7:
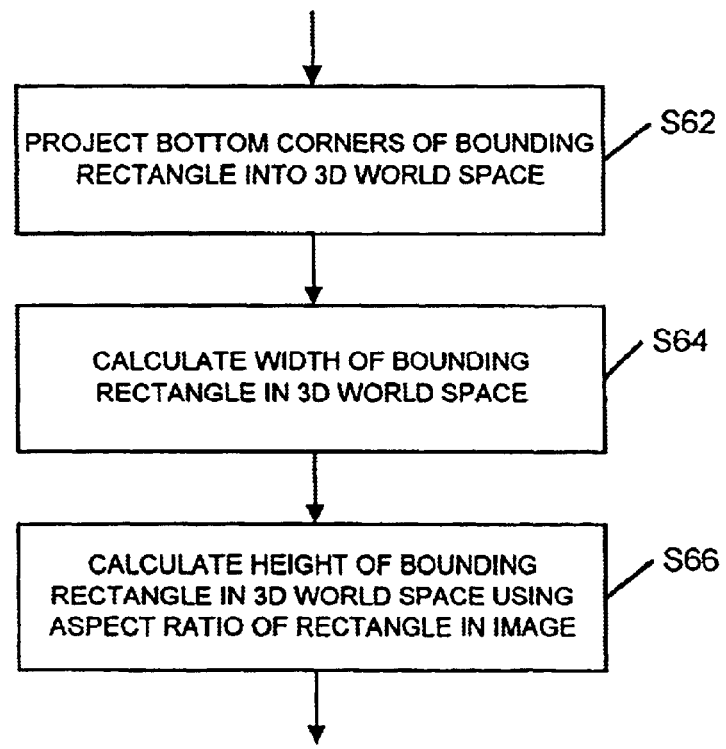
FIG. 7 shows the processing operations performed at step S40 in FIG. 5 (and at steps S106 and S112 in FIG. 8)

FIG. 7 shows the operations performed by CPU 4 in transforming the bounding plane at step S40 in FIG. 5.

Referring to FIG. 7, at step S62, CPU 4 projects the two corners of the bounding rectangle base from image space into three-dimensional world space by transforming the coordinates using the transformation previously calculated at step S24. Each corner of the bounding rectangle base is transformed to a point in the three-dimensional world space of the computer model which lies on the surface defined by the points previously selected at step S24.

At step S64, CPU 4 calculates the width of the bounding rectangle in three-dimensional world space by determining the distance between the corners transformed at step S62.

At step S66, CPU 4 calculates the height of the bounding rectangle in three-dimensional world space using the ratio of the width-to-height of the bounding rectangle in image space and the width in three-dimensional world space calculated at step S64 (that is, the aspect ratio of the bounding rectangle is kept the same in image space and three-dimensional world space).

Referring again to FIG. 5, at step S42 CPU 4 stores the position and size of the bounding rectangle in three-dimensional world space previously calculated at step S40, together with texture data for the bounding rectangle extracted from the bounding rectangle within the video image, and a "foreground mask", that is, a mask identifying which of the pixels within the bounding rectangle correspond to foreground pixels. The extracted texture data effectively provides a texture map for the bounding rectangle in the 3D world space.

At step S44, CPU 4 determines whether there is another cluster of foreground pixels identified at step S34 which has not yet been processed. Steps S36 to S44 are repeated until all clusters of foreground pixels for the video frame under consideration have been processed in the manner described above. At that stage, a three-dimensional computer model has been produced of the objects seen by camera 12a. In the model, a single planar surface (bounding rectangle) has been placed to represent the position of each moving object, and texture image data for these moving objects has been stored. This data therefore corresponds to a three-dimensional computer model of a single two-dimensional image (video frame) from camera 12a. (A corresponding three-dimensional computer model for the temporally-corresponding frame of image data recorded by camera 12b is produced at step S6b.)

Referring again to FIG. 3, at step S8, CPU 4 processes the three-dimensional computer models created at steps S6a and S6b to identify parts of objects in the three-dimensional computer models which correspond to shadows in the initial video images. Each object and its associated shadow are then stored as separate objects in the computer model. This processing will now be described.

As described above, in this embodiment, each foreground object identified in a video image is assumed to touch the ground in the real-world at its lowest point, and the corresponding planar bounding rectangle for the object is placed in the 3D world space with its base on the ground surface within the 3D model. However, any shadows which an object casts will be identified as part of the object when steps S6a and S6b described above are performed because a shadow is attached to, and moves with, an object in an image. The bounding rectangle will therefore enclose both the shadow and the object, and hence if the shadow is beneath the object in the video image, the base of the bounding rectangle will be determined by the lowest point of the shadow. In this situation, the object will effectively stand on its shadow in the three-dimensional model. The processing performed by CPU 4 at step S8 addresses this problem, therefore.

Figure 8:
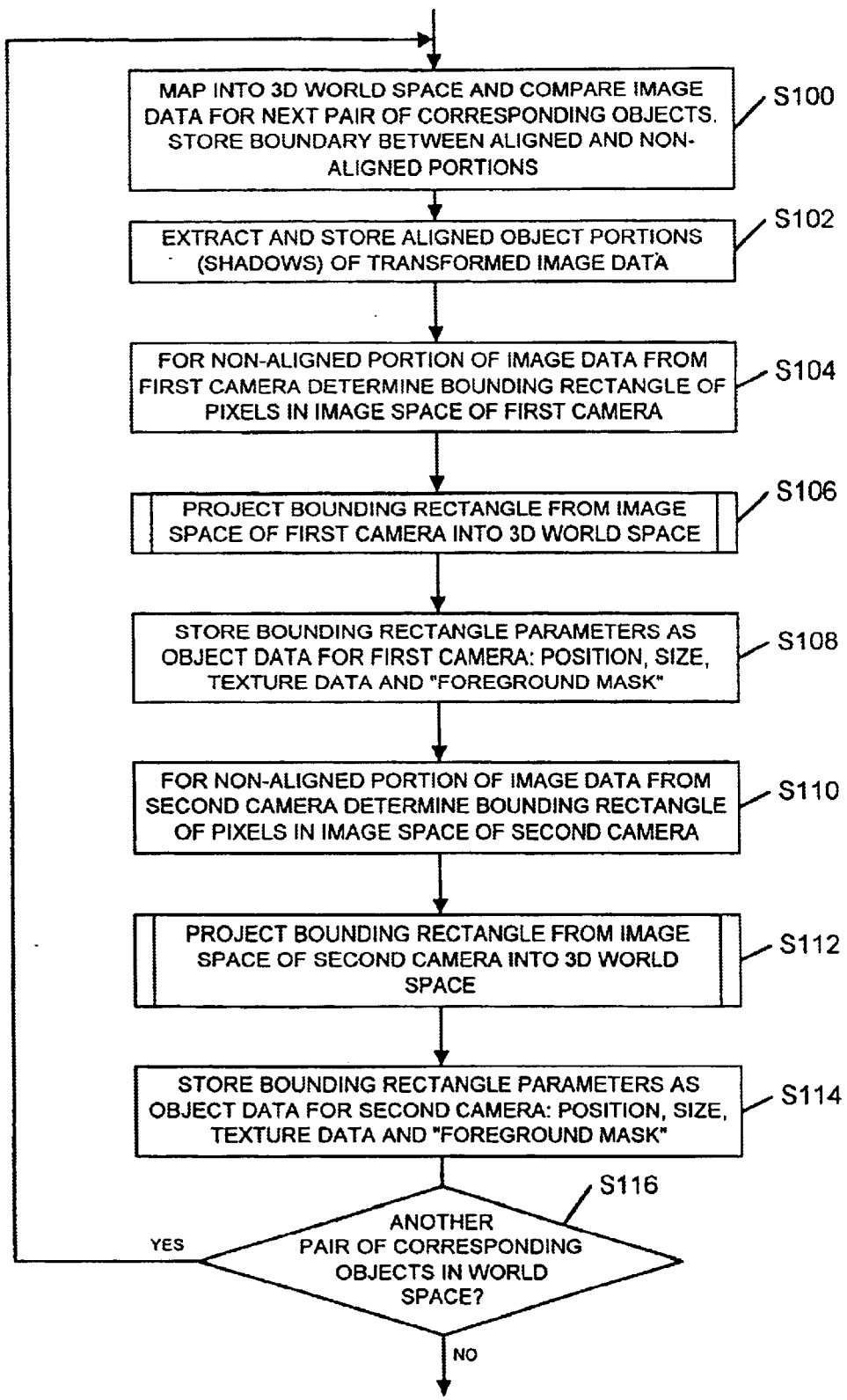
FIG. 8 shows the processing operations performed at step S8 in FIG. 3.

FIG. 8 shows the processing operations performed by CPU 4 when carrying out the shadow processing at step S8 in FIG. 3.

Referring to FIG. 8, at step S100, CPU 4 transforms each pixel of the image data for the next pair of corresponding objects (this being the first pair the first time step S100 is performed) from image space into the 3D world space. That is, CPU 4 maps each pixel of the image data stored at step S42 (FIG. 5) for an object recorded by camera 12a from the image space of camera 12a to the 3D world space, and maps each pixel of the image data stored for the corresponding object recorded by camera 12b in the corresponding temporal frame from the image space of camera 12b to the 3D world space. In this embodiment, corresponding objects are identified from the coordinates of the corners of the bounding rectangle bases in the 3D world space—a given object will have corner coordinates within a predetermined distance of the corner coordinates of the corresponding object, and the mapping of the pixel of the image data is performed using the transformation previously defined for each camera at step S24.

The mapping between the image space of each camera and the 3D world space of the computer-model calculated at step S24 is only valid for points which are on the real-world ground plane (the road surface in the example of FIG. 2). Consequently, after this transformation has been applied at step S100, the transformed image data for the shadow of an object recorded by one camera will align in the 3D world space with the transformed image data for the shadow of the same object recorded by the other camera because the shadows lie on the real-world ground plane. On the other hand, the objects themselves are not on the real-world ground plane and, therefore, the transformed image data will not align in the 3D world space for the different cameras (this image data having being "incorrectly" mapped into the 3D world space when the mapping transformation is applied).

Accordingly, also at step S100, CPU 4 compares the transformed image data for the corresponding objects. In this embodiment, the comparison is performed in a conventional manner, for example based on the method described in Chapter 16 of "Computer and Robot Vision Volume 2" by R. M. Haralick and L. G. Shapiro, Addison-Wesley Publishing Company, 1993, ISBN 0-201-56943-4 (v.2), by comparing the transformed pixel values on a pixel-by-pixel basis and identifying pixels as being the same if their grey scale values (and/or colour values) are within a predetermined amount of each other (in this embodiment 10 grey levels within a total of 256 levels). CPU 4 stores data defining the boundary between the aligned portion of the object data (the shadow) and the non-aligned portion (the object) for subsequent use (this boundary effectively representing the "footprint" of the object on the ground, that is, the outline of the points at which the object touches the ground).

At step S102, CPU 4 extracts the portion of the corresponding objects which was identified at step S100 as being aligned. As noted above, this portion corresponds to the shadow of the object, and is stored by CPU 4 as a separate object on the ground plane of the 3D model for each camera.

At step S104, CPU 4 considers the image data recorded by camera 12a which was identified in step S100 as being non-aligned with the transformed image data from the corresponding object recorded by camera 12b. CPU 4 determines the bounding rectangle of this image data in the image space of camera 12a (this step corresponding to step S38 in FIG. 5 but this time for the object without its shadow).

At step S106, CPU 4 projects the new bounding rectangle determined at step S104 from the image space of the first camera into the 3D world space. This step corresponds to, and is performed in the same way as, step S40 in FIG. 5.

At step S108, CPU 4 stores the position and size of the transformed bounding rectangle, together with the image data and associated "foreground mask" as object data for the 3D model of the first camera (this step corresponding to step S42 in FIG. 5).

The object data stored at step S102 (for the shadow) and the object data stored at step S108 (for the object without its shadow) replaces the composite object data previously stored for the object and its shadow at step S42.

At steps S110 to S114, CPU 4 repeats steps S104 to S108 for the second camera (camera 12b). Again, the data stored at steps S110 and S114 for the shadow and the object as separate objects replaces the composite data previously stored at step S42 for the second camera.

At step S116, CPU 4 determines whether there is another pair of corresponding objects in world space to be processed. Steps S100 to S116 are repeated until all corresponding objects have been processed in the manner described above.

Referring again to FIG. 3, at step S10, CPU 4 processes the object data for the different cameras to determine whether any object is actually made up of two objects which should be represented separately, and to perform appropriate correction. This processing is performed for objects, but not for shadows.

By way of example, FIG. 9a schematically shows one configuration of the people 50, 52 and the cameras 12a and 12b which may lead to two objects being represented as a single object in the 3D world space of camera 12a.

In the example of FIG. 9a, the viewing direction of camera 12a is such that the person 50 is directly behind the person 52. In this situation, as illustrated in FIG. 9b, the people 50, 52 appear as one object in the image(s) recorded by camera 12a at the particular time(s) at which the people maintain this alignment. Accordingly, at step S6a, CPU 4 would identify the image data for the two people as a single foreground object, define a bounding rectangle surrounding this image data, and project the bounding rectangles into the 3D world space for camera 12a. On the other hand, as illustrated in FIG. 9c, the image data recorded by camera 12b for the example configuration of the people shown in FIG. 9a clearly shows the people as separate objects. At step S6b, therefore, CPU 4 would identify the people as separate foreground objects, define separate bounding rectangles, and project the separate bounding rectangles into the 3D world space for camera 12b.

FIG. 10 shows the processing operations performed by CPU 4 at step S10 in FIG. 3.

Referring to FIG. 10, at step S200, CPU 4 compares the heights in the 3D world space of the bounding rectangle of the next object (this being the first object the first time step S200 is performed) from camera 12a and the bounding rectangle of the corresponding object from camera 12b. In this embodiment, corresponding objects are identified using the coordinates of the corners of the base of each bounding rectangle in the 3D world space, since these coordinates will be within a predetermined distance for corresponding objects.

At step S202, CPU 4 determines whether the heights of the bounding rectangles are the same or within a predetermined error limit (in this embodiment 10%). Since, at step S24 (FIG. 4) the same reference points are chosen to determine the mapping from the image space of each camera to the 3D world space, and since each camera has a constant zoom setting, the object data for each camera will have the same scale. Consequently, as illustrated in FIG. 11, the bounding rectangle 100 generated from the image data of camera 12a and representing the composite object comprising the two people 50, 52 has a greater height in the 3D world space than the bounding rectangle 102 generated from the image data of camera 12b and representing the person 52. Accordingly, if it is determined at step S202 that the heights of the bounding rectangles are the same, then each bounding rectangle is determined to represent a single object, and processing proceeds to step S214. On the other hand, if it is determined that the heights are not the same, CPU 4 determines that the tallest bounding rectangle represents a composite object which should be split into its constituent objects, and processing proceeds to step S204.

At step S204, CPU 4 splits the tallest bounding rectangle into a bottom portion (106 in FIG. 11) which has the same height as the bounding rectangle 102 of the corresponding object and a top portion (108 in FIG. 11) which comprises the remainder of the original tall bounding rectangle 100. The bottom portion 106 and its associated image data are stored as a single object, since this represents the single object (person 52) which is in front of the other object (person 50) in the composite object. CPU 4 then performs processing at steps S206 to S212 to represent the rear object (that is, the object furthest from the camera 12a) at the correct position in the 3D model, as described below.

As step S206, CPU 4 projects the base corners of all of the bounding rectangles of the camera which produced the correct height bounding rectangle (102 in FIG. 11) from world space to the image space of the camera (camera 12a) which produced the tall bounding rectangle (100 in FIG. 11) split at step S204. This transformation is performed using the reverse transformation to that calculated at step S24 in FIG. 4 (described above) for the camera which produced the tall bounding rectangle (camera 12a).

At step S208, CPU 4 identifies which of the bounding rectangle bases projected at step S206 overlaps the "oversized" bounding rectangle which encloses the image data of the composite object in the image space of the camera which recorded the composite object. In this embodiment, this is done by comparing the projected base corner coordinates with the coordinates of the four corners of the oversized bounding rectangle. (In steps S208 and S210, it is only necessary to project and compare the coordinates of the corner points of the bases of the bounding rectangles because at least part of a projected base will lie behind the "oversized" bounding rectangle when the base belongs to the bounding rectangle enclosing the rear object in the composite object.)

At step S210, the bounding rectangle base identified at step S208 is projected back into the 3D world space using the transformation previously calculated at step S24 for the camera which produced the oversized bounding rectangle (camera 12a). This re-projected bounding rectangle base represents the correct position in the 3D world space for the rear object from the composite image. Accordingly, CPU 4 repositions the top portion 108 of the bounding rectangle which was split off from the tall bounding rectangle at step S204 so that the base of the top portion runs along the re-projected base and the centre of the base of the top portion and the centre of the re-projected base are at the same position in 3D world space.

At step S212, CPU 4 stores as a separate object in the object data for the camera which produced the initial oversized bounding rectangle (camera 12a) the repositioned top portion together with the image data therefor which was identified at step S204.

After performing steps S200 to S212, CPU 4 has separated the composite object into its constituent objects and stored these as separate objects in the object data for the associated camera.

This processing is effective in preventing sudden height changes in an object which, even though they may only last for a small number of image frames reproduced from the 3D computer model, have been found to be very noticeable.

Referring again to FIG. 9b, it will be seen that only part, and not all, of person 50, is above person 52 in the image data. Accordingly, when the top portion 108 of the bounding rectangle 100 is separated at step S204, the image data for only part of person 50 is separated. Steps S206 to S212 therefore produce a representation in which the image data for the object furthest from the camera (person 50) in the composite object merely corresponds to the top portion of the actual object. Further, the image data retained in the bottom portion 106 of rectangle 100 at step S204 for the object closest to the camera (person 52) may actually contain image data corresponding to the object furthest from the camera (if this lies in the bottom portion of the bounding rectangle). These "incorrect" representations have been found, however, to be relatively unnoticeable in images produced from the three-dimensional computer model, particularly because the composite objects only exist for a relatively small number of video frames (the alignment of the objects changing in the scene).

At step S214 in FIG. 10 CPU 4 determines whether there is another object in the 3D world space for the first camera. Steps S200 to S214 are repeated until all such objects have been processed as described above.

Referring again to FIG. 3, at steps S11a and S11b, CPU 4 produces representations (models) of each object in the 3D world space. More particularly, in step S11a, CPU 4 produces a representation in the object data for the first camera of each foreground object identified at step S6a. Similarly, in step S11b, CPU 4 produces 3D models for the 3D object data of the second camera. It should be noted that in steps S11a/S11b, CPU models the objects, but not their shadows. This is because the shadows have already been accurately modelled at step S8 (FIG. 3).

FIG. 12 shows the processing operations performed by CPU 4 at steps S11a and S11b. The processing is the same for each camera, and accordingly the processing for only camera 12a performed in step S11a will be described.

Referring to FIG. 12, at step S230, CPU 4 reads the data previously stored at step S100 (FIG. 8) defining the ground profile ("footprint") of the next object in the object data of camera 12a (that is, the contact profile of this object on the ground—the points at which the object touches the ground plane in the 3D world space). CPU 4 then approximates the "footprint" by fitting a plurality of straight lines to the shape of the boundary in a conventional manner, for example by applying a pixel mask to the boundary pixels to calculate a gradient value for each pixel and then applying a "t-statistic" test such as based on that described in Section 11.4 of "Computer and Robot Vision Volume 1" by R. M. Haralick and L. G. Shapiro, Addison-Wesley Publishing Company, 1992, ISBN 0-201-10877-1 (v.1). Step S230 is illustrated in FIG. 13a and FIG. 13b for an example ground boundary shape 150, representing the ground profile of vehicle 32. (Although the example boundary shape illustrated in FIG. 13a already comprises substantially straight lines, curved footprints may also be approximated.)

At step S232, CPU 4 uses the footprint approximation 160 defined at step S230 to define a model to represent the object in the 3D world space. In this embodiment, CPU 4 defines a plurality of planar surfaces 170, 172 (in this embodiment rectangles) in the 3D world space, with each respective rectangle having a base corresponding to one of the straight lines defined in steps S230, and vertical sides each having a height in the 3D world space corresponding to the height of the single bounding rectangle previously used as a representation of the object in the 3D world space (stored at step S42 in FIG. 5 and subsequently modified if necessary at step S8 and/or step S10 in FIG. 3). Step S232 is illustrated in FIG. 13c.

At step S234, CPU 4 maps each rectangle defined at step S232 from the 3D world space into the image space of camera 12a. This is performed by applying the inverse of the transformation previously calculated at step S24 (FIG. 4) for camera 12a to the coordinates of the corners of the base of each rectangle, and assuming that the aspect ratio (that is, the ratio of height-to-width) of the transformed rectangle in the image space of camera 12a is the same as the aspect ratio of the rectangle in the 3D world space, thereby enabling the height of the transformed rectangle in image space to be determined.

At step S236, CPU 4 extracts the pixel data which lies within each of the transformed rectangles in the image space of camera 12a.

At step S238, CPU 4 stores as object data for camera 12a the position and size of the planar surfaces in the 3D world space (defined at step S232), the image data associated with each rectangle (defined at step S236) and the foreground mask for the image data (based on the data stored previously at step S42).

At step S240, CPU 4 determines whether there is another object to be modelled for camera 12a. Steps S230 to S240 are repeated until all objects have been modelled as described above.

Referring again to FIG. 3, at steps S12a and S12b, CPU 4 stores the object data produced in steps S11a/S11b as time-stamped 3D object data for each camera.

At step S14, CPU 4 determines whether there is another image recorded by cameras 12a and 12b to be processed. Steps S6a/S6b, S8, S10, S11a/S11b, S12a/S12b and S14 are repeated until all such images have been processed in the manner described above. At that stage, there is stored in memory 6 two time-stamped sets of 3D object data, one for each of the cameras 12a and 12b.

At step S16, CPU 4 displays images to a user on display device 18 from any desired viewpoint selected by the user.

The images displayed in this step by CPU 4 are simulated video images produced using the three-dimensional model object data previously created.

FIG. 14 shows the processing operations performed by CPU 4 in displaying the images at step S16.

Referring to FIG. 14, at step S296 the direction from which the object is to be viewed is defined by the user using input device 14.

At step S298, CPU 4 determines whether the viewing direction selected by the user is within a predetermined angle of a vertical viewing direction looking down on the objects. In this embodiment, CPU 4 determines whether the selected viewing direction is within ±15° of vertical. If it is determined at this step that the user has selected a viewing direction within such a cone having a vertical axis and a semi-angle of 15°, processing proceeds to step S300, in which CPU 4 renders data to the frame buffer 16 which schematically represents the positions of all of the objects on the ground plane. In this embodiment, this is carried out using the object data from a predetermined camera (for example camera 12a) and rendering a vertical view of the static background scene using the common 3D model created at step S2 together with a graphic, such as a cross, or other visual indicator at a position on the ground plane corresponding to the position of each object determined from positions of the objects in the object data for the chosen camera.

Steps S298 and S300 comprise processing which enables a user to obtain an aerial view showing the positions of all objects. Such a view may be useful in a number of situations. For example, if the recorded video data related to an accident or crime, the image data produced at steps S298 and S300 may be used by the police gathering evidence to determine the relative positions of the vehicles and/or people at different times. Similarly, where the objects are people participating in a team sport, the image data produced in steps S298 and S300 may be used for training purposes to analyse the players' relative positions, etc.

If it is determined at step S298 that the user-selected viewing direction is not within the predetermined angle, CPU 4 performs processing to render a realistic view of the objects to the user from the chosen viewing direction, as described below.

At step S302, CPU 4 determines whether to use the object data produced from the image data of camera 12a (stored at step S12a) or the object data produced from the image data of camera 12b (stored at step S12b) to produce the image data for display to the user.

FIG. 15 shows the operations performed by CPU 4 in selecting the object data at step S302.

Referring to FIG. 15, at step S400, CPU 4 compares the viewing direction selected by the user at step S296 with the viewing direction (optical axis) of camera 12a and the viewing direction of camera 12b, and identifies the camera which has the viewing direction closest to the viewing direction selected by the user.

At step S402, CPU 4 determines whether the viewing direction of the camera which was not identified at step S400 (that is, the camera having the viewing direction which is furthest from the user-selected viewing direction) is within a predetermined angle (cone) of the viewing direction selected by the user. In this embodiment, CPU 4 determines whether the axis is within ±30° of the selected viewing direction. If the axis of the camera is outside this predetermined angle, the quality of the image produced by the camera for the viewing direction chosen by the user may be significantly inferior to that produced by the camera identified at step S400. Accordingly, in this case, processing proceeds to step S428, at which CPU 4 selects the object data from the camera having the closest viewing direction to that selected by the user.

On the other hand, if it is determined at step S402 that the viewing direction of the other camera is within the predetermined angle, the object data for the camera whose viewing direction is furthest from the user-selected viewing direction may actually produce a better quality image for the chosen viewing direction under certain conditions. Accordingly, in this case, CPU 4 performs further tests at steps S404 to S426 to determine whether a better quality image may result from using the camera with the viewing direction furthest from that selected by the user than with the camera identified at step S400 whose viewing direction is closest to that selected by the user.

At steps S404 to S414, CPU 4 compares characteristics of cameras 12a and 12b which will affect the quality of an image reproduced from the three-dimensional object data for the cameras, as will now be described.

At step S404, CPU 4 compares the method used to transfer the image data from camera 12a to computer 2 and the method used to transfer the image data from camera 12b to computer 2. This information may be input by a user prior to processing or may be transmitted with the image data from the cameras.

At step S406, CPU 4 determines whether the transfer methods are the same. If they are not, at step S408, CPU 4 selects the object data from the camera with the highest quality transfer method (that is, the transfer method which will typically introduce the smallest number of errors into the image data). In this embodiment, transfer of the image data via a cable and/or recording medium (for example if the image data is recorded on a recording medium in the camera which is subsequently transferred to computer 2) is considered to introduce fewer errors than if the image data is transferred by radio transmission. Accordingly, if one of the cameras transfers data by radio transmission, at step S408, CPU 4 selects the object data from the other camera.

On the other hand, if it is determined at step S406 that the image data transfer methods are the same, processing proceeds to step S410, at which CPU 4 compares the resolutions of the cameras. In this embodiment, this is carried out by comparing the number of pixels in the images from the cameras.

At step S412, CPU 4 determines whether the camera resolutions are the same. If the resolutions are not the same, processing proceeds to step S414, at which CPU 4 selects the object data from the camera with the highest resolution (the highest number of pixels).

On the other hand, if it is determined at step S412 that the cameras have the same resolution, CPU 4 proceeds to compare characteristics of the image data produced by the cameras. More particularly, processing proceeds to step S416, at which CPU 4 compares the stability of the images produced by cameras 12a and 12b. In this embodiment, this is carried out by comparing the optical image stabilisation parameters calculated by each camera in dependence upon the amount of "shake" of the camera, and transmitted with the image data.

At step S418, CPU 4 determines whether the stabilities compared at step S416 are the same. If the stabilities are not the same, at step S420, CPU 4 selects the object data from the camera with the highest image stability.

On the other hand, if it is determined at step S418 that the image stabilities are the same, processing proceeds to step S422, at which CPU 4 compares the number of occluded objects within the object data from each camera. In this embodiment, this is carried out by comparing the number of bounding rectangles for each set of object data which were split when processing was performed at step S10 (each bounding rectangle that was split representing an occlusion).

At step S424, CPU 4 determines whether the number of occluded objects is the same for each camera. If the number is not the same, then, at step S426, CPU 4 selects the object data from the camera which produces the smallest number of occlusions.

On the other hand, if it is determined at step S424 that the number of occluded objects is the same, then processing proceeds to step S428, at which CPU 4 selects the object data from the camera with the viewing direction closest to that chosen by the user. This data is selected because CPU 4 has determined at steps S406, S412, S418 and S424 that the inherent camera characteristics and image data characteristics affecting image quality are the same for both cameras, and therefore determines that the best quality image will be produced using object data from the camera which is aligned most closely with the user's chosen viewing direction.

Referring again to FIG. 14, at step S304, CPU 4 renders the selected object data to a frame buffer 16.

FIG. 16 shows the operations performed by CPU 4 in rendering the object data at step S304.

Referring to FIG. 16, at step S500, the 3D world space of the object data selected at step S302 is transformed into a viewing space in dependence upon the viewing position and direction selected at step S296 (FIG. 14). This transformation identifies a particular field of view, which will usually cover less than the whole modelling space. Accordingly, at step S502, CPU 4 performs a clipping process to remove surfaces, or parts thereof, which fall outside the field of view.

Up to this stage, the object data processed by CPU 4 defines three-dimensional co-ordinate locations. At step S504, the vertices of the triangular surfaces making up the 3D computer model are projected to define a two-dimensional image.

After projecting the image into two dimensions, it is necessary to identify the triangular surfaces which are "front-facing", that is facing the viewer, and those which are "back-facing", that is cannot be seen by the viewer. Therefore, at step S506, back-facing surfaces are identified and culled in a conventional manner. Thus, after step S506, vertices are defined in two dimensions identifying the triangular surfaces of visible polygons.

At step S508, the two-dimensional data defining the surfaces is scan-converted by CPU 4 to produce pixel values. In this step, as well as rendering the surfaces representing the background in the image, the shadows (stored as separate objects) are rendered, and the surfaces defined in step S11a or step S11b to model each object are also rendered with the video texture data previously stored for those surfaces. Only foreground pixels within the surfaces are rendered with the stored video texture data, these pixels being defined by the stored "foreground masks". The other pixels are rendered with background texture data. The rendered data produced by step S508 represents a simulated video frame, in which the background is produced from the computer model created at step S2 and each object is represented by the model defined at step S11a/S11b, onto which the image data of the object extracted from the video image is projected.

At step S510, the pixel values generated at step S508 are written to a frame buffer 16 on a surface-by-surface basis, thereby generating data for a complete two-dimensional image.

Referring again to FIG. 14, at step S306, CPU 4 determines whether the image to be displayed to the user for the current frame of data being processed and the image displayed to the user from the previous frame of data are derived from different cameras. That is, CPU 4 determines whether there is a camera change in the sequence of images to be viewed by the user. In this embodiment, CPU 4 determines whether this change has occurred by determining whether the object data selected at step S302 for the current frame is derived from a different camera than the object data selected at step S302 for the previous frame.

If it is determined at step S306 that a camera change has occurred, at step S308, CPU 4 renders the object data of the other camera for the current frame to a frame buffer 16. This is performed in the same way as the rendering at step S304 (described above with reference to FIG. 16) but the data is written to a different frame buffer 16 so as not to overwrite the data rendered at step S304.

At step S310, CPU 4 compares the image data rendered at step S304 with the image data rendered at step S308. This comparison is carried out to determine the similarity of the images, and is performed using a conventional technique, for example as described in "Computer and Robot Vision Volume 2" by R. M. Haralick and L. G. Shapiro, Addison-Wesley Publishing Company, 1993, ISBN 0-201-56943-4 (v.2), pages 293–378.

At step S312, CPU 4 determines whether the user will see a "jump" in the images if the image data rendered at step S304 is displayed (that is, whether the images will appear discontinuous). Such a jump (discontinuity) may occur because, in this embodiment, the models created for each object at step S11a/S11b are approximate, and because the position of each model in the 3D world-space may not have been determined with complete accuracy and may be different for the object data for each camera. In this embodiment, CPU 4 determines whether the images will be discontinuous by determining whether more than a predetermined number (e.g. 20%) of pixels failed the similarity test performed at step S310.

If it is determined at step S312 that successive images will appear discontinuous, then, at step S314, CPU 4 combines the image data rendered at step S304 and the image data rendered at step S308 to produce an image which will not appear discontinuous to the user. In this embodiment, the image combination is performed using a conventional morphing technique, for example as described in "Digital Image Warping" by George Wolberg, IEEE Computer Society Press, ISBN 0-8186-8944-7, pages 222–240.

At step S316, CPU 4 determines image quality information for the image data produced at step S304 or S314 for subsequent display to the user. More particularly, in this embodiment, CPU 4 determines the following information representing the standard of the image to be displayed, namely a value representing the degree of reliability (accuracy) of the image. This information may be useful to the user in a situation where the user is attempting to determine what happened in the real-world using the computer model (for example, the police may use recorded video images of a crime to create a computer model and then use the computer model to view the crime from different directions to gather evidence). Because each image generated from the computer model is a simulated image, the accuracy value determined at this step provides an indication of the reliability of the image. In this embodiment, CPU 4 allocates a value between 100% (when the viewing direction selected by the user is the same as the axis of the camera which produced the object data) and 0% (when the viewing direction is off-set from the camera axis by 30°). For off-set angles between 0° and ±30°, the percentage value allocated by CPU 4 varies linearly between 100% and 0%. For off-set angles greater than 30°, CPU 4 allocates a value of 0%. Further, in this embodiment, CPU 4 reduces the allocated percentage value by 10% (subject to a minimum limit of 0%) if an image produced by combining image data at step S314 is to be displayed to the user.

CPU 4 also generates a graphic, such as an arrow, or other visual indicator for display to the user, to show which way the view direction can be changed to improve the quality score.

At step S318, CPU 4 generates a signal defining the pixel values rendered at step S304 or step S314, and the quality information generated at step S316. The signal is used to generate an image of the objects on display unit 18 and/or is recorded, for example on a video tape in video tape recorder 20. The signal may also be transmitted to a remote receiver for display or recording. Further recordings may, of course, be made from a master recording. The quality information may be combined within the pixel values so that it is always visible in the image with the objects, or it may be selectively displayed and removed upon instruction by the user.

At step S320, CPU 4 determines whether there is another time-stamped "frame" of three-dimensional object data previously created at steps S6a and S6b which has not yet been displayed to the user. Steps S296 to S320 are repeated until all such frames of object data have been displayed in the manner described above, thereby displaying a sequence of simulated moving images to the user from the desired viewing direction. Of course, the user can change the viewing direction at any time during the display. In this embodiment, when step S306 is performed for frames subsequent to the first frame, CPU 4 determines that a camera change has occurred if the previous frame of image data was generated from combined image data (produced at step S314). In this case, at step S308, CPU 4 renders a combined image for the current frame into a frame buffer (that is, an image produced by combining an image produced using object data from the first camera for the current frame with an image produced using object data from the second camera for the current frame). At step S310, CPU 4 then compares the image data rendered at step S304 for the selected camera with the combined image data rendered at step S308. At step S306, if the previous frame was a schematic view of the object positions generated at step S300, CPU 4 determines that there has not been a camera change (since the user would expect to see a "jump" in the images when switching between a schematic view of positions and a realistic view).

SECOND EMBODIMENT

A second embodiment of the invention will now be described.

This embodiment is the same as the first embodiment with the exception of the processing operations performed by CPU 4 at steps S11a/S11b to model the objects in the 3D world space.

In the second embodiment, the modelling of the objects in the 3D world space is performed for each camera together (rather than separately as at steps S11a and S11b in the first embodiment).

FIG. 17 shows the processing operations performed by CPU 4 to model the objects in the 3D world space. As in the first embodiment, these operations are performed to model objects, but not shadows (which have already been modelled at step S8 in FIG. 3).

Referring to FIG. 17, at step S250, CPU 4 considers the next object to be processed and identifies planes in the image space of each camera upon which points on the object lie.

FIG. 18 shows the processing operations performed by CPU 4 at step S250.

Referring to FIG. 18, at step S264, CPU 4 compares the image data for the object recorded by each camera to identify matching points therein. CPU 4 identifies which image data to compare by comparing the coordinates of the corners of the base of the bounding rectangle of the object in the object data for the first camera with the corners of the bases of the bounding rectangles of the objects in the object data from the second camera to determine which bounding rectangle in the object data for the second camera has base corners which lie within a predetermined distance of the base corners of the bounding rectangle in the object data for the first camera in the 3D world space. CPU 4 then compares the image data previously stored for the bounding rectangle in the object data of the first camera (step S6a in FIG. 3 with subsequent modification in step S8 or S10 if necessary) and the image data previously stored for the bounding rectangle of the corresponding object in the object data of the second camera (step S6b in FIG. 3 with subsequent modification in step S8 or S10 if necessary). In this embodiment, CPU 4 performs this comparison by comparing corner points identified in the image data from the first camera with corner points identified in the image data for the second camera.

FIG. 19 shows the processing operations performed by CPU 4 at step S264.

Referring to FIG. 19, at step S282, CPU 4 calculates a value for each pixel in the image data for the object from the first camera indicating the amount of "edge" and "corner" for that pixel. This is done, for example, by applying a conventional pixel mask to the image data and moving this so that each pixel is considered. Such a technique is described in "Computer and Robot Vision Volume 1" by R. M. Haralick and L. G. Shapiro, Section 8, Addison-Wesley Publishing Company, 1992, ISBN 0-201-10877-1 (V.1). At step S284, any pixel which has "edge" and "corner" values exceeding predetermined thresholds is identified as a strong corner in the image data for the first camera in a conventional manner.

At step S286, CPU 4 performs the operation previously carried out at step S282 on the image data from the first camera on the image data from the second camera, and likewise identifies strong corners in the image data from the second camera at step S288 using the same technique previously performed at step S284.

At step S290, CPU 4 compares each strong corner identified in the image data from the first camera at step S284 with every strong corner identified in the image data from the second camera at step S288 to produce a similarity measure for-the corners in the image data from the first and second cameras. In this embodiment, this is carried out using an adaptive least squares correlation technique, for example as described in "Adaptive Least Squares Correlation: A Powerful Image Matching Technique" by A. W. Gruen in Photogrammetry Remote Sensing and Cartography, 1985, pages 175–187.

At step S292, CPU 4 identifies and stores matching corner points. This is performed using a "relaxation" technique, as will now be described. Step S290 produces a similarity measure between each strong corner in the image data from the first camera and a plurality of strong corners in the image data from the second camera. At step S292, CPU 4 effectively arranges these values in a table array, for example listing all of the strong corners in the image data from the first camera in a column, all of the strong corners in the image data from the second camera in a row, and a similarity measure for each given pair of corners at the appropriate intersection in the table. In this way, the rows of the table array define the similarity measure between a given corner point in the image data from the first camera and each corner point in the image data from the second camera. Similarly, the columns in the array define the similarity measure between a given corner point in the image data from the second camera and each corner point in the image data from the first camera. CPU 4 then considers the first row of values, selects the highest similarity measure value in the row, and determines whether this value is also the highest value in the column in which the value lies. If the value is the highest in the row and column, this indicates that the corner point in the image data from the second camera is the best matching point for the point in the image data from the first camera and vice versa. In this case, CPU 4 sets all of the values in the row and column to zero (so that these values are not considered in further processing), and determines whether the highest similarity measure is above a predetermined threshold (in this embodiment, 0.1). If the similarity measure is above the threshold, CPU 4 stores the corner point in the image data from the first camera and the corresponding corner point in the image data from the second camera as matched points. If the similarity measure is not above the predetermined threshold, it is determined that, even though the points are the best matching points for each other, the degree of similarity is not sufficient to store the points as matching points.

CPU 4 then repeats this processing for each row of the table array, until all of the rows have been considered. If it is determined that the highest similarity measure in a row is not also the highest for the column in which it lies, CPU 4 moves on to consider the next row.

CPU 4 reconsiders each row in the table to repeat the processing above if matching points are identified the previous time all the rows were considered. CPU 4 continues to perform such iterations until no matching points are identified in an iteration.

Referring again to FIG. 18, at step S266, CPU 4 considers the next four pairs of matched points which were identified at step S264.

At step S267, CPU 4 tests whether the four points in the image space of the first camera lie on a plane and whether the corresponding matched four points in the image space of the second camera also lie on a plane. If either set of four points does not lie on a plane, then the points selected at step S266 are not considered further, and processing proceeds to step S276. On the other hand, if both sets of four points lie on a plane in the respective image spaces, then processing proceeds to step S268.

By using four pairs of matched points at steps S268 and S267, rather than three pairs which is the minimum required to ensure that a plane can always be defined through the points in each image space, the number of "false" planes (that is, planes which do not correspond to a surface of the object) which are considered is reduced, thereby reducing processing requirements.

At step S268, CPU 4 calculates the transformation between the plane in the image space of the first camera which contains the four points considered at step S266 and the plane in the image space of the second camera which contains the corresponding matched four points. This transformation is calculated in a conventional manner, for example using the equation:

$$\begin{pmatrix} x2_n \\ y2_n \\ 1 \end{pmatrix} = \begin{pmatrix} J & K & L \\ M & N & P \\ Q & R & 1 \end{pmatrix} \begin{pmatrix} x1_n \\ y1_n \\ 1 \end{pmatrix} \quad (3)$$

where: n = 1 ... 4; $x2_n, y2_n$, are points in the image space of the second camera; $x1_n, y1_n$ are points in image space of the first camera; and J, K, L, M, N, P, Q, R are obtained by:

$$\begin{pmatrix} J \\ K \\ L \\ M \\ N \\ P \\ Q \\ R \end{pmatrix} = \begin{pmatrix} x1_1 & y1_1 & 1 & 0 & 0 & 0 & -x1_1X2_1 & -y1_1X2_1 \\ 0 & 0 & 0 & x1_1 & y1_1 & 1 & -x1_1Y2_1 & -y1_1Y2_1 \\ x1_2 & y1_2 & 1 & 0 & 0 & 0 & -x1_2X2_2 & -y1_2X2_2 \\ 0 & 0 & 0 & x1_2 & y1_2 & 1 & -x1_2Y2_2 & -y1_2Y2_2 \\ x1_3 & y1_3 & 1 & 0 & 0 & 0 & -x1_3X2_3 & -y1_3X2_3 \\ 0 & 0 & 0 & x1_3 & y1_3 & 1 & -x1_3Y2_3 & -y1_3Y2_3 \\ x1_4 & y1_4 & 1 & 0 & 0 & 0 & -x1_4X2_4 & -y1_4X2_4 \\ 0 & 0 & 0 & x1_4 & y1_4 & 1 & -x1_4Y2_4 & -y1_4Y2_4 \end{pmatrix}^{-1} \begin{pmatrix} X_1 \\ Y2_1 \\ X2_2 \\ Y2_2 \\ X2_3 \\ Y2_3 \\ X2_4 \\ Y2_4 \end{pmatrix} \quad (4)$$

At step S270, CPU 4 tests the transformation calculated at step S268 against each remaining pair of matched points (that is, pairs of matched points which were not used in calculating the transformation at step S268). That is, CPU 4 considers each remaining pair of points in turn, and uses the coordinates of the points to determine whether the calculated transformation is valid for those points (by determining whether the transformation calculated at step S268 holds for the coordinates of the points).

At step S272, CPU 4 determines whether, the number of pairs of points for which the transformation was determined to hold is greater than a predetermined number (in this embodiment eight). If it is determined that the transformation is valid for more than the predetermined number of pairs of points, CPU 4 determines that it has identified a plane of the object within the image data from the first camera and the second camera. Accordingly, processing proceeds to step S274, at which CPU 4 stores data defining the planes in the image data of the first camera and the image data of the second camera, together with the coordinates of the identified points which lie on the plane.

On the other hand, if it is determined at step S272 that the transformation calculated at step S268 is not valid for the predetermined number of pairs of points, then CPU 4 determines that the points used in step S268 to calculate the transformation lie on a non-real plane, that is, a plane which does not actually form part of the surface of the object. Accordingly, the planes are disregarded.

At step S276, CPU 4 determines whether there are another four pairs of matched points. Steps S266 to S276 are repeated until the number of remaining pairs of matched points which have not been considered is less than four.

Referring again to FIG. 17, at step S252, CPU 4 calculates the boundaries of the planes identified at step S250 and extracts the image data for the planes from the image data of the appropriate camera. CPU 4 carries out these operations by considering the points stored at step S274 (FIG. 18) for all planes, and identifying points which lie on two or more planes, these points being points which lie on the boundary between planes. The processing performed by CPU 4 is arranged to generate such boundary points since the points matched in the image data from the first and second cameras at step S264 (FIG. 18) are corner points.

Having identified points lying on the boundaries between planes, CPU 4 defines the boundaries between the planes by connecting points identified for each boundary (these being points which lie on the same two planes) or, if there are three or more points which cannot be connected by a straight line, drawing a straight line between the points using a conventional "least squares" method. CPU 4 then determines the intersections of the defined boundaries, thereby defining the planar surfaces in the image space. (If part of a plane is not bounded by a defined boundary, the extent is defined by the identified pixel data of the object within the overall bounding rectangle for the object, as determined by the "foreground mask" stored previously at step S42, for example.) After defining the boundaries of each plane in the image space of each camera to define planar surfaces of finite extent, CPU 4 extracts and stores the pixel data lying within each planar surface.

At step S254, CPU 4 uses the surfaces defined in the image spaces of the cameras to model the object in the 3D world space for each camera. To do this, CPU 4 calculates a position for the planar model in the 3D world space for each camera, and transforms the planar model defined in the image space of a camera into the 3D world space for the camera. More particularly, in this embodiment, CPU 4 applies the transformation from the image space of the first camera to the 3D world space previously calculated at step S24 to the coordinates of the corners of the base of each plane identified in the image data for the first camera at step S252. Similarly, CPU 4 applies the transformation between the image space of the second camera and the 3D world space previously calculated at step S24 to the coordinates of the corners of the base of each plane in the image data for the second camera determined at step S252. Since the transformations previously calculated at step S24 are only valid for points which lie on the ground plane in the image space and the 3D world space, the corner points for planes which touch the ground plane will align (to within a tolerance distance) in the 3D world space when transformed from the image space of the first camera and the image space of the second camera, whereas the corner points of other planes which do not touch the ground plane will not align. CPU 4 therefore identifies which corner points align, and, for these points, places a vertical planar surface in the 3D world space of each camera having the same aspect ratio as the planar surface in the image space of the appropriate camera (that is, the corresponding planar surface having corner points on the ground). CPU 4 then defines planar surfaces in the 3D world space for each camera having the same interconnections and aspect ratios as the surfaces identified in image space for the appropriate camera at step S252.

At step S256, CPU 4 stores as object data for each camera the data defining the planar surfaces in the 3D world space, the image data extracted for each surface, and the foreground "mask" for each surface.

At step S258, CPU 4 determines whether there is another object to be modelled. Steps S250 to S258 are repeated until all object have been modelled in the manner described above.

The rendering steps in this embodiment are performed in the same way as those in the first embodiment, with the image data stored at step S256 being rendered onto the appropriate surface.

The modelling of objects in the 3D world space described above for the second embodiment is particularly effective for objects made up of a number of planes, such as vehicles 30, 32 in the example of FIG. 2 etc, and the processing operations performed in this embodiment model the tops of objects more accurately than the modelling operations in the first embodiment.

THIRD EMBODIMENT

In the first embodiment, the processing operations performed to model objects in the 3D world space at steps S11a/S11b are particularly effective where the object being modelled touches the ground over a wide area (e.g. vehicles 30, 32 in the example of FIG. 2). In the second embodiment, the modelling technique is particularly effective where the object is made up of a number of planes.

However, not all objects have these characteristics (for example the people 50, 52 in the example of FIG. 2) and, while they can be modelled using the technique of the first or second embodiment, these techniques may introduce unnecessary processing operations.

The third embodiment is the same as the first embodiment with the exception of the processing operations performed at steps S11a/S11b to model the objects in the 3D world space.

In the third embodiment, CPU 4 models the objects at steps S11a/S11b using the vertical planes in the 3D world space produced at steps S6a and S6b, and subsequently modified at steps S8 and S10. Each object is therefore modelled as a single vertical plane in the 3D world space of each camera (one plane per camera). As before, shadows are not modelled at steps S11a/S11b.

Various modifications are possible to the embodiments described above.

Referring again to FIG. 3, in the embodiments above, steps S6a and S6b (in which image data is processed to identify foreground objects and to create object data therefrom) are performed after all images have been recorded at steps S4a and S4b. Similarly, step S16 (in which images are displayed) is performed after steps S4, S6a/S6b, S8, S10, S11a/S11b, S12a/S12b and S14 have been completed. However, these steps may be performed so as to allow real-time display of images to a user from a desired viewing direction. That is, steps S6a/S6b, S8, S10, S11a/S11b, S12a/S12b, S14 and S16 could be performed on one frame of video data while the next frame of data is being recorded by the video cameras. This real-time operation is possible since the processing requirements of steps S6a/S6b, S8, S10 and S11a/S11b are not particularly onerous on CPU 4, and could be carried out within 1/30th of a second, this being the time between the recording of video frames.

In the embodiments above, foreground objects are identified at steps S6a/S6b on the basis of grey scale values. However, in addition, or instead, it is possible to set windows for colour and/infra-red values and to identify foreground objects using these image characteristics.

In the embodiments above, at step S8, shadows are identified by mapping (transforming) image data for corresponding foreground objects onto the ground plane in the 3D computer model defined at step S2 and comparing the transformed data to identify the boundary between aligned portions (shadow) and non-aligned portions (object). The identified boundary (ground "footprint") is subsequently used in the first embodiment to model the object (steps S11a/S11b). However, the mapping and comparison need not take place on the ground plane in the 3D computer model. More particularly, shadows may be identified and the ground "footprint" determined for object modelling by mapping image data for corresponding foreground objects onto a surface in any modelling space by applying a transformation which defines a mapping from the ground plane of the image data of the respective camera to the surface in the modelling space, and comparing the transformed data. Models (representations) of the object and its shadow would then be generated in the 3D computer model in dependence upon the results.

Similarly, at step S10, instead of comparing the heights of the bounding rectangles of corresponding objects in the 3D computer model to determine if an object is a composite object, the bounding rectangles may be transformed from the image data of each camera to any common modelling space and the heights compared in that modelling space.

In the embodiments above, CPU 4 performs processing at steps S298 and S300 (FIG. 14) to display an aerial representation of the objects' positions if the user selects a viewing direction which is close to the vertical. Further processing on the image (video pixel) data stored as object data for each object in the 3D world space could be carried out to determine the colour of the objects and to indicate this colour in the aerial representation of positions. Such processing could be particularly useful where the objects are people taking part in a team sport, in which case the colours of the top of each player could be identified from the object data and a visual indication presented in the aerial view to show to which team each player belonged. Further, the apparatus may be arranged to enable the user to selectively enable and disable the processing operations performed by CPU 4 at steps S298 and S300. That is, the user could instruct CPU 4 not to show an aerial view for any viewing directions, and instead always to render a realistic view of the objects from the chosen viewing direction. This enable/disable feature may be useful in embodiments in which the tops of objects are modelled, for example the second embodiment.

In the embodiments above, when selecting which set of object data to use to generate a frame of image data at step S302 (FIG. 14), CPU 4 prioritises the inherent camera characteristics and the image data error characteristics which affect image quality in the order (FIG. 15) of image data transfer method between camera and processor, camera resolution, image stability, and number of occluded objects in the image. However, different priorities can be used. Also, not all of the camera and image data characteristics described above need to be used. For example, it is possible to omit one or more of the four tests (defined respectively by steps S404–S408, S410–S414, S416–S420 and S422–S426). Further, other camera characteristics (such as shutter speed, which may be transmitted with the image data from each camera—the camera with the fastest shutter speed being selected because this indicates more favourable lighting conditions) and the image data characteristic of whether the image is colour or black and white (a camera producing colour image data being selected in preference to a camera producing black and white image data) may be taken into consideration.

In the embodiments above, step S302 is performed to select the data to be used to create an image for display to the user after each object has been modelled at steps S11a/S11b using image data from each camera. However, if the user has defined a viewing direction, step S302 may be performed to select data before objects are modelled at steps S11a/S11b. Thus, for example, a camera would be selected as described above, and then the object(s) modelled in the 3D computer model using the image data from the selected camera. Such processing could prevent unnecessary modelling of objects (since models that will not be used for the image are not created), thereby saving processing time.

Step S302 may be performed to select the data to be used to create an image even when objects are modelled independently for each camera (that is steps S8 and S10 are omitted).

In the embodiments above, at step S310, CPU 4 compares the rendered images using a differencing technique. However other techniques such as Hausdorff distance described in "Tracking Non-Rigid Objects in Complex Scenes" by Daniel Huttenlocher et al, Proc. 4th International Conference on Computer Vision, 1993, Berlin, IEEE Computer Society Press ISBN 0-8186-3870-2 may be used. Similarly, other image combination techniques (such as averaging) may be used at step S314.

In the embodiments above, steps S304 to S314 (FIG. 14) are carried out with respect to image data for a whole frame. However, the steps can be carried out to compare image data on an object-by-object basis to determine whether objects will appear discontinuous on an individual basis. This may result in the generated frame of image data being made up of image data from different cameras (different objects may use image data from different cameras).

In the embodiments above, at step S416 (FIG. 15) image stability is determined using data from sensors mounted on the camera or its stand. Alternatively, image stability may be determined by processing the received image data itself. For example, the image data may be processed using an optic flow technique, or using a technique such as that described in "Virtual Bellows: Constructing High Quality Stills From Video" by S. Mann and R. W. Picard, MIT Media Laboratory Perceptual Computing Section Technical Report No. 259, appears, Proc. First IEEE Int. Conf. on Image Proc., Austin Tex., November 1994.

In the embodiments above, two cameras are used to produce the input image data. However, the processing operations performed in the embodiments can equally be performed for a greater number of cameras. Indeed, a greater number of cameras may assist a number of the processing operations. For example the shadow processing performed by CPU 4 at step S8 (FIG. 3) may be improved. This is because, with only two cameras, one camera may not have a complete view of the shadow of an object, and accordingly the aligned image data portions in the 3D world space extracted and stored at step S102 (FIG. 8) may not correspond to the complete shadow. This problem is likely to be reduced as the number of cameras increases since the possibility of at least two cameras having a view of the complete shadow will also increase. If required, the extracted complete shadow could then be added to the object data belonging to cameras in which the complete shadow did not actually appear in their image data.

In the embodiments above, the viewing direction of the cameras is fixed. However, the viewing direction may be varied, and conventional direction and angle sensors may be placed on the camera or its stand to provide information defining the viewing direction of each camera for each recorded frame of image data. Processing would then be carried out to project the image data to a fixed virtual image plane in a conventional manner, for example as described in "Statistical Background Models for Tracking with a Camera" by Simon Rowe and Andrew Blake, British Machine Vision Conference 1995.

In the embodiments above, foreground objects are identified in an image by comparing the value of each pixel with a value set on the basis of a plurality of images recorded of the background only (steps S3a/S3b, S4a/S4b and S6a/S6b). However, conventional optic flow techniques may be used to identify foreground objects. Such optic flow techniques may be used, for example, when the viewing direction of the camera changes.

In the embodiments above, the zoom (magnification) of each camera is fixed. However, the zoom may be varied. In this case, for example, the transformation between the image space of the camera and the 3D world space calculated at step S24 (FIG. 4) would be calculated for the same four reference points for each zoom setting.

This calculation could be performed prior to recording frames of image data at steps S4a/S4b and the zoom setting for the camera for each frame could be transmitted from the camera to the computer 2, allowing the correct transformation to be selected for the image data for a frame. Alternatively, the transformations could be calculated in real-time as the zoom setting of the camera changes (in which case, the four reference points used for the calibration would be chosen so as always to be visible within the field of view of the camera and also to be easily recognisable by conventional image recognition techniques to allow them to be identified by CPU 4 from the image data to be used to calculate the transformation).

The information determined by CPU 4 at step S316 (FIG. 14) for display to the user could be provided in an embodiment which uses a single camera to produce the input video image data. In such an embodiment, processing operations requiring image data from more than one camera (such as the shadow processing at step S8 and the composite object processing at step S10) would not be performed, and the foreground objects could be modelled (step S11a) as in the third embodiment above.

Similarly, the processing operations performed by CPU 4 in the embodiments above at steps S298 and S300 (FIG. 14) to display an aerial representation of the object positions when the user-selected viewing direction is close to the vertical may be performed in an embodiment which uses a single camera to produce the input image data.

In the embodiments above, CPU 4 and memory 6 form part of computer 2 which is separate to display unit 18 and cameras 12a and 12b. The processing described in the above embodiments could, however, be carried out within one or more cameras or a display device by providing the appropriate processor and memories in the camera or display device.

In the first embodiment above, at steps S11a/S11b (FIG. 3), CPU 4 defines the model to be used for an object in the 3D world space by fitting straight lines to the ground "footprint" of the object and defining vertical planar surfaces having the straight lines as bases. In addition, CPU 4 may carry out processing to define a top to the object by connecting the tops of the vertical planar surfaces. Further, CPU 4 may use the ground "footprint" to define the 3D model in different ways. For example, CPU 4 may represent the ground "footprint" using a spline curve (such as a Bezier curve) and may represent the object as a vertical curved surface in the 3D world space which has a horizontal cross-section corresponding to the defined spline curve.

In the second embodiment above, at step S254 (FIG. 17) CPU 4 defines a plane in the 3D world space of a camera for every plane which is determined to touch the ground in the image space of the camera. However, to allow the model of the object to be defined in 3D world space, it is sufficient to define a plane in the 3D world space for only one plane which touches the ground in image space (since the position of a single plane in 3D world space will fix the positions of all the planes in the model).

In the second embodiment above, at step S264 (FIG. 18), CPU 4 identifies and compares corner points in the image data. In addition, or instead, minimum, maximum, or saddle points in the colour or intensity values of the image data may be identified and compared. For example, techniques described in "Computer and Robot Vision Volume 1" by Haralick and Shapiro, Chapter 8, Addison-Wesley Publishing Company, ISBN 0-210-10877-1 (V.1) for detecting such points may be employed. The detected points may be matched using an adaptive least squares correlation as described previously.

In the embodiments above, at step S24 (FIG. 4) a transformation is calculated for unknown camera position and parameters which maps the ground plane from image space to world space. However, one or more of the cameras could be arranged in known relationship to the scene to be viewed and with known camera parameters, allowing a different transformation to be used.

In the embodiments above, at steps S296 to S300 (FIG. 14), the viewing direction selected by the user is determined and, if this direction is within a predetermined angle of the vertical, then processing is carried out to display a schematic image of the position(s) of the object(s). In addition, or instead, processing may be carried out to determine if the viewing direction is parallel to or within a predetermined angle of, a vertical planar surface making up the model of the object and, if it is, to render image data for the display of a schematic image of the position of the object in some way as at step S300 above. This would have particular advantage when the object is modelled using a single vertical planar surface, as in the third embodiment, since the object itself would then not appear in a true image if the viewing direction is such that the planar surface is viewed edge-on, and therefore a schematic image of object position may be more useful to the user. Of course, by determining whether the viewing direction lies within a predetermined range of angles relative to a planar surface of an object, cases can be identified where the object is to be viewed top-edge-on (or at an angle close thereto) and hence this test can be used instead of the test at step S298 above of determining the viewing direction relative to a predetermined range of angles fixed with respect to the vertical direction.

What is claimed is:

1. A method of processing image data defining a plurality of sequences of images, each from a respective camera, of a plurality of objects moving in a scene to produce signals defining representations of the objects in a three-dimensional computer model, the method comprising the steps of:

processing image data from a first of the cameras to identify image data relating to objects in the scene;

processing image data from a second of the cameras to identify image data relating to objects in the scene;

processing the identified image data from the first camera for each object to define an object representation in the three-dimensional computer model having a height dependent upon the image data for the object from the first camera;

processing the identified image data from the second camera for each object to define an object representation in the three-dimensional computer model having a height dependent upon the image data for the object from the second camera;

comparing the height of the representation of each object generated in dependence upon image data from the first camera with the height of the representation of the corresponding object generated in dependence upon image data from the second camera; and generating object representations in the three-dimensional computer model in dependence upon the height comparisons, wherein, when the heights of the corresponding representations are not within a predetermined amount of each other, the taller representation is split into a first portion having a height corresponding to the height of the smaller representation and a second portion comprising the remaining part of the taller representation, and wherein a further representation is defined in the three-dimensional model by re-positioning the second portion in the three-dimensional model.

2. A method according to claim 1, wherein the second portion is re-positioned in dependence upon a representation defined on the basis of image data from the camera which produced the smaller representation.

3. A method according to claim 2, wherein the second portion is re-positioned by:

identifying which of the representations defined on the basis of image data from the camera which produced the smaller representation overlaps the image data used to define the taller representation in the image space of the camera which produced the taller representation; and re-positioning the second portion, in dependence upon the position of the identified representation in the three-dimensional model.

4. A method according to claim 3, wherein the second portion is re-positioned by:

mapping at least part of each representation defined on the basis of image data from the camera which produced the smaller representation from the three-dimensional model to the image space of the camera which produced the taller representation;

determining which projected representation overlaps the image data for the taller representation in the image space of the camera which produced the taller representation; and re-positioning the second portion in dependence upon the position in the three-dimensional model of the representation which, when projected into the image space of the camera which produced the taller representation, overlapped the image data for the taller representation.

5. A method according to claim 4, wherein the second portion is re-positioned so that the centre of its base is at the same position as the centre of the base of the representation which overlapped the image data for the taller representation.

6. A method according to claim 1, wherein each object representation is defined as a planar surface with its base on a predetermined surface in the three-dimensional computer model and with a position and size in dependence upon a polygon bounding the image data for the object.

7. A method according to claim 6, wherein the polygon is a rectangle.

8. A method according to claim 7, wherein the sides of the rectangle are parallel to the sides of the image.

9. A method according to claim 6, wherein the width of the planar surface is determined by the width of the bounding polygon in the image data, and the height of the planar surface is calculated using the aspect ratio of the bounding polygon in the image data.

10. A method according to claim 6, wherein the planar surface lies within a vertical plane.

11. A method according to claim 1, further comprising the step of generating image data by rendering an image of the three-dimensional computer model in which texture data based on the processed image data is rendered onto the representation of each object.

12. A method according to claim 11, further comprising the step of generating a signal conveying the image data.

13. A method according to claim 12, further comprising the step of recording the signal.

14. A method according to claim 11, further comprising the step of displaying an image of the objects using the generated image data.

15. A method according to claim 11, further comprising the step of making a recording of the image data either directly or indirectly.

16. A method of image processing in which image data from first and second cameras is processed to identify image data relating to respective objects, the height of each object in a modelling space is determined using the identified image data, and the heights of objects determined using image data from the first camera are compared with the heights of objects determined using image data from the second camera to determine which if any identified image data relates to more than one object, wherein each object is defined as a planar surface with its base on a predetermined surface in the modelling space and with a position in dependence upon a polygon bounding the image data for the object, and wherein the width of the planar surface is determined by the width of the bounding polygon in the image data, and the height of the planar surface is calculated using the aspect ratio of the bounding polygon in the image data.

17. An image processing method in which image data from a first camera of objects in a scene is processed to identify image data relating to respective objects, and image data from a second camera of the objects in the scene is processed to determine whether any of the identified image data from the first camera relates to more than one object by comparing a size parameter of each object determined from the image data of the first camera with the corresponding size parameter determined from the image data of the second camera.

18. A storage medium storing instructions for causing a programmable processing apparatus to become operable to perform a method according to any one of claims 1, 16 and 17.

19. A physically-embodied computer program product including instructions in computer-readable form, including instructions for causing a programmable processing apparatus to become operable to perform a method according to any one of claims 1, 16 and 17.

20. An image processing apparatus for processing image data defining a plurality of sequences of images, each from a respective camera, of a plurality of objects moving in a scene to produce signals defining representations of the objects in a three-dimensional computer model, the apparatus comprising:

means for processing image data from a first of the cameras to identify image data relating to objects in the scene;

means for processing image data from a second of the cameras to identify image data relating to objects in the scene;

means for processing the identified image data from the first camera for each object to define an object representation in the three-dimensional computer model having a height dependent upon the image data for the object from the first camera;

means for processing the identified image data from the second camera for each object to define an object representation in the three-dimensional computer model having a height dependent upon the image data for the object from the second camera;

means for comparing the height of the representation of each object generated in dependence upon image data from the first camera with the height of the representation of the corresponding object generated in dependence upon image data from the second camera; and means for generating object representations in the three-dimensional computer model in dependence upon the height comparisons, wherein the apparatus is arranged to perform processing such that, when the heights of the corresponding representations are not within a predetermined amount of each other, the taller representation is split into a first portion having a height corresponding to the height of the smaller representation and a second portion comprising the remaining part of the taller representation, and wherein a further representation is defined in the three-dimensional model by re-positioning the second portion in the three-dimensional model.

21. Apparatus according to claim 20, arranged to perform processing such that the second portion is re-positioned in dependence upon a representation defined on the basis of image data from the camera which produced the smaller representation.

22. Apparatus according to claim 21, arranged to perform processing such that the second portion is re-positioned by:

identifying which of the representations defined on the basis of image data from the camera which produced the smaller representation overlaps the image data used to define the taller representation in the image space of the camera which produced the taller representation; and re-positioning the second portion in dependence upon the position of the identified representation in the three-dimensional model.

23. Apparatus according to claim 22, arranged to perform processing such that the second portion is re-positioned by:

mapping at least part of each representation defined on the basis of image data from the camera which produced the smaller representation from the three-dimensional model to the image space of the camera which produced the taller representation;

determining which projected representation overlaps the image data for the taller representation in the image space of the camera which produced the taller representation; and re-positioning the second portion in dependence upon the position in the three-dimensional model of the representation which, when projected into the image space of the camera which produced the taller representation, overlapped the image data for the taller representation.

24. Apparatus according to claim 23, arranged to perform processing such that the second portion is re-positioned so that the centre of its base is at the same position as the centre of the base of the representation which overlapped the image data for the taller representation.

25. Apparatus according to claim 20, arranged to perform processing such that each object representation is defined as a planar surface with its base on a predetermined surface in the three-dimensional computer model and with a position and size in dependence upon a polygon bounding the image data for the object.

26. Apparatus according to claim 25, wherein the polygon is a rectangle.

27. Apparatus according to claim 26, wherein the sides of the rectangle are parallel to the sides of the image.

28. Apparatus according to claim 25, arranged to perform processing such that the width of the planar surface is determined by the width of the bounding polygon in the image data, and the height of the planar surface is calculated using the aspect ratio of the bounding polygon in the image data.

29. Apparatus according to claim 25, arranged to perform processing such that the planar surface lies within a vertical plane.

30. Apparatus according to claim 20, further comprising means for generating image data by rendering an image of the three-dimensional computer model in which texture data based on the processed image data is rendered onto the representation of each object.

31. Apparatus according to claim 30 further comprising means for displaying an image of the objects using the generated image data.

32. An image processing apparatus operable to process image data from first and second cameras to identify image data relating to respective objects, to determine the height of each object in a modelling space using the identified image data, and to compare the heights of objects determined using image data from the first camera with the heights of objects determined using image data from the second camera to determine which if any identified image data relates to more than one object, wherein the apparatus is arranged to perform processing such that each object is defined as a planar surface with its base on a predetermined surface in the modelling space and with a position in dependence upon a polygon bounding the image data for the object, and such that the width of the planar surface is determined by the width of the bounding polygon in the image data, and the height of the planar surface is calculated using the aspect ratio of the bounding polygon in the image data.

33. An image processing apparatus operable to process image data from a first camera of objects in a scene to identify image data relating to respective objects, and to process image data from a second camera of the objects in the scene to determine whether any of the identified image data from the first camera relates to more than one object by comparing a size parameter of each object determined from the image data of the first camera with the corresponding size parameter determined from the image data of the second camera.

34. A method of processing image data defining a plurality of sequences of images, each from a respective camera, of an object moving in a scene to produce signals defining a representation of the object in a three-dimensional computer model, the method comprising:
  processing image data from a first of the cameras to identify image data relating to the object in the scene;
  processing image data from a second of the cameras to identify image data relating to the object in the scene;
  applying a transformation to the identified image data from the first camera which defines a mapping from the ground plane in the space of the image data of the first camera to a surface in a modelling space;
  applying a transformation to the identified image data from the second camera which defines a mapping from the ground plane in the space of the image data of the second camera to the surface in the modelling space;
  comparing the transformed image data from the first and second cameras on the surface in the modelling space;
  determining which part of the image data represents shadow in dependence upon the comparison results; and
  generating a representation of at least the object in the three-dimensional model.

35. A method according to claim 34, further comprising the step of generating a representation of the shadow in the three-dimensional model.

36. A method according to claim 34, wherein the surface in the modelling space is the ground plane in the three-dimensional model.

37. A method according to claim 34, wherein it is determined that aligned parts of the transformed image data represent shadow.

38. A method according to claim 34, further comprising the step of generating image data by rendering an image of the three-dimensional computer model in which texture data based on the processed image data is rendered onto the representation of the object.

39. A method according to claim 38, wherein the image data rendered onto the representation is determined in dependence upon the comparison results.

40. A method according to claim 38, further comprising the step of generating a signal conveying the image data.

41. A method according to claim 40, further comprising the step of recording the signal.

42. A method according to claim 38, further comprising the step of displaying an image of the object using the generated image data.

43. A method according to claim 38, further comprising the step of making a recording of the image data either directly or indirectly.

44. A method of generating a model of an object in a three-dimensional computer model by processing images of the object from a plurality of cameras, in which image data from a first camera is processed to identify image data relating to the object and its shadow together, and image data from a second camera is used to determine the identified image data from the first camera which relates to the shadow and the identified image data from the first camera which relates to the object.

45. A method of generating a model of an object in a three-dimensional computer model, in which:
  a transformation is applied to image data from a first camera relating to the object and its shadow which maps the image data to a surface to give first transformed image data;
  a transformation is applied to image data from a second camera relating to the object and its shadow which maps the image data to the surface to give second transformed image data;
  the first transformed image data and the second transformed image data are compared to distinguish transformed image data relating to the object from transformed image data relating to its shadow; and
  the object is modelled in dependence upon the transformed image data relating to the object.

46. A storage medium storing instructions for causing a programmable processing apparatus to become operable to perform a method according to any one of claims 34, 44 and 45.

47. A physically-embodied computer program product including instructions in computer-readable form, including instructions for causing a programmable processing apparatus to become operable to perform a method according to any one of claims 34, 44 and 45.

48. Apparatus for processing image data defining a plurality of sequences of images, each from a respective camera, of an object moving in a scene to produce signals defining a representation of the object in a three-dimensional computer model, the apparatus comprising:
  for processing image data from a first of the cameras to identify image data relating to the object in the scene;

means for processing image data from a second of the cameras to identify image data relating to the object in the scene;

means for applying a transformation to the identified image data from the first camera which defines a mapping from the ground plane in the space of the image data of the first camera to a surface in a modelling space;

means for applying a transformation to the identified image data from the second camera which defines a mapping from the ground plane in the space of the image data of the second camera to the surface in the modelling space;

means for comparing the transformed image data from the first and second cameras on the surface in the modelling space;

means for determining which part of the image data represents shadow in dependence upon the comparison results; and means for generating a representation of at least the object in the three-dimensional model.

49. Apparatus according to claim 48, further comprising means for generating a representation of the shadow in the three-dimensional model.

50. Apparatus according to claim 48, wherein the surface in the modelling space is the ground plane in the three-dimensional model.

51. Apparatus according to claim 48, arranged such that it is determined that aligned parts of the transformed image data represent shadow.

52. Apparatus according to claim 48, further comprising means for generating image data by rendering an image of the three-dimensional computer model in which texture data based on the processed image data is rendered onto the representation of the object.

53. Apparatus according to claim 52, wherein the image data rendered onto the representation is determined in dependence upon the comparison results.

54. Apparatus according to claim 52, further comprising means for displaying an image of the object using the generated image data.

55. Apparatus for generating a model of an object in a three-dimensional computer model by processing images of the object from a plurality of cameras, the apparatus being operable to process image data from a first camera to identify image data relating to the object and its shadow together, and operable to use image data from a second camera to determine the identified image data from the first camera which relates to the shadow and the identified image data from the first camera which relates to the object.

56. Apparatus for generating a model of an object in a three-dimensional computer model, comprising:

means for applying a transformation to image data from a first camera relating to the object and its shadow which maps the image data to a surface to give first transformed image data;

means for applying a transformation to image data from a second camera relating to the object and its shadow which maps the image data to the surface to give second transformed image data;

means for comparing the first transformed image data and the second transformed image data to distinguish transformed image data relating to the object from transformed image data relating to its shadow; and means for modelling the object in dependence upon the transformed image data relating to the object.

57. A method of processing image data defining a plurality of sequences of images, each from a respective camera, of an object moving in a scene to produce signals defining a representation of the object in a three-dimensional computer model, the method comprising:

processing image data from a first of the cameras to identify image data relating to the object in the scene;

processing image data from a second of the cameras to identify image data relating to the object in the scene;

processing the identified image data from the first camera and the identified image data from the second camera to determine a footprint of the object on the ground; and defining a model of the object in the three-dimensional computer model in dependence upon the determined footprint.

58. A method according to claim 57, wherein the step of processing the identified image data to determine the footprint of the object on the ground comprises:

applying a transformation to the identified image data from the first camera which defines a mapping from the ground plane in the image data of the first camera to a surface in a modelling space;

applying a transformation to the identified image data from the second camera which defines a mapping from the ground plane in the image data of the second camera to the surface in the modelling space; and comparing the transformed image data on the surface in the modelling space.

59. A method according to claim 58, wherein the surface in the modelling space is the ground plane in the three-dimensional computer model.

60. A method according to claim 58, wherein the outline of the image on the ground is determined in dependence upon the aligned and non-aligned portions of the transformed image data on the surface in the modelling space.

61. A method according to claim 57, wherein, the step of defining the model of the object comprises defining the model using a plurality of vertical planar surfaces.

62. A method according to claim 61, wherein the vertical planar surfaces are defined such that their bases approximate the outline of the object on the ground.

63. A method according to claim 61, wherein each planar surface is a rectangle.

64. A method according to claim 61, wherein each planar surface is defined with a height determined in dependence upon the image data identified from the first camera or the image data identified from the second camera.

65. A method according to claim 64, wherein the height of each planar surface is defined in dependence upon a rectangle bounding some or all of the image data relating to the object identified from the first camera or the second camera.

66. A method according to claim 64, wherein each planar surface is defined to have the same height.

67. A method according to claim 61, further comprising the step of generating a top for the model of the object in dependence upon upper edges of the vertical planar surfaces.

68. A method according to claim 57, further comprising the step of generating image data by rendering an image of the modelled object, in which texture data based on the identified image data from at least one camera is rendered onto the model.

69. A method according to claim 68, wherein each planar surface is mapped onto the image data of the first camera or the second camera, and the image data enclosed by each mapped surface is rendered onto the planar surface in the model.

70. A method according to claim 68, further comprising the step of generating a signal conveying the image data.

71. A method according to claim 70, further comprising the step of recording the signal.

72. A method according to claim 68, further comprising the step of displaying an image of the object using the generated image data.

73. A method according to claim 68, further comprising the step of making a recording of the image data either directly or indirectly.

74. A method of generating a model of an object in a three-dimensional computer model by processing images of the object from a plurality of cameras, in which image data from a first camera is processed to identify image data relating to the object, image data from a second camera is used to determine which parts of the identified image data from the first camera relate to parts of the object on or near the ground, and the object is represented in the computer model in dependence thereon.

75. A storage medium storing instructions for causing a programmable processing apparatus to become operable to perform a method according to any one of claims 57 and 74.

76. A physically-embodied computer program product including instructions in computer-readable form, including instructions for causing a programmable processing apparatus to become operable to perform a method according to any one of claims 57 and 74.

77. Apparatus for processing image data defining a plurality of sequences of images, each from a respective camera, of an object moving in a scene to produce signals defining a representation of the object in a three-dimensional computer model, the apparatus comprising:
   means for processing image data from a first of the cameras to identify image data relating to the object in the scene;
   means for processing image data from a second of the cameras to identify image data relating to the object in the scene;
   means for processing the identified image data from the first camera and the identified image data from the second camera to determine a footprint of the object on the ground; and
   means for defining a model of the object in the three-dimensional computer model in dependence upon the determined footprint.

78. Apparatus according to claim 77, wherein the means for processing the identified image data to determine the footprint of the object on the ground comprises:
   means for applying a transformation to the identified image data from the first camera which defines a mapping from the ground plane in the image data of the first camera to a surface in a modelling space;
   means for applying a transformation to the identified image data from the second camera which defines a mapping from the ground plane in the image data of the second camera to the surface in the modelling space; and
   means for comparing the transformed image data on the surface in the modelling space.

79. Apparatus according to claim 78, wherein the surface in the modelling space is the ground plane in the three-dimensional computer model.

80. Apparatus according to claim 78, arranged to determine the outline of the image on the ground in dependence upon the aligned and non-aligned portions of the transformed image data on the surface in the modelling space.

81. Apparatus according to claim 77, wherein, the means for defining the model of the object comprises means for defining the model using a plurality of vertical planar surfaces.

82. Apparatus according to claim 81, arranged to perform processing such that the vertical planar surfaces are defined such that their bases approximate the outline of the object on the ground.

83. Apparatus according to claim 81, wherein each planar surface is a rectangle.

84. Apparatus according to claim 81, arranged to perform processing such that each planar surface is defined with a height determined in dependence upon the image data identified from the first camera or the image data identified from the second camera.

85. Apparatus according to claim 84, arranged to perform processing such that the height of each planar surface is defined in dependence upon a rectangle bounding some or all of the image data relating to the object identified from the first camera or the second camera.

86. Apparatus according to claim 84, wherein each planar surface is defined to have the same height.

87. Apparatus according to claim 81, further comprising means for generating a top for the model of the object in dependence upon upper edges of the vertical planar surfaces.

88. Apparatus according to claim 77, further comprising the step of generating image data by rendering an image of the modelled object, in which texture data based on the identified image data from at least one camera is rendered onto the model.

89. Apparatus according to claim 88, arranged to perform processing such that each planar surface is mapped onto the image data of the first camera or the second camera, and the image data enclosed by each mapped surface is rendered onto the planar surface in the model.

90. Apparatus according to claim 88, further comprising means for displaying an image of the object using the generated image data.

91. Apparatus for generating a model of an object in a three-dimensional computer model by processing images of the object from a plurality of cameras, the apparatus being operable to process image data from a first camera to identify image data relating to the object, to use image data from a second camera to determine which parts of the identified image data from the first camera relate to parts of the object on or near the ground, and to represent the object in the computer model in dependence thereon.

92. A method of processing image data defining a sequence of images of a plurality of objects moving in a scene to produce signals defining representations of the objects in a three-dimensional computer model, and to generate image data by rendering an image of the three-dimensional computer model in accordance with a user-selected viewing direction, the method comprising:
   processing the image data to identify image data relating to respective objects in the scene;
   defining a representation of each object in the three-dimensional computer model, in dependence upon the identified image data; and
   generating image data by rendering an image of the three-dimensional computer model in accordance with a user-selected viewing direction, wherein, when the selected viewing direction is within a predetermined range of viewing directions, texture data based on the identified image data is rendered onto the object representations, and, when the selected viewing direction is not within the predetermined range of viewing directions, a schematic of the positions of the objects in the scene is rendered.

93. A method according to claim 92, wherein the representation of each object comprises a plurality of vertical planar surfaces alone.

94. A method according to claim 92, wherein the representation of each object comprises a single vertical planar surface.

95. A method according to claim 92, wherein the predetermined range of viewing directions is a range relative to a fixed direction in the computer model.

96. A method according to claim 95, wherein the predetermined range of viewing direction is a range relative to the vertical direction in the computer model.

97. A method according to claim 92, wherein the predetermined range of viewing directions is a range relative to the representation of an object.

98. A method according to claim 97, wherein the representation of an object comprises at least one vertical planar surface, and the predetermined range of viewing directions is a range relative to a planar surface.

99. A method according to claim 92, wherein the schematic of the object positions is rendered from a predetermined viewing direction.

100. A method according to claim 99, wherein the schematic is rendered from a vertical downward viewing direction.

101. A method according to claim 92, further comprising the steps of processing the image data to determine at least one colour for each object, and generating image data to indicate the determined colour on the schematic of the object positions.

102. A method according to claim 92, further comprising the step of generating a signal conveying the image data.

103. A method according to claim 102, further comprising the step of recording the signal.

104. A method according to claim 92, further comprising the step of displaying an image of the objects using the generated image data.

105. A method according to claim 92, further comprising the step of making a recording of the image data either directly or indirectly.

106. A method of rendering an image in accordance with a user-selected viewing direction of a three-dimensional computer model comprising a representation and associated texture data for an object, the texture data being derived from image data recorded by at least one camera, the method comprising:

rendering the texture data onto the representation for the object in accordance with the user-selected viewing direction when the user-selected viewing direction is within a predetermined range of viewing directions; and rendering a schematic of the positions of the object when the user-selected viewing direction is not within the predetermined range of viewing directions.

107. A storage medium storing instructions for causing a programmable processing apparatus to become operable to perform a method according to any one of claims 92 and 106.

108. A physically-embodied computer program product including instructions in computer-readable form, including instructions for causing a programmable processing apparatus to become operable to perform a method according to any one of claims 92 and 106.

109. Apparatus for processing image data defining a sequence of images of a plurality of objects moving in a scene to produce signals defining representations of the objects in a three-dimensional computer model, and to generate image data by rendering an image of the three-dimensional computer model in accordance with a user-selected viewing direction, the apparatus comprising:

means for processing the image data to identify image data relating to respective objects in the scene;

means for defining a representation of each object in the three-dimensional computer model, in dependence upon the identified image data; and means for generating image data by rendering an image of the three-dimensional computer model in accordance with a user-selected viewing direction, operable such that, when the selected viewing direction is within a predetermined range of viewing directions, texture data based on the identified image data is rendered onto the object representations, and, when the selected viewing direction is not within the predetermined range of viewing directions, a schematic of the positions of the objects in the scene is rendered.

110. Apparatus according to claim 109, operable to perform processing such that the representation of each object comprises a plurality of vertical planar surfaces alone.

111. Apparatus according to claim 109, operable to perform processing such that the representation of each object comprises a single vertical planar surface.

112. Apparatus according to claim 109, operable to perform processing such that the predetermined range of viewing directions is a range relative to a fixed direction in the computer model.

113. Apparatus according to claim 112, operable to perform processing such that the predetermined range of viewing direction is a range relative to the vertical direction in the computer model.

114. Apparatus according to claim 109, operable to perform processing such that the predetermined range of viewing directions is a range relative to the representation of an object.

115. Apparatus according to claim 114, operable to perform processing such that the representation of an object comprises at least one vertical planar surface, and the predetermined range of viewing directions is a range relative to a planar surface.

116. Apparatus according to claim 109, operable to perform processing such that the schematic of the object positions is rendered from a predetermined viewing direction.

117. A method according to claim 116, operable to perform processing such that the schematic is rendered from a vertical downward viewing direction.

118. Apparatus according to claim 109, further comprising means for processing the image data to determine at least one colour for each object, and means for generating image data to indicate the determined colour on the schematic of the object positions.

119. Apparatus according to claim 109, further comprising means for displaying an image of the objects using the generated image data.

120. Apparatus for rendering an image in accordance with a user-selected viewing direction of a three-dimensional computer model comprising a representation and associated texture data for an object, the texture data being derived from image data recorded by at least one camera, the apparatus comprising:

means for rendering the texture data onto the representation for the object in accordance with the user-selected viewing direction when the user-selected viewing direction is within a predetermined range of viewing directions; and means for rendering a schematic of the positions of the object when the user-selected viewing direction is not within the predetermined range of viewing directions.

121. A method of processing image data defining a plurality of sequences of images, each from a respective camera, of an object moving in a scene to produce signals defining a representation of the object in a three-dimensional computer model, the method comprising:

processing image data from a first of the cameras to identify image data relating to the object in the scene;

processing image data from a second of the cameras to identify image data relating to the object in the scene;

processing the identified image data from the first camera and the identified image data from the second camera to identify planar surfaces on which points on the object lie by matching feature points in the identified image data from the first camera with feature points in the identified image data from the second camera, and identifying planar surfaces on which matched feature points lie; and defining a model of the object in the three-dimensional computer model in dependence upon the identified planar surfaces.

122. A method according to claim 121, wherein corner points in the identified image data from the first camera are matched with corner points in the identified image data from the second camera.

123. A method according to claim 121, wherein the planar surfaces are identified by identifying planes on which the matched feature points lie, and determining boundaries of the planes using matched feature points which lie on more than one plane.

124. A method according to claim 123, wherein each plane is identified by identifying a plane on which at least a predetermined number of feature points in the identified image data from the first camera lie, identifying the plane on which the matched feature points in the identified image data from the second camera lie, calculating a transformation between the plane in the image data from the first camera and the plane in the image data from the second camera, and testing the transformation using a plurality of other matched pairs of feature points.

125. A method according to claim 124, wherein the predetermined number is four.

126. A method according to claim 121, wherein the step of defining the model of the object comprises forming a model of planar surfaces in the three-dimensional computer model, each planar surface in the model corresponding to a planar surface identified in the image data from at least one of the cameras.

127. A method according to claim 126, wherein the step of defining the model of the object comprises identifying a planar surface which touches the ground in the image data of a camera, defining a vertical planar surface in the three-dimensional computer model in dependence upon the identified planar surface which touches the ground, and defining a further planar surface in the three-dimensional computer model for each further planar surface in the image data of the camera such that the planar surfaces in the three-dimensional computer model and the image data have the same aspect ratio.

128. A method according to claim 127, wherein a planar surface which touches the ground in the image data of the given camera is identified by:

applying a transformation to the base corner points of planar surfaces in the image data from the first camera which defines a mapping from the ground plane in the image data of the first camera to a surface in a modelling space;

applying a transformation to the base corner points of planar surfaces in the image data from the second camera which defines a mapping from the ground plane in the image data of the second camera to the surface in the modelling space; and comparing the transformed corner points to determine which ones lie within a predetermined distance of each other.

129. A method according to claim 128, wherein the surface in the modelling space is the ground plane in the three-dimensional computer model.

130. A method according to claim 129, wherein the defined vertical planar surface in the three-dimensional computer model is defined with a base defined by transformed corner points from the given camera which lie within the predetermined distance of the corresponding transformed corner points from the other camera, and with an aspect ratio corresponding to the aspect ratio of the planar surface in the image data of the given camera to which the transformed corner points belong.

131. A method according to claim 121, further comprising the step of generating image data by rendering an image of the modelled object, in which texture data based on the identified image data from at least one camera is rendered onto the model.

132. A method according to claim 131, wherein image data enclosed by each planar surface is rendered on the corresponding planar surface of the object model.

133. A method according to claim 131, further comprising the step of generating a signal conveying the image data.

134. A method according to claim 133, further comprising the step of recording the signal.

135. A method according to claim 131, further comprising the step of displaying an image of the object using the generated image data.

136. A method according to claim 131, further comprising the step of making a recording of the image data either directly or indirectly.

137. A method of generating a model of an object in a three-dimensional computer model by processing images of the object from a plurality of cameras, in which image data from a first camera and a second camera is processed to match feature points in the image data from the first camera with feature points in image data from the second camera, the resulting matches are used to determine planar surfaces making up the object, and the object is represented in the computer model in dependence thereon.

138. A storage medium storing instructions for causing a programmable processing apparatus to become operable to perform a method according to any one of claims 121 and 137.

139. A physically-embodied computer program product including instructions in computer-readable form, including instructions for causing a programmable processing apparatus to become operable to perform a method according to any one of claims 121 and 137.

140. Apparatus for processing image data defining a plurality of sequences of images, each from a respective camera, of an object moving in a scene to produce signals defining a representation of the object in a three-dimensional computer model, the apparatus comprising:

means for processing image data from a first of the cameras to identify image data relating to the object in the scene;

means for processing image data from a second of the cameras to identify image data relating to the object in the scene;

means for processing the identified image data from the first camera and the identified image data from the second camera to identify planar surfaces on which points on the object lie, comprising means for matching feature points in the identified image data from the first camera with feature points in the identified image data from the second camera, and means for identifying planar surfaces on which matched feature points lie; and means for defining a model of the object in the three-dimensional computer model in dependence upon the identified planar surfaces.

141. Apparatus according to claim 140, operable to perform processing such that corner points in the identified image data from the first camera are matched with corner points in the identified image data from the second camera.

142. Apparatus according to claim 140, operable to perform processing such that the planar surfaces are identified by identifying planes on which the matched feature points lie, and determining boundaries of the planes using matched feature points which lie on more than one plane.

143. Apparatus according to claim 142, operable to perform processing such that each plane is identified by identifying a plane on which at least a predetermined number of feature points in the identified image data from the first camera lie, identifying the plane on which the matched feature points in the identified image data from the second camera lie, calculating a transformation between the plane in the image data from the first camera and the plane in the image data from the second camera, and testing the transformation using a plurality of other matched pairs of feature points.

144. Apparatus according to claim 143, wherein the predetermined number is four.

145. Apparatus according to claim 140, wherein the means for defining the model of the object comprises means for forming a model of planar surfaces in the three-dimensional computer model, each planar surface in the model corresponding to a planar surface identified in the image data from at least one of the cameras.

146. Apparatus according to claim 145, wherein the means for defining the model of the object comprises means for identifying a planar surface which touches the ground in the image data of a camera, means for defining a vertical planar surface in the three-dimensional computer model in dependence upon the identified planar surface which touches the ground, and means for defining a further planar surface in the three-dimensional computer model for each further planar surface in the image data of the camera such that the planar surfaces in the three-dimensional computer model and the image data have the same aspect ratio.

147. Apparatus according to claim 146, operable to perform processing such that a planar surface which touches the ground in the image data of the given camera is identified by:

applying a transformation to the base corner points of planar surfaces in the image data from the first camera which defines a mapping from the ground plane in the image data of the first camera to a surface in a modelling space;

applying a transformation to the base corner points of planar surfaces in the image data from the second camera which defines a mapping from the ground plane in the image data of the second camera to the surface in the modelling space; and comparing the transformed corner points to determine which ones lie within a predetermined distance of each other.

148. Apparatus according to claim 147, wherein the surface in the modelling space is the ground plane in the three-dimensional computer model.

149. Apparatus according to claim 148, operable to perform processing such that the defined vertical planar surface in the three-dimensional computer model is defined with a base defined by transformed corner points from the given camera which lie within the predetermined distance of the corresponding transformed corner points from the other camera, and with an aspect ratio corresponding to the aspect ratio of the planar surface in the image data of the given camera to which the transformed corner points belong.

150. Apparatus according to claim 140, further comprising means for generating image data by rendering an image of the modelled object, in which texture data based on the identified image data from at least one camera is rendered onto the model.

151. Apparatus according to claim 150, operable to perform processing such that image data enclosed by each planar surface is rendered on the corresponding planar surface of the object model.

152. Apparatus according to claim 150, further comprising means for displaying an image of the object using the generated image data.

153. Apparatus for generating a model of an object in a three-dimensional computer model by processing images of the object from a plurality of cameras, the apparatus being operable to process image data from a first camera and a second camera to match feature points in the image data from the first camera with feature points in the image data from the second camera, to use the resulting matches to determine planar surfaces making up the object, and to represent the object in the computer model in dependence thereon.

154. A method of processing image data defining a sequence of images of at least one object moving in a scene to produce signals defining a representation of each object in a three-dimensional computer model, and to generate image data by rendering an image of the three-dimensional computer model in accordance with a user-selected viewing direction, the method comprising:

processing the image data to identify image data relating to respective objects in the scene;

defining a representation of each object in the three-dimensional computer model in dependence upon the identified image data;

generating image data by rendering an image of the three-dimensional computer model in accordance with a user-selected viewing direction in which texture data based on the identified image data is rendered onto the object representations; and generating reliability information indicating the reliability of the image data in dependence upon the angle between the user-selected viewing direction and the viewing direction from which the input image data was recorded.

155. A method according to claim 154, wherein the information indicating the reliability is generated in dependence upon a linear relationship between reliability and the angular difference between the user-selected viewing direction and the viewing direction from which the input image data was recorded.

156. A method according to claim 154, further comprising the step of generating information indicating how to change the viewing direction to improve the generated reliability.

157. A method according to claim 154, wherein image data for a sequence of images recorded by a first camera and a sequence of images recorded by a second camera are processed such that:

in the step of processing the image data, image data from the first camera relating to the respective objects in the scene is identified, and image data from the second camera relating to the respective objects in the scene is identified;

in the step of defining a representation of each object, a first representation of each object is defined in dependence upon the identified image data from the first camera, and a second representation of each object is defined in dependence upon the identified image data from the second camera; and in the step of generating image data, texture data based on the identified image data from at least one camera is rendered onto the object representations.

158. A method according to claim 154, wherein, in the step of defining a representation of each object, each object is represented as a planar surface.

159. A method according to claim 154, wherein the reliability information is generated as pixel data within the generated image data.

160. A method according to claim 154, further comprising the step of generating a signal conveying the image data and the reliability information.

161. A method according to claim 160, further comprising the step of recording the signal.

162. A method according to claim 154, further comprising the step of displaying an image using the generated image data and displaying the reliability information.

163. A method according to claim 154, further comprising the step of making a recording of the image data and the reliability information either directly or indirectly.

164. A method of rendering an image in accordance with a user-selected viewing direction of a three-dimensional computer model comprising a representation and associated texture data for at least one object, the texture data being derived from image data recorded by at least one camera, the method comprising:

generating image data by rendering an image of the three-dimensional computer model in accordance with a user-selected viewing direction, in which the texture data is rendered onto each representation; and generating reliability information indicating the reliability of the image data in dependence upon the angle between the user-selected viewing direction and the viewing direction from which the input image data was recorded.

165. An image processing method in which object data defining a three-dimensional computer model of at least one object in a scene is rendered in accordance with a user-selected viewing direction using image data recorded by a camera having a viewing direction to render each object, and an indicator of a quality of the generated image data is produced for output to the user in dependence upon the angle between the user-selected viewing direction and the viewing direction of the camera.

166. A storage medium storing instructions for causing a programmable processing apparatus to become operable to perform a method according to any one of claims 154, 164 and 165.

167. A physically-embodied computer program product including instructions in computer-readable form, including instructions for causing a programmable processing apparatus to become operable to perform a method according to any one of claims 154, 164, and 165.

168. Apparatus for processing image data defining a sequence of images of at least one object moving in a scene to produce signals defining a representation of each object in a three-dimensional computer model, and to generate image data by rendering an image of the three-dimensional computer model in accordance with a user-selected viewing direction, the apparatus comprising:

means for processing the image data to identify image data relating to respective objects in the scene;

means for defining a representation of each object in the three-dimensional computer model in dependence upon the identified image data;

means for generating image data by rendering an image of the three-dimensional computer model in accordance with a user-selected viewing direction in which texture data based on the identified image data is rendered onto the object representations; and means for generating reliability information indicating the reliability of the image data in dependence upon the angle between the user-selected viewing direction and the viewing direction from which the input image data was recorded.

169. Apparatus according to claim 168, operable to perform processing such that the information indicating the reliability is generated in dependence upon a linear relationship between reliability and the angular difference between the user-selected viewing direction and the viewing direction from which the input image data was recorded.

170. Apparatus according to claim 168, further comprising means for generating information indicating how to change the viewing direction to improve the generated reliability.

171. Apparatus according to claim 168, operable to process image data for a sequence of images recorded by a first camera and a sequence of images recorded by a second camera, wherein:

the means for processing the image data is operable to identify image data from the first camera relating to the respective objects in the scene and to identify image data from the second camera relating to the respective objects in the scene;

the means for defining a representation of each object is operable to define a first representation of each object in dependence upon the identified image data from the first camera, and to define a second representation of each object in dependence upon the identified image data from the second camera; and the means for generating image data is operable to render texture data based on the identified image data from at least one camera onto the object representations.

172. Apparatus according to claim 168, wherein the means for defining a representation of each object is arranged to represent each object as a planar surface.

173. Apparatus according to claim 168, operable to perform processing such that the reliability information is generated as pixel data within the generated image data.

174. Apparatus according to claim 168, further comprising means for displaying an image using the generated image data and displaying the reliability information.

175. Apparatus for rendering an image in accordance with a user-selected viewing direction of a three-dimensional computer model comprising a representation and associated texture data for at least one object, the texture data being derived from image data recorded by at least one camera, the apparatus comprising:

means for generating image data by rendering an image of the three-dimensional computer model in accordance with a user-selected viewing direction, in which the texture data is rendered onto each representation; and means for generating reliability information indicating the reliability of the image data in dependence upon the angle between the user-selected viewing direction and the viewing direction from which the input image data was recorded.

176. An image processing apparatus operable to render object data defining a three-dimensional computer model of at least one object in a scene in accordance with a user-selected viewing direction using image data recorded by a camera having a viewing direction to render each object, and operable to produce an indicator of a quality of the generated image data for output to the user in dependence upon the angle between the user-selected viewing direction and the viewing direction of the camera.

177. A method of processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the method comprising:

receiving data defining a user-selected viewing direction;
calculating the respective angle between the user-selected viewing direction and the respective viewing direction of each camera;

identifying the cameras having a viewing direction within a predetermined angle of the user-selected viewing direction as identified cameras;

comparing at least one camera characteristic affecting image data quality for each identified camera to determine differences therebetween;

selecting one of the identified cameras as a selected camera in dependence upon the determined differences;

processing input image data from the selected camera to define a representation of the object in the three-dimensional computer model; and generating image data by rendering an image of the three-dimensional computer model in accordance with the user-selected viewing direction, in which texture data based on input image data from the selected camera is rendered onto the representation of the object.

178. A method according to claim 177, further comprising the step of generating a signal conveying the image data.

179. A method according to claim 178, further comprising the step of recording the signal.

180. A method according to claim 177, further comprising the step of displaying an image of the objects using the generated image data.

181. A method according to claim 177, further comprising the step of making a recording of the image data either directly or indirectly.

182. An image processing method in which image data from each of a respective sequence of images, each from a different camera, is processed to define a representation of at least one object in a three-dimensional computer model, and wherein a representation of each object is selected for rendering in dependence upon a user-selected viewing direction, the viewing direction of each camera and a plurality of camera parameters related to image data quality, wherein the plurality of camera parameters are tested in a predetermined order, with the selection of a representation for rendering being made once the tests identify a camera parameter which is sufficiently different for the cameras.

183. An image processing method in which a user-selected viewing direction in accordance with which an image of at least one object in a three-dimensional computer model is to be rendered is used to select, from among image data defining a plurality of images of the object each recorded by a respective camera, image data to be used to define the object in the three-dimensional computer model, the selection being carried out in dependence upon the user-selected viewing direction, together with the viewing direction of each camera and a plurality of camera parameters related to image data quality, wherein the plurality of camera parameters are tested in a predetermined order, with the selection of image data being made once the tests identify a camera parameter which is sufficiently different for the cameras.

184. An image processing apparatus for processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the apparatus comprising:

means for receiving data defining a user-selected viewing direction;

means for calculating the respective angle between the user-selected viewing direction and the respective viewing direction of each camera;

means for identifying the cameras having a viewing direction within a predetermined angle of the user-selected viewing direction as identified cameras;

means for comparing at least one camera characteristic affecting image data quality for each identified camera to determine differences therebetween;

means for selecting one of the identified cameras as a selected camera in dependence upon the determined differences;

means for processing input image data from the selected camera to define a representation of the object in the three-dimensional computer model; and means for generating image data by rendering an image of the three-dimensional computer model in accordance with the user-selected viewing direction, in which texture data based on input image data from the selected camera is rendered onto the representation of the object.

185. Apparatus according to claim 184, further comprising means for displaying an image of the objects using the generated image data.

186. An image processing apparatus operable to process image data from each of a respective sequence of images, each from a different camera, to define a representation of at least one object in a three-dimensional computer model, and to select a representation of each object for rendering in dependence upon a user-selected viewing direction, the viewing direction of each camera and a plurality of camera parameters related to image data quality, the apparatus being operable to test the plurality of camera parameters in a predetermined order and to select a representation for rendering when the tests identify a camera parameter which is sufficiently different for the cameras.

187. An image processing apparatus operable to use a user-selected viewing direction in accordance with which an image of at least one object in a three-dimensional computer model is to be rendered to select, from among image data defining a plurality of images of the object each recorded by a respective camera, image data to be used to define the object in the three-dimensional computer model, the selection being carried out in dependence upon the user-selected viewing direction, together with the viewing direction of each camera and a plurality of camera parameters related to image data quality, wherein the apparatus is operable to test the plurality of camera parameters in a predetermined order and to select image data when the tests identify a camera parameter which is sufficiently different for the cameras.

188. A method of processing image data defining a plurality of sequences of images, each from a respective camera, of an object moving in a scene to produce signals defining a representation of the object in a three-dimensional computer model, and to generate image data for first and second images in a sequence of images of the object by rendering images of the three-dimensional computer model in accordance with first and second user-selected viewing directions, the method comprising:

processing the image data to define at least one representation of the object in the three-dimensional computer model;

generating image data for use in a first image in the sequence by rendering texture data based on image data from at least a first of the cameras onto a representation of the object in accordance with a first user-selected viewing direction;

generating image data for use in a second image in the sequence by rendering texture data based on image data from a second of the cameras onto a representation of the object in accordance with a second user-selected viewing direction;

testing whether first and second images of the object displayed from the generated image data will be discontinuous by testing whether the image data for the object in the second image in the sequence differs by more than a predetermined amount from predetermined image data; and if the image data for the object in the second image differs by more than the predetermined amount, generating modified image data for the object in the second image.

189. A method according to claim 188, wherein:

in the step of processing the image data, image data from the first camera is processed to generate a first representation of the object in the three-dimensional computer model, and image data from the second camera is processed to generate a second representation of the object in the three-dimensional computer model;

the image data for the object in the first image is generated by rendering the first representation; and the image data for the object in the second image is generated by rendering the second representation.

190. A method according to claim 189, wherein, in the step of testing:

further image data for the object in the second image in the sequence is generated by rendering texture data based on image data from the first camera onto the first representation of the object in accordance with the second user-selected viewing direction; and the image data for the object in the second image generated using image data from the second camera is compared with the image data for the object in the second image generated using image data from the first camera.

191. A method according to claim 190, wherein in the step of generating modified image data, the modified image data is generated in dependence upon the image data for the object in the second image generated using image data from the second camera and the image data for the object in the second image generated using image data from the first camera.

192. A method according to claim 188, wherein:

the step of generating image data for the first image comprises rendering the three-dimensional computer model in accordance with the first user-selected viewing direction;

the step of generating image data for the second image comprises rendering the three-dimensional computer model in accordance with the second user-selected viewing direction; and the step of testing comprises comparing the rendered image data for the second image with the predetermined image data.

193. A method according to claim 188, further comprising the step of generating a signal conveying the modified image data.

194. A method according to claim 193, further comprising the step of recording the signal.

195. A method according to claim 188, further comprising the step of displaying an image of the object using the modified image data.

196. A method according to claim 188, further comprising the step of making a recording of the modified image data either directly or indirectly.

197. A method of generating image data for first and second images in a sequence of images by rendering a three-dimensional computer model in accordance with respective first and second user-selected viewing directions, the three-dimensional computer model comprising a representation and associated texture data for at least one object and the texture data comprising texture data derived from image data recorded by a first camera and texture data derived from image data recorded by a second camera, the method comprising:

generating image data for use in a first image in the sequence by rendering texture data based on image data from at least a first camera onto the representation of each object in accordance with the first user-selected viewing direction;

generating image data for use in the second image in the sequence by rendering texture data based on image data from the second camera onto the representation of each object in accordance with a second user-selected viewing direction;

testing whether first and second images of the object displayed from the generated image data will be discontinuous by testing whether the image data for the object in the second image in the sequence differs by more than a predetermined amount from predetermined image data; and if the image data for the object in the second image differs by more than the predetermined amount, generating modified image data for the object in the second image.

198. An image processing method in which a three-dimensional computer model including at least one representation of an object is processed a first time to generate image data for a first image in a sequence of images by rendering using image data recorded by a first camera as the basis for texture data for a representation, and a second time to generate image data for a successive image in the sequence by rendering using image data recorded by a second camera as the basis for texture data for a representation, and modified image data is generated for the object in the successive image if image data comparison tests indicate that the object in the images in the sequence will appear discontinuous.

199. A method of generating image data for successive images in a sequence by rendering a representation of an object in a three-dimensional computer model using image data from a plurality of cameras, in which a test on the image data is performed to determine whether the image of the object will appear discontinuous in the successive images, and the image data is processed to reduce the discontinuity.

200. A storage medium storing instructions for causing a programmable processing apparatus to become operable to perform a method according to any one of claims 188, 197, 198 and 199.

201. A physically-embodied computer program product including instructions in computer-readable form, including instructions for causing a programmable processing apparatus to become operable to perform a method according to any one of claims 188, 197, 198 and 199.

202. Image processing apparatus for processing image data defining a plurality of sequences of images, each from a respective camera, of an object moving in a scene to produce signals defining a representation of the object in a three-dimensional computer model, and to generate image data for first and second images in a sequence of images of the object by rendering images of the three-dimensional computer model in accordance with first and second user-selected viewing directions, the apparatus comprising:

means for processing the image data to define at least one representation of the object in the three-dimensional computer model;

means for generating image data for use in a first image in the sequence by rendering texture data based on image data from at least a first of the cameras onto a representation of the object in accordance with a first user-selected viewing direction;

means for generating image data for use in a second image in the sequence by rendering texture data based on image data from a second of the cameras onto a representation of the object in accordance with a second user-selected viewing direction;

means for testing whether first and second images of the object displayed from the generated image data will be discontinuous by testing whether the image data for the object in the second image in the sequence differs by more than a predetermined amount from predetermined image data; and means for generating modified image data for the object in the second image if the image data for the object in the second image differs by more than the predetermined amount.

203. Apparatus according to claim 202, wherein:
the means for processing the image data is operable to process image data from the first camera to generate a first representation of the object in the three-dimensional computer model, and to process image data from the second camera to generate a second representation of the object in the three-dimensional computer model; and
the apparatus is arranged to perform processing such that:
the image data for the object in the first image is generated by rendering the first representation; and
the image data for the object in the second image is generated by rendering the second representation.

204. Apparatus according to claim 203, wherein the means for testing is operable to perform processing such that:
further image data for the object in the second image in the sequence is generated by rendering texture data based on image data from the first camera onto the first representation of the object in accordance with the second user-selected viewing direction; and
the image data for the object in the second image generated using image data from the second camera is compared with the image data for the object in the second image generated using image data from the first camera.

205. Apparatus according to claim 204, wherein the means for generating modified image data is arranged to perform processing such that the modified image data is generated in dependence upon the image data for the object in the second image generated using image data from the second camera and the image data for the object in the second image generated using image data from the first camera.

206. Apparatus according to claim 202, wherein:
the means for generating image data for the first image comprises means for rendering the three-dimensional computer model in accordance with the first user-selected viewing direction;
the means for generating image data for the second image comprises means for rendering the three-dimensional computer model in accordance with the second user-selected viewing direction; and
the means for testing comprises means for comparing the rendered image data for the second image with the predetermined image data.

207. Apparatus according to claim 202, further comprising means for displaying an image of the object using the modified image data.

208. Image processing apparatus for generating image data for first and second images in a sequence of images by rendering a three-dimensional computer model in accordance with respective first and second user-selected viewing directions, the three-dimensional computer model comprising a representation and associated texture data for at least one object and the texture data comprising texture data derived from image data recorded by a first camera and texture data derived from image data recorded by a second camera, the apparatus comprising:

means for generating image data for use in a first image in the sequence by rendering texture data based on image data from at least a first camera onto the representation of each object in accordance with the first user-selected viewing direction;

means for generating image data for use in the second image in the sequence by rendering texture data based on image data from the second camera onto the user-selected viewing direction;

means for testing whether first and second images of the object displayed from the generated image data will be discontinuous by testing whether the image data for the object in the second image in the sequence differs by more than a predetermined amount from predetermined image data; and means for generating modified image data for the object in the second image if the image data for the object in the second image differs by more than the predetermined amount.

209. An image processing apparatus operable to process a three-dimensional computer model including at least one representation of an object a first time to generate image data for a first image in a sequence of images by rendering using image data recorded by a first camera as the basis for texture data for a representation, and a second time to generate image data for a successive image in the sequence by rendering using image data recorded by a second camera as the basis for texture data for a representation, and operable to generate modified image data for the object in the successive image if image data comparison tests indicate that the object in the images in the sequence will appear discontinuous.

210. Apparatus for method of generating image data for successive images in a sequence by rendering a representation of an object in a three-dimensional computer model using image data from a plurality of cameras, the apparatus being operable to perform a test on the image data to determine whether the image of the object will appear discontinuous in the successive images, and to process the image data to reduce the discontinuity.

211. An image processing apparatus for processing image data defining a plurality of sequences of images, each from a respective camera, of a plurality of objects moving in a scene to produce signals defining representations of the objects in a three-dimensional computer model, the apparatus comprising:

an image data identifier for processing image data from a first of the cameras to identify image data relating to objects in the scene, and for processing image data from a second of the cameras to identify image data relating to objects in the scene;

an object representation definer for processing the identified image data from the first camera for each object to define an object representation in the three-dimensional computer model having a height dependent upon the image data for the object from the first camera, and for processing the identified image data from the second camera for each object to define an object representation in the three-dimensional computer model having a height dependent upon the image data for the object from the second camera;

a height comparer for comparing the height of the representation of each object generated in dependence upon image data from the first camera with the height of the representation of the corresponding object generated in dependence upon image data from the second camera; and an object representation generator for generating object representations in the three-dimensional computer model in dependence upon the height comparisons, wherein the apparatus is arranged to perform processing such that, when the heights of the corresponding representations are not within a predetermined amount of each other, the taller representation is split into a first portion having a height corresponding to the height of the smaller representation and a second portion comprising the remaining part of the taller representation, and wherein a further representation is defined in the three-dimensional model by re-positioning the second portion in the three-dimensional model.

212. Apparatus for processing image data defining a plurality of sequences of images, each from a respective camera, of an object moving in a scene to produce signals defining a representation of the object in a three-dimensional computer model, the apparatus comprising:

an image data identifier for processing image data from a first of the cameras to identify image data relating to the object in the scene, and for processing image data from a second of the cameras to identify image data relating to the object in the scene;

an image data transformer for applying a transformation to the identified image data from the first camera which defines a mapping from the ground plane in the space of the image data of the first camera to a surface in a modelling space, and for applying a transformation to the identified image data from the second camera which defines a mapping from the ground plane in the space of the image data of the second camera to the surface in the modelling space;

an image data comparer for comparing the transformed image data from the first and second cameras on the surface in the modelling space;

a shadow determinator for determining which part of the image data represents shadow in dependence upon the comparison results; and an object representation generator for generating a representation of at least the object in the three-dimensional model.

213. Apparatus for generating a model of an object in a three-dimensional computer model, comprising:

an image data transformer for applying a transformation to image data from a first camera relating to the object and its shadow which maps the image data to a surface to give first transformed image data, and for applying a transformation to image data from a second camera relating to the object and its shadow which maps the image data to the surface to give second transformed image data;

a transformed image data comparer for comparing the first transformed image data and the second transformed image data to distinguish transformed image data relating to the object from transformed image data relating to its shadow; and an object modeller for modelling the object in dependence upon the transformed image data relating to the object.

214. Apparatus for processing image data defining a plurality of sequences of images, each from a respective camera, of an object moving in a scene to produce signals defining a representation of the object in a three-dimensional computer model, the apparatus comprising:

an image data identifier for processing image data from a first of the cameras to identify image data relating to the object in the scene, and for processing image data from a second of the cameras to identify image data relating to the object in the scene;

a footprint determinator for processing the identified image data from the first camera and the identified image data from the second camera to determine a footprint of the object on the ground; and an object modeller for defining a model of the object in the three-dimensional computer model in dependence upon the determined footprint.

215. Apparatus for processing image data defining a sequence of images of a plurality of objects moving in a scene to produce signals defining representations of the objects in a three-dimensional computer model, and to generate image data by rendering an image of the three-dimensional computer model in accordance with a user-selected viewing direction, the apparatus comprising:

an image data identifier for processing the image data to identify image data relating to respective objects in the scene;

an object modeller for defining a representation of each object in the three-dimensional computer model, in dependence upon the identified image data; and a renderer for generating image data by rendering an image of the three-dimensional computer model in accordance with a user-selected viewing direction, operable such that, when the selected viewing direction is within a predetermined range of viewing directions, texture data based on the identified image data is rendered onto the object representations, and, when the selected viewing direction is not within the predetermined range of viewing directions, a schematic of the positions of the objects in the scene is rendered.

216. Apparatus for rendering an image in accordance with a user-selected viewing direction of a three-dimensional computer model comprising a representation and associated texture data for an object, the texture data being derived from image data recorded by at least one camera, the apparatus comprising:

a first renderer for rendering the texture data onto the representation for the object in accordance with the user-selected viewing direction when the user-selected viewing direction is within a predetermined range of viewing directions; and a second renderer for rendering a schematic of the positions of the object when the user-selected viewing direction is not within the predetermined range of viewing directions.

217. Apparatus for processing image data defining a plurality of sequences of images, each from a respective camera, of an object moving in a scene to produce signals defining a representation of the object in a three-dimensional computer model, the apparatus comprising:

an image data identifier for processing image data from a first of the cameras to identify image data relating to the object in the scene, and for processing image data from a second of the cameras to identify image data relating to the object in the scene;

a surface identifier for processing the identified image data from the first camera and the identified image data from the second camera to identify planar surfaces on which points on the object lie, comprising a feature matcher for matching feature points in the identified image data from the first camera with feature points in the identified image data from the second camera, and a planar surface identifier for identifying planar surfaces on which matched feature points lie; and an object modeller for defining a model of the object in the three-dimensional computer model in dependence upon the identified planar surfaces.

218. Apparatus for processing image data defining a sequence of images of at least one object moving in a scene to produce signals defining a representation of each object in a three-dimensional computer model, and to generate image data by rendering an image of the three-dimensional computer model in accordance with a user-selected viewing direction, the apparatus comprising:

an image data identifier for processing the image data to identify image data relating to respective objects in the scene;

an object modeller for defining a representation of each object in the three-dimensional computer model in dependence upon the identified image data;

a renderer for generating image data by rendering an image of the three-dimensional computer model in accordance with a user-selected viewing direction in which texture data based on the identified image data is rendered onto the object representations; and a reliability information generator for generating reliability information indicating the reliability of the image data in dependence upon the angle between the user-selected viewing direction and the viewing direction from which the input image data was recorded.

219. Apparatus for rendering an image in accordance with a user-selected viewing direction of a three-dimensional computer model comprising a representation and associated texture data for at least one object, the texture data being derived from image data recorded by at least one camera, the apparatus comprising:

a renderer for generating image data by rendering an image of the three-dimensional computer model in accordance with a user-selected viewing direction, in which the texture data is rendered onto each representation; and a reliability information generator for generating reliability information indicating the reliability of the image data in dependence upon the angle between the user-selected viewing direction and the viewing direction from which the input image data was recorded.

220. An image processing apparatus for processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the apparatus comprising:

a data receiver for receiving data defining a user-selected viewing direction;

an angle calculator operable to calculate the respective angle between the user-selected viewing direction and the respective viewing direction of each camera;

a camera identifier operable to identify the cameras having a viewing direction within a predetermined angle of the user-selected viewing direction as identified cameras;

a camera characteristic comparer operable to compare at least one camera characteristic affecting image data quality for each identified camera to determine differences therebetween;

a camera selector operable to select one of the identified cameras as a selected camera in dependence upon the determined differences;

an object representation generator for processing input image data from the selected camera to define a representation of the object in the three-dimensional computer model; and a renderer for generating image data by rendering an image of the three-dimensional computer model in accordance with the user-selected viewing direction, in which texture data based on input image data from the selected camera is rendered onto the representation of each object.

221. Image processing apparatus for processing image data defining a plurality of sequences of images, each from a respective camera, of an object moving in a scene to produce signals defining a representation of the object in a three-dimensional computer model, and to generate image data for first and second images in a sequence of images of the object by rendering images of the three-dimensional computer model in accordance with first and second user-selected viewing directions, the apparatus comprising:

an object representation generator for processing the image data to define at least one representation of the object in the three-dimensional computer model;

a renderer for generating image data for use in a first image in the sequence by rendering texture data based on image data from at least a first of the cameras onto a representation of the object in accordance with a first user-selected viewing direction, and for generating image data for use in a second image in the sequence by rendering texture data based on image data from a second of the cameras onto a representation of the object in accordance with a second user-selected viewing direction;

an image data tester for testing whether first and second images of the object displayed from the generated image data will be discontinuous by testing whether the image data for the object in the second image in the sequence differs by more than a predetermined amount from predetermined image data; and an image data modifier for generating modified image data for the object in the second image if the image data for the object in the second image differs by more than the predetermined amount.

222. Image processing apparatus for generating image data for first and second images in a sequence of images by rendering a three-dimensional computer model in accordance with respective first and second user-selected viewing directions, the three-dimensional computer model comprising a representation and associated texture data for at least one object and the texture data comprising texture data derived from image data recorded by a first camera and texture data derived from image data recorded by a second camera, the apparatus comprising:

a renderer for generating image data for use in a first image in the sequence by rendering texture data based on image data from at least a first camera onto the representation of each object in accordance with the first user-selected viewing direction, and for generating image data for use in the second image in the sequence by rendering texture data based on image data from the second camera onto the representation of each object in accordance with a second user-selected viewing direction;

an image data tester for testing whether first and second images of the object displayed from the generated image data will be discontinuous by testing whether the image data for the object in the second image in the sequence differs by more than a predetermined amount from predetermined image data; and an image data modifier for generating modified image data for the object in the second image if the image data for the object in the second image differs by more than the predetermined amount.

223. A method of processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the method comprising:

processing input image data from each respective camera to define a respective representation of the object in the three-dimensional computer model;

receiving data defining a user-selected viewing direction;

calculating the respective angle between the user-selected viewing direction and the respective viewing direction of each camera;

identifying the cameras having a viewing direction within a predetermined angle of the user-selected viewing direction as identified cameras;

comparing at least one camera characteristic affecting the image data quality for each identified camera to determine differences therebetween;

selecting one of the identified cameras as a selected camera in dependence upon the determined differences;

selecting the representation of the object generated from the selected camera as a selected representation; and generating image data by rendering an image of the three-dimensional computer model in accordance with the user-selected viewing direction, in which texture data based on input image data from the selected camera is rendered onto the selected representation of the object.

224. A method according to claim 177 or claim 223, wherein, when comparing at least one camera characteristic affecting image data quality, at least one of the following are compared: the methods of transferring the image data from respective cameras; the resolution of respective cameras; the shutter speed of respective cameras; the stability of the image data from respective cameras; and whether the image data from respective cameras is colour or black and white.

225. A method according to claim 177 or claim 223, wherein a plurality of camera characteristics affecting image quality are compared.

226. A method according to claim 225, wherein the camera characteristics affecting quality are considered in a predetermined order and values for each respective camera characteristic are compared, with the selection of a camera being made once the tests identify a characteristic which differs by more than a predetermined amount for given cameras.

227. A storage medium storing instructions for causing a programmable processing apparatus to become operable to perform a method according to any one of claims 177, 182, 183 and 223.

228. A physically-embodied computer program product including instructions in computer-readable form, including instructions for causing a programmable processing apparatus become operable to perform a method according to any one of claims 177, 182, 183 and 223.

229. An image processing apparatus for processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the apparatus comprising:

means for processing input image data from each respective camera to define a respective representation of the object in the three-dimensional computer model;

means for receiving data defining a user-selected viewing direction;

means for calculating the respective angle between the user-selected viewing direction and the respective viewing direction of each camera;

means for identifying the cameras having a viewing direction within a predetermined angle of the user-selected viewing direction as identified cameras;

means for comparing at least one camera characteristic affecting the image data quality for each identified camera to determine differences therebetween;

means for selecting one of the identified cameras as a selected camera in dependence upon the determined differences;

means for selecting the representation of the object generated from the selected camera as a selected representation; and means for generating image data by rendering an image of the three-dimensional computer model in accordance with the user-selected viewing direction, in which texture data based on input image data from the selected camera is rendered onto the selected representation of the object.

230. Apparatus according to claim 184 or claim 229, wherein the means for comparing at least one camera characteristic affecting image data quality is operable to compare at least one of: the methods of transferring the image data from respective cameras; the resolution of respective cameras; the shutter speed of respective cameras; the stability of the image data from respective cameras; and whether the image data from respective cameras is colour or black and white.

231. Apparatus according to claim 184 or claim 229, operable to perform processing to compare a plurality of respective camera characteristics affecting image quality.

232. Apparatus according to claim 231, operable to perform processing such that the camera characteristics affecting quality are compared in a predetermined order, with the selection of a camera being made once the tests identify a characteristic which differs by more than a predetermined amount for given cameras.

233. An image processing apparatus for processing image data defining a plurality of sequences of images, each from a respective camera, of an object moving in a scene to produce signals defining a representation of the object in a three-dimensional computer model, and to generate image data by rendering an image of the three-dimensional computer model in accordance with a user-selected viewing direction, the apparatus comprising:

an object representation generator operable to process input image data from each respective camera to define a respective representation of the object in the three-dimensional computer model;

a data receiver for receiving data defining a user-selected viewing direction;

an angle calculator operable to calculate the respective angle between the user-selected viewing direction and the respective viewing direction of each camera;

a camera identifier operable to identify the cameras having a viewing direction within a predetermined angle of the user-selected viewing direction as identified cameras;

a camera characteristic comparer operable to compare at least one camera characteristic affecting the image data quality for each identified camera to determine differences therebetween;

a camera selector operable to select one of the identified cameras as a selected camera in dependence upon the determined differences;

an object representation selector operable to select the representation of the object generated from the selected camera as a selected representation; and a renderer operable to generate image data by rendering an image of the three-dimensional computer model in accordance with the user-selected viewing direction, in which texture data based on input image data from the selected camera is rendered onto the selected representation of the object.

234. A method of processing image data defining a plurality of sequences of images, each from a respective camera, of a plurality of objects moving in a scene to produce signals defining representations of the objects in a three-dimensional computer model, the method comprising the steps of:

processing image data from a first of the cameras to identify image data relating to objects in the scene;

processing image data from a second of the cameras to identify image data relating to objects in the scene;

processing the identified image data from the first camera for each object to define an object representation comprising a planar surface with its base on a predetermined surface in a modelling space having a position, width and height dependent upon a polygon bounding the image data for the object from the first camera, wherein the width of each planar surface representing an object is determined by the width of the associated bounding box in the image data, and the height of each planar surface is calculated using the aspect ratio of the bounding box in the image data;

processing the identified image data from the second camera for each object to define an object representation comprising a planar surface with its base on a predetermined surface in the modelling space having a position, width and height dependent upon a polygon bounding the image data for the object from the second camera, wherein the width of each planar surface representing an object is determined by the width of the associated bounding box in the image data, and the height of each planar surface is calculated using the aspect ratio of the bounding box in the image data;

comparing the height of the representation of each object generated in dependence upon image data from the first camera with the height of the representation of the corresponding object generated in dependence upon image data from the second camera; and generating object representations in the three-dimensional computer model in dependence upon the height comparisons.

235. An image processing apparatus for processing image data defining a plurality of sequences of images, each from a respective camera, of a plurality of objects moving in a scene to produce signals defining representations of the objects in a three-dimensional computer model, the apparatus comprising:

means for processing image data from a first of the cameras to identify image data relating to objects in the scene;

means for processing image data from a second of the cameras to identify image data relating to objects in the scene;

means for processing the identified image data from the first camera for each object to define an object representation comprising a planar surface with its base on a predetermined surface in a modelling space having a position, width and height dependent upon a polygon bounding the image data for the object from the first camera, wherein the width of each planar surface representing an object is determined by the width of the associated bounding box in the image data, and the height of each planar surface is calculated using the aspect ratio of the bounding box in the image data;

means for processing the identified image data from the second camera for each object to define an object representation comprising a planar surface with its base on a predetermined surface in the modelling space having a position, width and height dependent upon a polygon bounding the image data for the object from the second camera, wherein the width of each planar surface representing an object is determined by the width of the associated bounding box in the image data, and the height of each planar surface is calculated using the aspect ratio of the bounding box in the image data;

means for comparing the height of the representation of each object generated in dependence upon image data from the first camera with the height of the representation of the corresponding object generated in dependence upon image data from the second camera; and means for generating object representations in the three-dimensional computer model in dependence upon the height comparisons.

236. An image processing apparatus for processing image data defining a plurality of sequences of images, each from a respective camera, of a plurality of objects moving in a scene to produce signals defining representations of the objects in a three-dimensional computer model, the apparatus comprising:

an image data identifier for processing image data from a first of the cameras to identify image data relating to objects in the scene, and for processing image data from a second of the cameras to identify image data relating to objects in the scene;

an object representation definer for processing the identified image data from the first camera for each object to define an object representation comprising a planar surface with its base on a predetermined surface in a modelling space having a position, width and height dependent upon a polygon bounding the image data for the object from the first camera, and for processing the identified image data from the second camera for each object to define an object representation comprising a planar surface with its base on a predetermined surface in the modelling space having a position, width and height dependent upon a polygon bounding the image data for the object from the second camera, wherein the object representation definer is arranged to perform processing such that the width of each planar surface representing an object is determined by the width of the associated bounding box in the image data, and the height of each planar surface is calculated using the aspect ratio of the bounding box in the image data;

a height comparer for comparing the height of the representation of each object generated in dependence upon image data from the first camera with the height of the representation of the corresponding object generated in dependence upon image data from the second camera; and an object representation generator for generating object representations in the three-dimensional computer model in dependence upon the height comparisons.

* * * * *

UNITED STATES PATENT AND TRADEMARK OFFICE
CERTIFICATE OF CORRECTION

PATENT NO.   : 6,914,599 B1
DATED        : July 5, 2005
INVENTOR(S)  : Simon Michael Rowe et al.

It is certified that error appears in the above-identified patent and that said Letters Patent is hereby corrected as shown below:

<u>Title page,</u>
Item [56], References Cited, OTHER PUBLICATIONS, "Haralick et al., "Computer and Robot Vision Volume 2", 1993.*" should be deleted.
Item [57], ABSTRACT,
Line 17, "discontinuous" should read -- discontinuities --.

<u>Drawings,</u>
Sheet 3 should be replaced by attached sheets 3 of 19 and 4 of 19.
Sheet 11 should be replaced by attached sheets 12 of 19 and 13 of 19.
Sheet 12 should be replaced by attached sheets 14 of 19 and 15 of 19.

<u>Column 2,</u>
Line 53, "FIG. 3" should read -- FIG. 3, --.

<u>Column 5,</u>
Line 54, "FIG. 10 image" should read -- image --.

<u>Column 19,</u>
Line 54, "for-the" should read -- for the --.

<u>Column 22,</u>
Line 13, "def ine" should read -- define --; and
Line 55, "object" should read -- objects --.

<u>Column 32,</u>
Line 65, "for" should read -- means for --.

UNITED STATES PATENT AND TRADEMARK OFFICE
CERTIFICATE OF CORRECTION

PATENT NO. : 6,914,599 B1
DATED : July 5, 2005
INVENTOR(S) : Simon Michael Rowe et al.

It is certified that error appears in the above-identified patent and that said Letters Patent is hereby corrected as shown below:

Column 56,
Line 40, "become" should read -- to become --.

Signed and Sealed this

Twenty-third Day of May, 2006

JON W. DUDAS
*Director of the United States Patent and Trademark Office*